(12) United States Patent
Hehn et al.

(10) Patent No.: US 10,766,627 B2
(45) Date of Patent: Sep. 8, 2020

(54) AERIAL VEHICLE

(71) Applicant: VERITY STUDIOS AG, Schlieren (CH)

(72) Inventors: Markus Hehn, Zurich (CH); Markus Waibel, Zurich (CH); Luca Gherardi, Zurich (CH); Raffaello D'Andrea, Wollerau (CH)

(73) Assignee: Verity Studios AG, Zurich (CH)

( * ) Notice: Subject to any disclaimer, the term of this patent is extended or adjusted under 35 U.S.C. 154(b) by 169 days.

(21) Appl. No.: 15/753,167

(22) PCT Filed: May 27, 2016

(86) PCT No.: PCT/IB2016/053132
§ 371 (c)(1),
(2) Date: Feb. 15, 2018

(87) PCT Pub. No.: WO2016/193884
PCT Pub. Date: Dec. 8, 2016

(65) Prior Publication Data
US 2018/0237148 A1      Aug. 23, 2018

Related U.S. Application Data

(60) Provisional application No. 62/167,910, filed on May 29, 2015, provisional application No. 62/213,784, filed on Sep. 3, 2015.

(51) Int. Cl.
*B64D 31/06* (2006.01)
*B64C 39/02* (2006.01)
(Continued)

(52) U.S. Cl.
CPC ............ *B64D 31/06* (2013.01); *B64C 39/024* (2013.01); *G05D 1/0077* (2013.01); *B64C 2201/027* (2013.01); *B64D 2045/0085* (2013.01)

(58) Field of Classification Search
CPC ............ B64D 31/06; B64D 2045/0085; B64C 39/024; B64C 2201/027; G05D 1/0077
See application file for complete search history.

(56) References Cited

U.S. PATENT DOCUMENTS 9,828,107 B1 * 11/2017 Ruymgaart .......... G05D 1/0077
2006/0144994 A1 * 7/2006 Spirov .................... B60V 1/06
244/62

(Continued)

OTHER PUBLICATIONS

MabeInAmerica, Epic Halloween Prank 2 and Behind the Scenes with Tom Mabe, Nov. 3, 2013, YouTube, https://www.youtube.com/watch?v=V_LC_jmTmas (Year: 2013).*

*Primary Examiner* — Sze-Hon Kong
(74) *Attorney, Agent, or Firm* — Haley Guiliano LLP

(57) ABSTRACT

According to the present invention there is provided an aerial vehicle that is operable to fly, the aerial vehicle having at least a first and second subsystem that are operably connected, wherein the first subsystem comprises a first flight module, first one or more effectors that are selectively operable to generate a first force sufficient to cause the aerial vehicle to fly; and the second subsystem comprises a second flight module, second one or more effectors that are selectively operable to generate a second force sufficient to cause the aerial vehicle to fly; such that the first or second subsystem can be selectively used to fly the aerial vehicle not relying on the one or more effectors of the other subsystem. There is further provided a corresponding method for controlling an aerial vehicle.

22 Claims, 29 Drawing Sheets

(51) Int. Cl.
*G05D 1/00* (2006.01)
*B64D 45/00* (2006.01)

(56) References Cited

U.S. PATENT DOCUMENTS

| | | | |
|---|---|---|---|
| 2010/0044499 A1* | 2/2010 | Dragan | B64C 1/30 244/17.23 |
| 2010/0108801 A1* | 5/2010 | Olm | B64C 39/024 244/17.23 |
| 2012/0012692 A1* | 1/2012 | Kroo | B64C 3/56 244/6 |
| 2014/0339354 A1* | 11/2014 | Gaillimore | B64C 29/0066 244/12.4 |
| 2016/0211720 A1* | 7/2016 | Koegler | F16C 1/00 |
| 2016/0297520 A1* | 10/2016 | Sada-Salinas | B64C 29/0025 |
| 2017/0045892 A1* | 2/2017 | Wang | G05D 1/10 |
| 2017/0297738 A1* | 10/2017 | von Flotow | B64C 27/26 |
| 2017/0320564 A1* | 11/2017 | Kuzikov | F03D 3/061 |
| 2018/0029703 A1* | 2/2018 | Simon | B64C 29/0025 |
| 2019/0193848 A1* | 6/2019 | Kaiser | B64C 27/50 |
| 2019/0256191 A1* | 8/2019 | Suzuki | G05D 1/0072 |
| 2019/0283865 A1* | 9/2019 | Mueller | G05D 1/0072 |

* cited by examiner

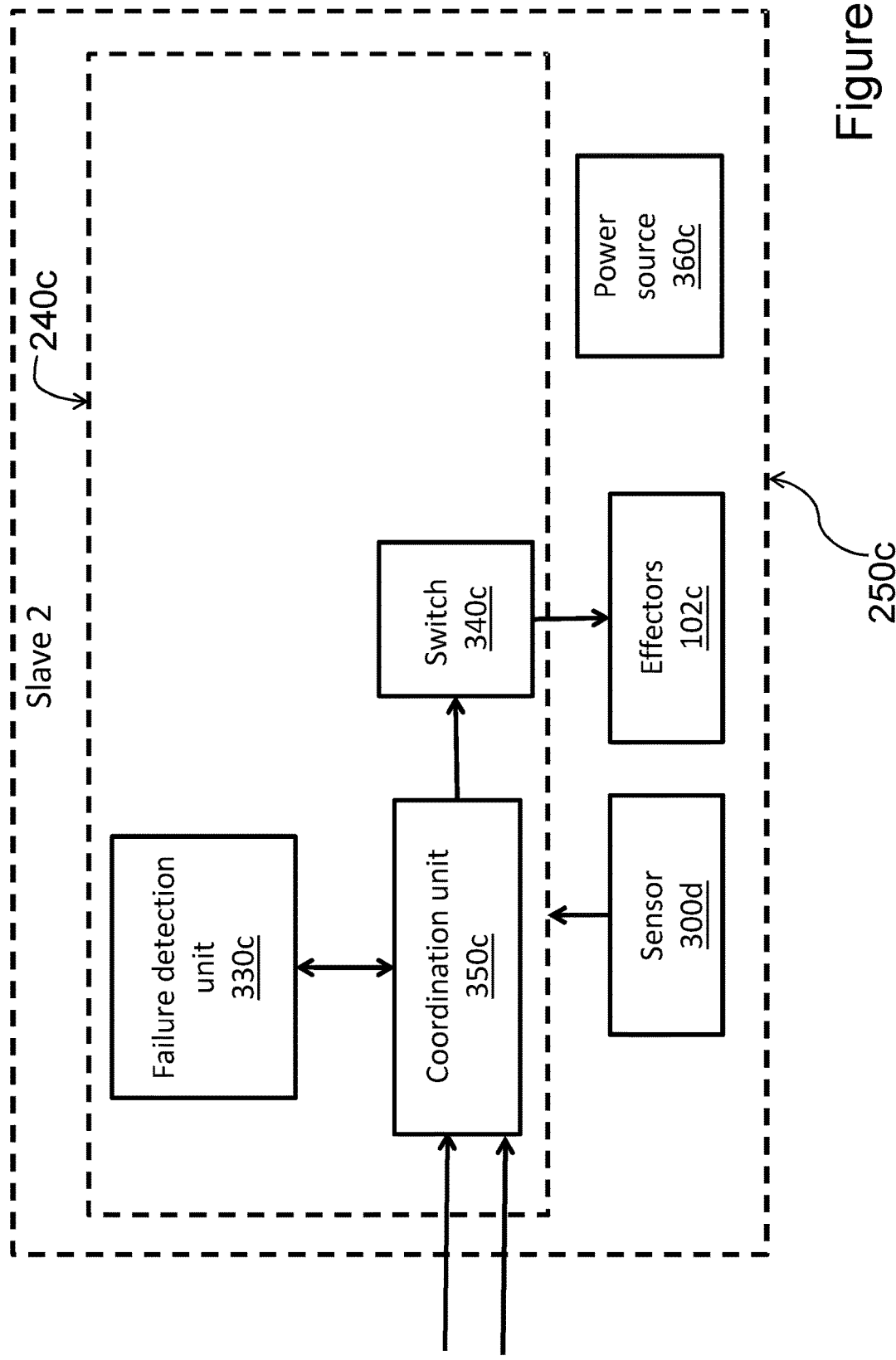

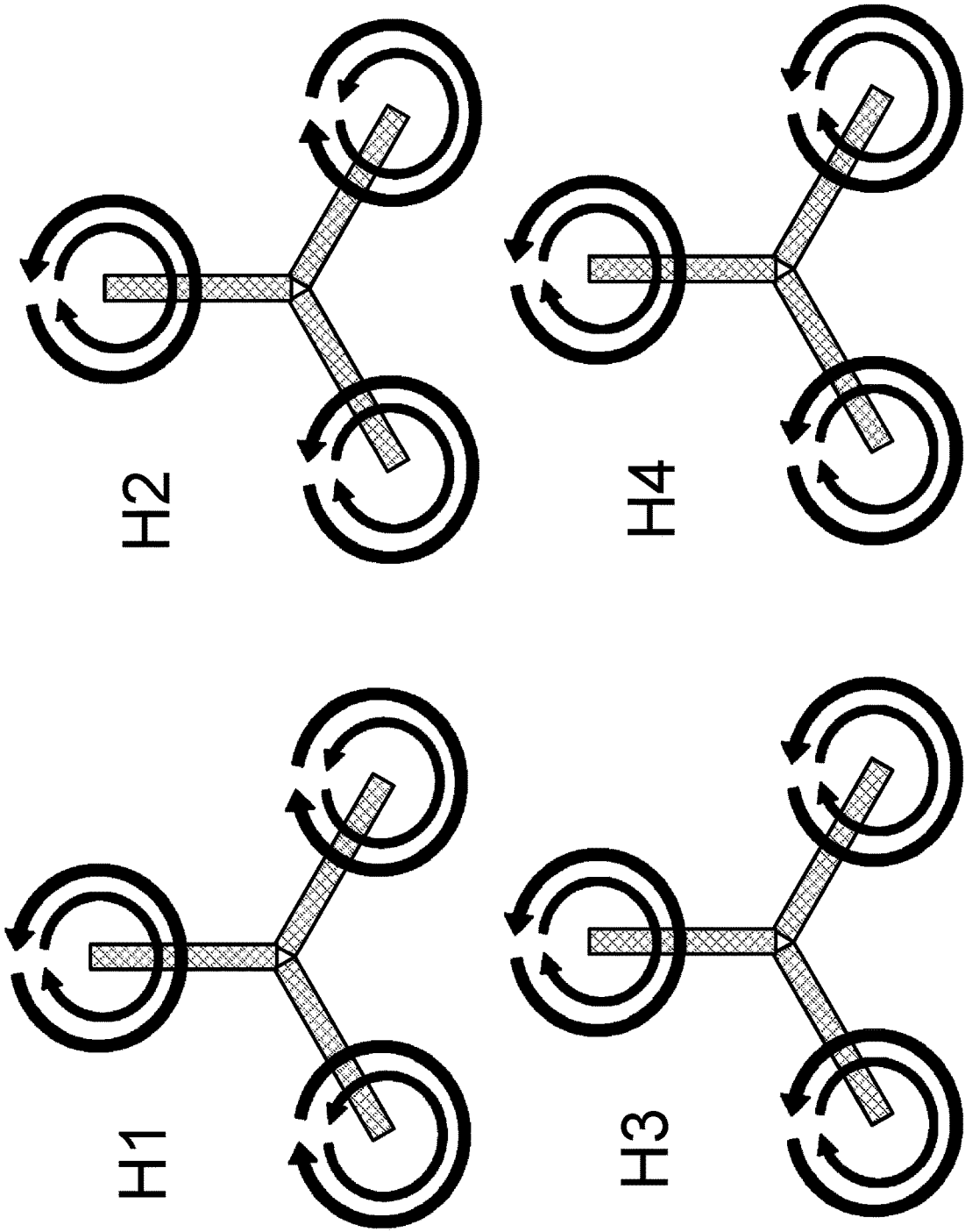

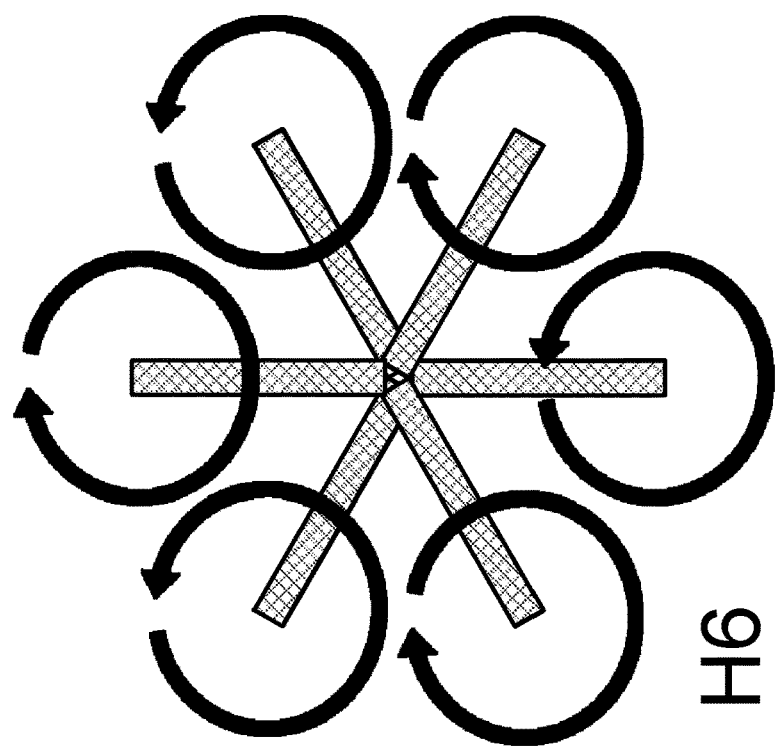
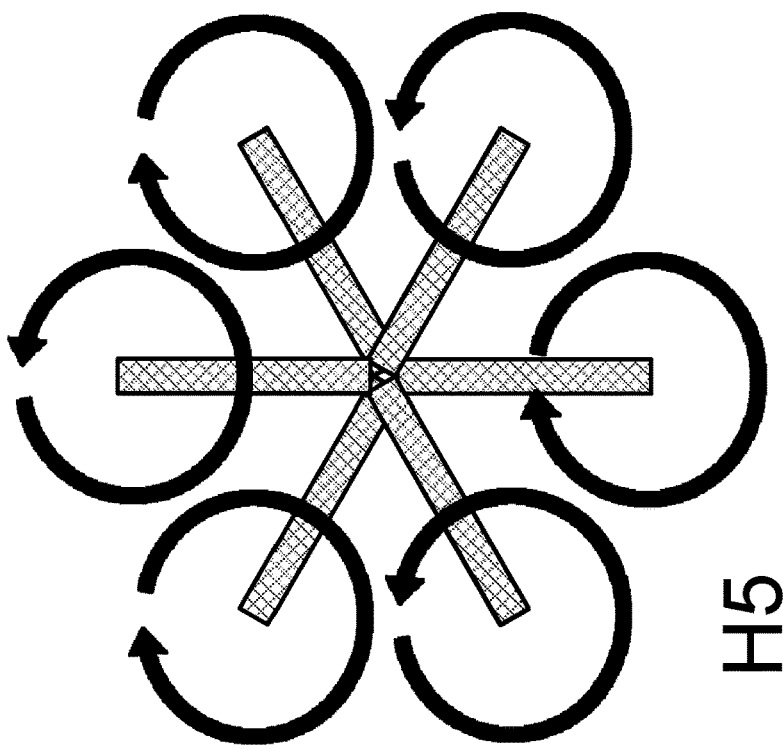
Figure 12B

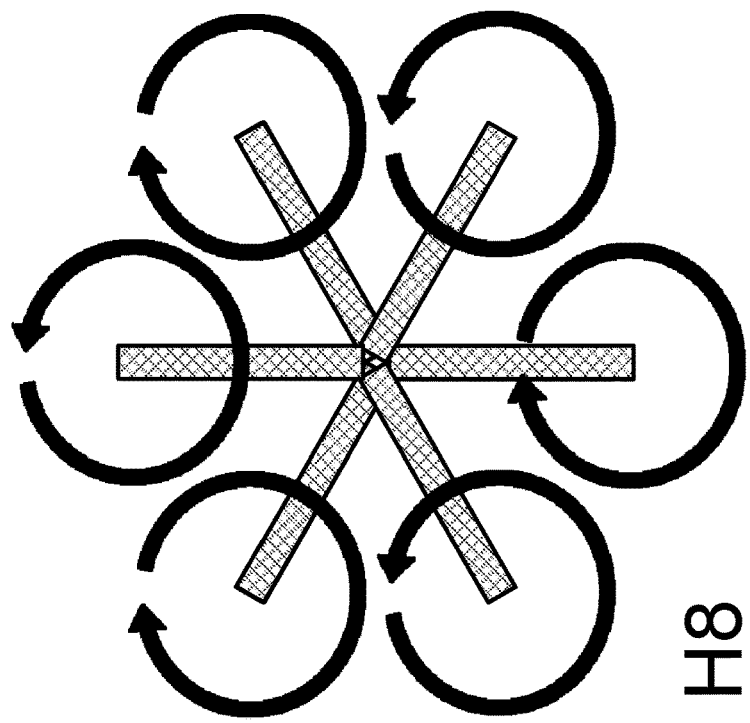
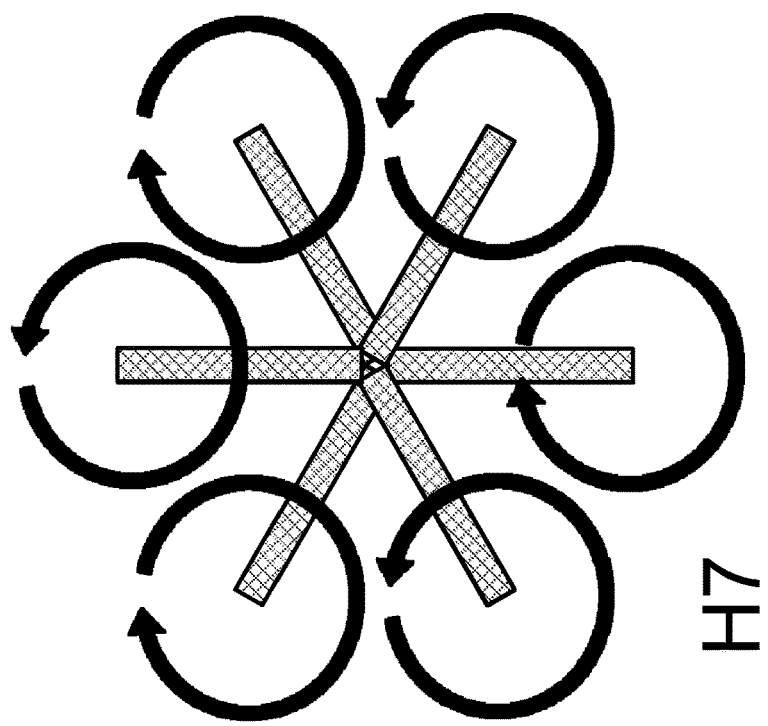
Figure 12C

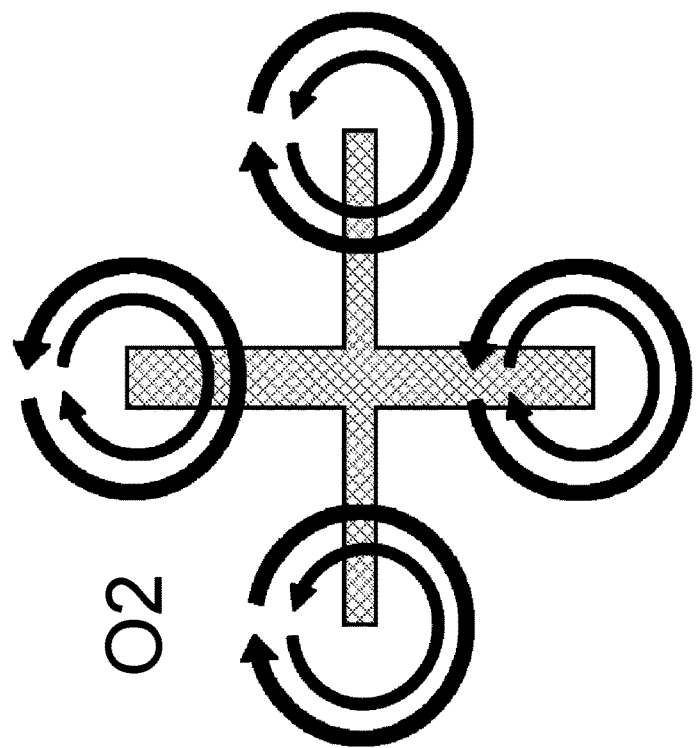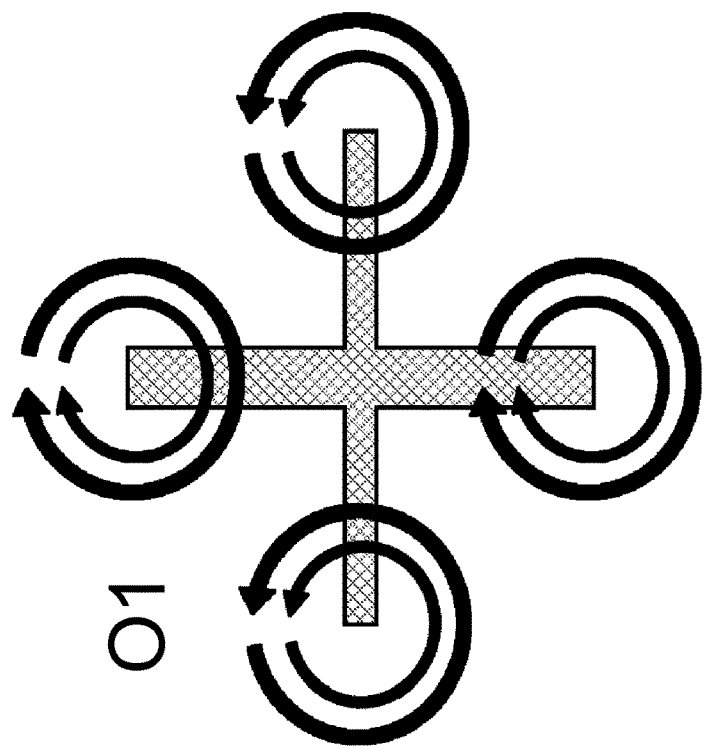
Figure 13A

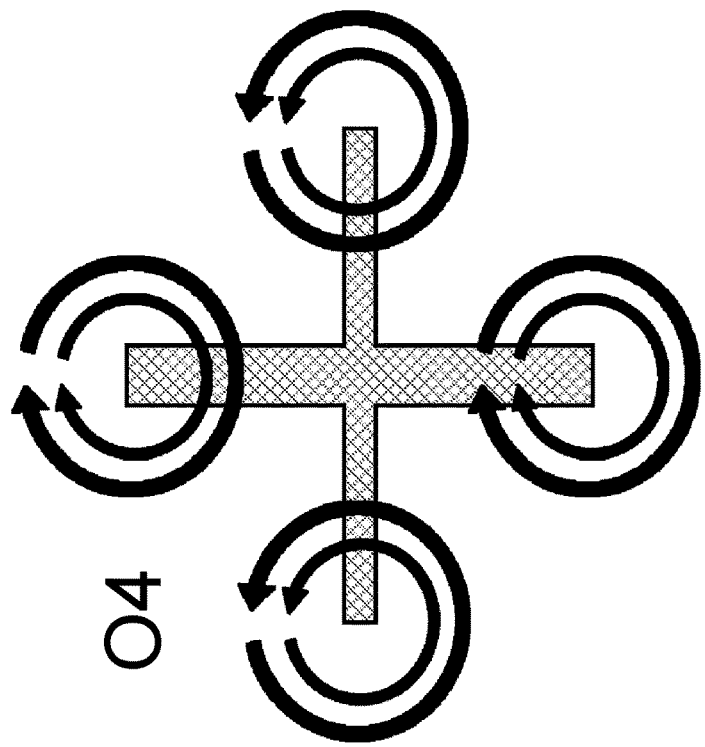
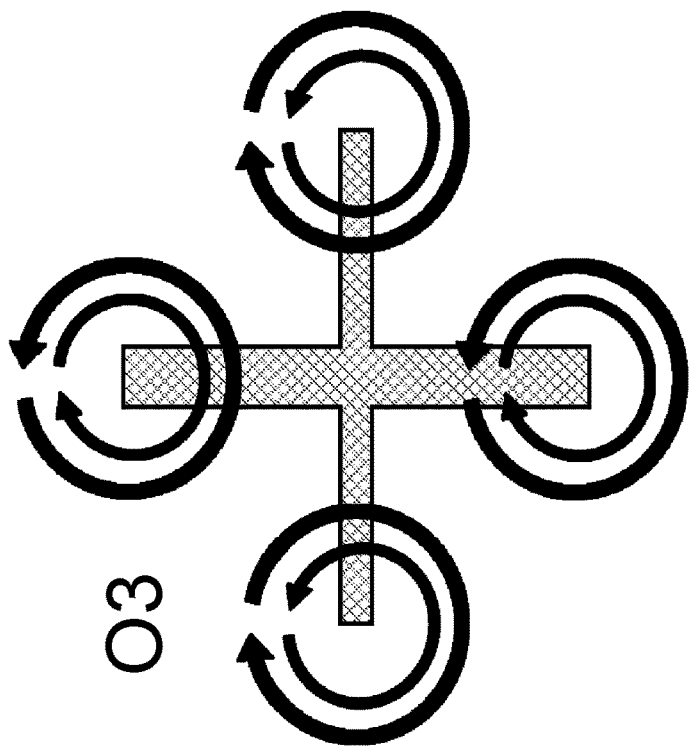
Figure 13B

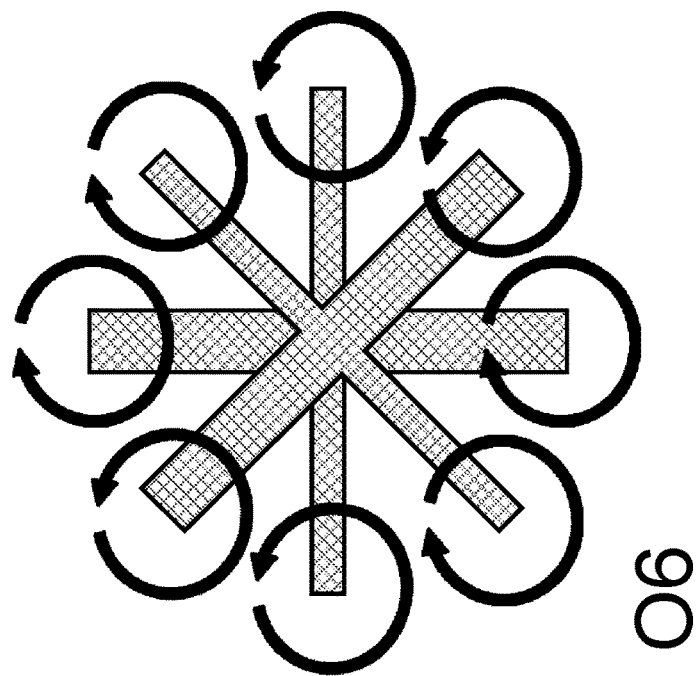
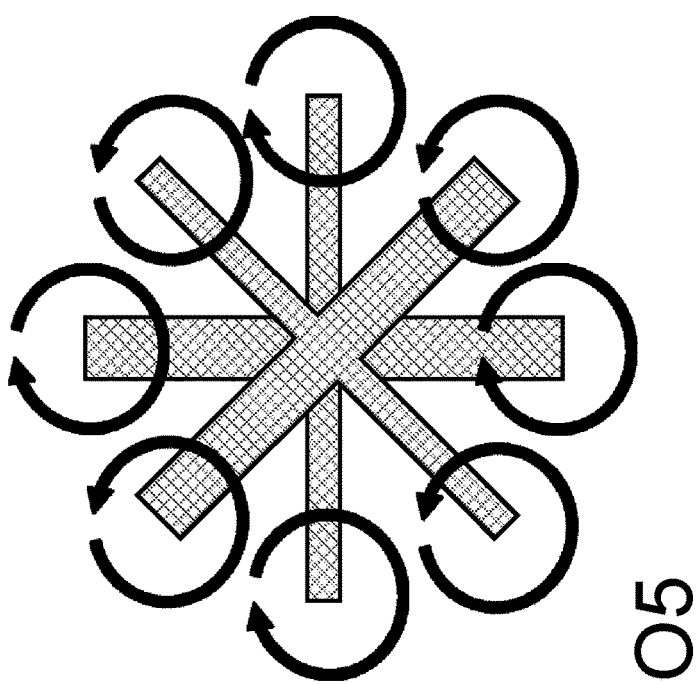
Figure 13C

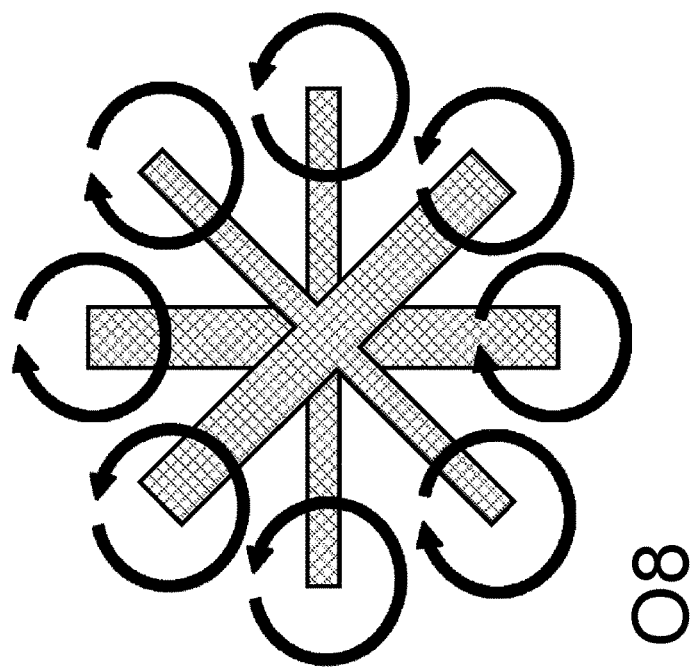
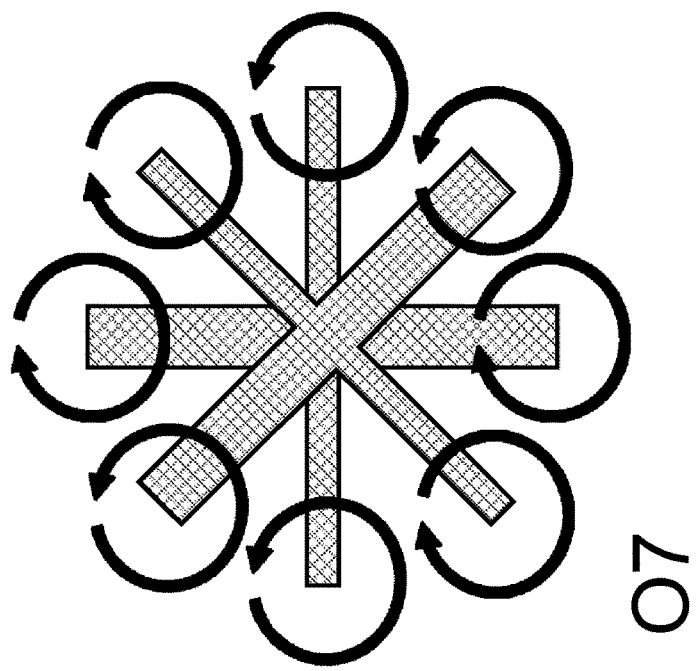
Figure 13D

AERIAL VEHICLE

FIELD OF THE INVENTION

The present invention relates to an aerial vehicle. In particular, the present invention relates to an aerial vehicle that comprises at least two subsystems, each of which can be selectively used to fly the aerial vehicle independently of the other subsystem.

BACKGROUND

Aerial vehicles, including miniature or small Unmanned Aerial Vehicles (UAV), have unique constraints with respect to their control, their safety, and their reliability.

Some aerial vehicles known in the prior art, including many multicopters, use redundant effectors. However, effector redundancy only guards against very specific types of failure, and many other single points of failure remain and multicopters frequently crash as a result.

Solutions that guard against such failures exist for manned and teleoperated aerial vehicles. Examples include triple modular redundancy (TMR) and voting systems. However, these solutions have been developed to fit the cost-risk tradeoffs found in manned and teleoperated aerial vehicles, which greatly differ from those of aerial vehicles. Moreover, most of these solutions rely on—and even encourage or mandate the use of—human pilots, which is impractical for many potential applications of aerial vehicles due to cost as well as technical reasons. For example, teleoperation by a human pilot requires a real-time, high-bandwidth data link between an aerial vehicle and the human operator, which requires hardware that is too costly, too power-hungry, and too heavy for many potential applications of aerial vehicles; which is difficult to maintain in a redundant way, hence constituting a possible single point of failure; and which increases the complexity of the overall system and is hence a likely cause of reduced safety or reliability.

Considering the relative expensiveness of some aerial vehicles (e.g., technically refined multicopters) and of some payloads (e.g., specialized sensors) and the risk of damage or injury potentially caused by aerial vehicles, it is desirable to avoid the loss of an aerial vehicle or its payload, damage to an aerial vehicle or its payload, damage to an aerial vehicle's operating environment, or injury of a person or bystander, even in case of a failure.

It is an aim of the present invention to obviate or mitigate the limitations/disadvantages of existing aerial vehicles.

SUMMARY OF THE INVENTION

According to the present invention there is provided an aerial vehicle comprising multiple subsystems which may be used to fly the aerial vehicle independently of the other subsystems. Preferably each subsystem has its own control unit. In this application the aerial vehicle of the present invention may be referred to as a 'redundant aerial vehicle'. In this application the term "redundant" means serving as a duplicate for preventing failure of an entire system (such as a aerial vehicle or spacecraft) upon failure of one or more single parts or components.

Technical advantages of certain embodiments of the present invention may allow improving or simplifying the design of existing aerial vehicles. For example, designs that may allow better tolerance of, or deriving benefits from, the specific characteristics of aerial vehicles, such as aerial vehicles' low time constants, flight dynamics, small size, or small weight. As another example, these designs may require less mass and face fewer design constraints and inherent limitations than current systems such as those that rely on effector redundancy (e.g., hexacopters and octocopters), on triple redundant/voting systems, or on the encasing of effectors (e.g., shrouds, ducted fans), or on parachutes to guard against failure. As another example, these designs may require fewer effectors to achieve a similar level of redundancy, which may result in important efficiency gains for many classes of effectors used in aerial vehicles.

Technical advantages of certain embodiments of the present invention may allow increasing the safety or reliability of existing aerial vehicles. For example, the present invention may allow minimizing or eliminating risks arising from collisions, mechanical or electrical failures, electronic malfunctions, operator errors, or adverse environmental conditions, such as wind or turbulence. The present invention may also mitigate the effects of a failure by allowing for graceful degradation of performance rather than catastrophic failure with complete loss of control.

Other technical advantages of certain embodiments of the present invention may allow aerial vehicles to largely or fully automate the detection of a failure and to largely or fully automate the response to a failure by switching into an alternate emergency control mode. This may, for example, allow the creation of aerial vehicles that can safely execute an autonomous emergency landing. As another example, this may allow creating aerial vehicles that operate in a degraded flight mode that would be difficult or impossible to control by a human pilot. In some embodiments such a degraded flight mode may use a subset of the effectors, sensors, or computational resources available on the aerial vehicle.

Yet other technical advantages of certain embodiments of the present invention may allow the use of aerial vehicles for new applications by increasing reliability, by increasing safety, by allowing the use of aerial vehicles in a wider variety of operating conditions or environments, or by allowing partial or full automation of certain tasks currently performed by experienced human pilots. The need for human pilots in particular severely limits the cost-effectiveness, possible operating conditions, and flight endurance of aerial vehicles in many applications. For example, even experienced human pilots cannot guarantee safe and efficient control in many real-world operating conditions such as wind turbulence.

Yet other technical advantages of certain embodiments of the present invention may allow it to be tailored to the specific needs of a variety of applications in a variety of contexts. Example applications include inspection and monitoring of civil infrastructure, which may require dangerous or repetitive tasks; industrial or public service applications (e.g., surveillance and monitoring of industrial sites, photogrammetry, surveying); professional aerial photography or cinematography; transport or delivery of cargo by air; stage performances including choreographies set to music and light; theater performances that require interaction with theater actors; hobbyist platforms; research platforms for groups actively researching flying platforms or using them as part of their curriculum; or defensive use with requirements such as survivability, power autonomy, detectability, or operation in extreme conditions (weather, lighting conditions, contamination). In particular, certain technical advantages allow the present invention to be equipped with a wide range of sensors. For example, infrared sensors allow embodiments for detection of patches of dry ground in orchards or for crop monitoring.

Yet other technical advantages of certain embodiments of the present invention may allow reducing costs. For example, aerial vehicles may be constructed from largely or fully identical subsystems, allowing for cost savings due to reduced design, production, testing, and other costs associated with using multiple different systems.

Further technical advantages of the present invention will be readily apparent to one skilled in the art from the following figures, descriptions, and claims. Moreover, while specific advantages have been enumerated above, various embodiments may include all, some, or none of the enumerated advantages; the listed advantages should not be considered as necessary for use of the invention.

According to a first aspect of the invention, there is provided an aerial vehicle that is operable to fly, the aerial vehicle having at least a first and second subsystem that are operably connected. The first subsystem may comprises a first flight module, and first one or more effectors that are selectively operable to generate a first force sufficient to cause the aerial vehicle to fly. The second subsystem may comprise a second flight module, and second one or more effectors that are selectively operable to generate a second force sufficient to cause the aerial vehicle to fly. The first and second subsystem may be structured, arranged, and operable such that the first or second subsystem can be selectively used to fly the aerial vehicle not relying on the one or more effectors of the other subsystem.

In some embodiments the aerial vehicle is exclusively flown with one subsystem.

In one embodiment the first subsystem further comprises first one or more sensors for sensing at least a position, orientation, or velocity of the aerial vehicle relative to an external reference frame; and the second subsystem further comprises a second one or more sensors for sensing at least a position, orientation, or velocity of the aerial vehicle relative to an external reference frame.

In one embodiment the aerial vehicle further comprises at least one sensor which is shared by the first and second subsystems, wherein the at least one sensor is configured for sensing at least a position, orientation, or velocity of the aerial vehicle relative to an external reference frame.

In one embodiment the first subsystem further comprises a first power source; and the second subsystem further comprises a second power source.

In one embodiment the aerial vehicle comprises a single power source which is shared by the first and second subsystems. In the present application if a component is said to be 'shared' by first and second subsystems, this means that said component can be used by both the first and second subsystems.

In some embodiments the first flight module comprises a first switch, a first coordination unit for controlling the first switch, a first normal operation control unit that is operable to generate control signals for operating the first and second one or more effectors, and a first emergency control unit that is operable to generate control signals for operating the first one or more effectors. In some embodiments the first switch is configured such that it can be selectively switched by the first coordination unit. In some embodiments the switch can be switched between a first position where it passes the control signals generated by the first normal operation control unit to the first one or more effectors, a second position where it passes the control signals generated by the first emergency control unit to the first one or more effectors, and a third position in which the switch is open such that no control signals are passed to the first one or more effectors. In some embodiments the second flight module comprises, a second switch, a second coordination unit for controlling the second switch, and a second emergency control unit that is operable to generate control signals for operating the second one or more effectors. In some embodiments the second switch is configured such that it can be selectively switched by the second coordination unit. In some embodiments the second switch can be switched between a first position where it passes the control signals generated by the first normal operation control unit to the second one or more effectors, a second position where it passes the control signals generated by the second emergency control unit to the second one or more effectors, and a third position in which the switch is open such that no control signals are passed to the second one or more effectors.

In some embodiments the first flight module further comprises a first failure detection unit that is configured to detect at least a failure in the first subsystem and a failure in the second subsystem. In some embodiments the first failure detection unit is connected to the first coordination unit and is configured to send a signal (e.g., a failure detection signal) to the first coordination unit upon detection of a failure in the first subsystem and to send a signal to the first coordination unit upon detection of a failure in the second subsystem. In some embodiments the first coordination unit is configured to switch the first switch to its third position upon receipt of a signal from the first failure detection unit indicating a failure in the first subsystem, such that the aerial vehicle is flown exclusively using the second subsystem. In some embodiments the first coordination unit is configured to trigger the second coordination unit to switch the second switch to its third position upon receipt of a signal from the first failure detection unit indicating a failure in the second subsystem, such that the aerial vehicle is flown exclusively using the first subsystem.

In some embodiments the second flight module further comprises a second failure detection unit that is configured to detect at least a failure in the second subsystem and a failure in the first subsystem. In some embodiments the second failure detection unit is connected to the second coordination unit and is configured to send a signal to the second coordination unit upon detection of a failure in the second subsystem and to send a signal to the second coordination unit upon detection of a failure in the first subsystem. In some embodiments the second coordination unit is configured to switch the second switch to its third position upon receipt of a signal from the second failure detection unit indicating a failure in the second subsystem, such that the aerial vehicle is flown exclusively using the first subsystem. In some embodiments the second coordination unit is configured to trigger the first coordination unit to switch the first switch to its third position upon receipt of a signal from the second failure detection unit indicating a failure in the first subsystem, such that the aerial vehicle is flown exclusively using the second subsystem.

In some embodiments the first flight module further comprises a first failure detection unit that is configured to detect at least a failure in the first subsystem. In some embodiments the second flight module further comprises a second normal operation control unit that is operable to generate control signals for operating the first and second one or more effectors. In some embodiments, when the second switch is in its second position, control signals generated by the second normal operation control unit can pass to the first and second one or more effectors. In some embodiments the first coordination unit is configured such that when it receives a signal from the first failure detection unit indicating that a failure in the first subsystem has been detected, the first coordination unit triggers the second coordination unit to switch the second switch to its second position so that control signals generated by the second normal operation control unit are passed to first and second one or more effectors, so that the first and second one or more effectors are controlled exclusively by control signals generated by the second normal operation control unit.

In some embodiments the failure in the first subsystem is a failure in at least one of said first one or more effectors and the failure in the second subsystem is a failure in at least one of said second one or more effectors.

In some embodiments the first and second subsystems are operably connected via one or more communication channels. In some embodiments the first coordination unit is configured to switch the first switch to its second position and trigger switching of the second switch to its third position when a failure in the communication channel is detected, such that the aerial vehicle is flown exclusively using the first subsystem. In some embodiments the second coordination unit is configured to switch the second switch to its second position and trigger switching of the first switch to its third position when a failure in the communication channel is detected, such that the aerial vehicle is flown exclusively using the first subsystem.

In some embodiments the first coordination unit is configured to switch the first switch to its second position and trigger switching of the second switch to its third position when the first coordination unit fails to receive any signal from the second coordination unit within a predefined period, such that the aerial vehicle is flown exclusively using the first subsystem. In some embodiments the second coordination unit is configured to switch the second switch to its second position and trigger switching of the first switch to its third position when the second coordination unit fails to receive any signal from the first coordination unit within a predefined period, such that the aerial vehicle is flown exclusively using the second subsystem.

In some embodiments the first and second subsystems are arranged in a Master-Slave configuration, wherein the first subsystem is the Master and the second subsystem is the Slave.

In an embodiment the aerial vehicle further comprises a third subsystem which may comprise a third flight module, and third one or more effectors that are selectively operable to generate a third force sufficient to cause the aerial vehicle to fly; such that the first or second or third subsystem can each be selectively used to fly the aerial vehicle not relying on the one or more effectors of the other two subsystems.

In one embodiment the third subsystem further comprises first one or more sensors for sensing at least a position, orientation, or velocity of the aerial vehicle relative to an external reference frame. In one embodiment the aerial vehicle further comprises at least one sensor which is shared by the first and second and third subsystems, wherein the at least one sensor is configured for sensing at least a position, orientation, or velocity of the aerial vehicle relative to an external reference frame.

In one embodiment the third subsystem further comprises a third power source. In another embodiment the aerial vehicle comprises a single power source which is shared by the first, second and third subsystems.

In some embodiments the aerial vehicle further comprises a third subsystem wherein the third subsystem comprises third one or more effectors that are selectively operable to generate a force sufficient to cause the aerial vehicle to fly, a third flight module comprising a third switch, and a third coordination unit for controlling the third switch. In some embodiments the third switch is configured such that it can selectively be switched by the third coordination unit. In some embodiments the third switch can be switched between a first position where it passes the control signals generated by the first normal operation control unit to the third one or more effectors or passes the control signals generated by the second emergency control unit to the third one or more effectors, a second position where it can pass the control signals generated by the emergency control unit to the third one or more effectors, and a third position in which the switch is open such that no control signals are passed to the third one or more effectors.

In some embodiments the first switch has four positions: A first position where it passes the control signals generated by the first normal operation control unit to the first one or more effectors, a second position where it passes the control signals generated by a first emergency control unit of the first subsystem to the first one or more effectors, a third position where it passes the control signals generated by a second emergency control unit of the first subsystem to the first one or more effectors, and a fourth position in which the switch is open such that no control signals are passed to the first one or more effectors.

In some embodiments the third flight module further comprises a third failure detection unit that is configured to detect at least a failure in the third subsystem. In some embodiments the third failure detection unit is connected to the third coordination unit and is configured to send a signal to the third coordination unit upon detection of a failure in the third subsystem and to send a signal to the first coordination unit upon detection of a failure in the third subsystem. In some embodiments the third coordination unit is configured to switch the third switch to its third position upon receipt of a signal from the third failure detection unit indicating a failure in the third subsystem. In some embodiments the third coordination unit is configured to trigger the first coordination unit to switch the first switch to its second position upon receipt of a signal from the third failure detection unit indicating a failure in the third subsystem, such that control signals generated by the first emergency control unit are passed to the first and second one or more effectors of the first and second subsystems respectively.

In some embodiments the first subsystem further comprises a means for comparing an output from first one or more sensors with respective predefined values and determining that a failure has occurred in the first or second subsystems if the outputs from said first one or more sensors are not equal to said respective predefined values.

In some embodiments the aerial vehicle comprises one or more sensors that are operable to sense one or more characteristics of the movement of the aerial vehicle. In some embodiments the first flight module is configured such that it can selectively send predefined control signals to the second one or more effectors that effect the aerial vehicle to move in a predefined manner. In some embodiments the first flight module is configured to receive one or more outputs from the one or more sensors and to use those received outputs to determine if the aerial vehicle has moved in said predefined manner. In some embodiments the first flight module is configured to determine that a failure has occurred in the second subsystem if the first flight module determines that the aerial vehicle has not moved in said predefined manner.

In some embodiments the aerial vehicle is configured to be modular. The vehicle may comprise at least a first module which comprises the first subsystem and second module which comprises the second subsystem. The first and second modules may comprise a connecting means which allows the first and second modules to be selectively mechanically attached to one another; the first and second modules may also be selectively detached from one another. In some embodiments the first subsystem and second subsystems each comprise a connecting means that is configured so that the first and second subsystems can be mechanically, detachably, connected.

In some embodiments the first one or more effectors comprise a propeller configured to rotate in a first direction, and the second one or more effectors comprise a propeller configured to rotate in a second direction that is opposite to the first direction.

In some embodiments the first one or more effectors are selectively operable to generate a first force sufficient to cause the aerial vehicle to fly and operable to generate a first torque, and the second one or more effectors are selectively operable to generate a second force sufficient to cause the aerial vehicle to fly and operable to generate a second torque. In some embodiments the first subsystem can be selectively used to control the orientation of the resultant direction of the first force with respect to an external reference frame without the second torque, and the second subsystem can be selectively used to control the orientation of the resultant direction of the second force with respect to an external reference frame without the first torque.

In an embodiment the aerial vehicle further comprises a support structure to which a costume can be attached. Preferably the support structure comprises arm members which extend radially from the vehicle.

In an embodiment the aerial vehicle further comprises a costume which is attached to the support structure. This embodiment is particularly useful for entertainment applications, such as stage performances. In such applications the aerial vehicle may be flow on-stage thus causing the costume to fly. If for example the costume which is attached to the support structure of the aerial vehicle is a lamp-shade, then flying the aerial vehicle will give the impression to an audience that the lamp shade is flying. It will be understood that the costume which is attached to the support structure of the aerial vehicle may take any suitable shape or configuration.

In an embodiment the aerial vehicle further comprises one or more light sources (such as LEDs) which are mounted on the vehicle and which are arranged to emit light away from the vehicle so that it is incident on said costume. In this way the light sources will light-up the costume. Preferably the light sources are positioned so that they can emit light which is incident on an inner surface of the costume.

According to a further aspect of the present invention there is provided an aerial vehicle that is operable to fly, the aerial vehicle having at least a first and second subsystem that are operably connected, wherein the first subsystem comprises, a first flight module, and first one or more effectors that are selectively operable to generate a first force sufficient to cause the aerial vehicle to fly; and the second subsystem comprises, a second flight module, and second one or more effectors that are selectively operable to generate a second force sufficient to cause the aerial vehicle to fly; and wherein the aerial vehicle further comprises at least one sensor which is shared by the first and second subsystems, wherein the at least one sensor is configured for sensing at least a position, orientation, or velocity of the aerial vehicle relative to an external reference frame; such that the first or second subsystem can be selectively used to fly the aerial vehicle not relying on the one or more effectors of the other subsystem. It should be understood that said aerial vehicle may have any of the features described in the preceding paragraphs.

In some embodiments a flight module is structured and arranged or operable to identify a failure, wherein the failure affects the torque or thrust force produced by an effector. In some embodiments a flight module, in response to identifying a failure, carries out the following steps: (1) computing an estimate of the orientation of a primary axis of an aerial vehicle with respect to a predefined reference frame, wherein said primary axis is an axis about which said aerial vehicle rotates when flying, (2) computing an estimate of the angular velocity of said aerial vehicle, (3) controlling one or more of the aerial vehicle's effectors based on said estimate of the orientation of the primary axis of said aerial vehicle with respect to said predefined reference frame and said estimate of the angular velocity of the aerial vehicle. The step of controlling one or more of the aerial vehicle's effectors may be performed such that (a) said one or more effectors collectively produce a torque along said primary axis and a torque perpendicular to said primary axis, wherein (i) the torque along said primary axis causes said aerial vehicle to rotate about said primary axis, and (ii) the torque perpendicular to said primary axis causes said aerial vehicle to move such that the orientation of said primary axis converges to a target orientation with respect to said predefined reference frame, and (b) such that said one or more effectors individually produce a thrust force along said primary axis.

In some embodiments the aerial vehicle is a redundant aerial vehicle, i.e. a vehicle that has parts that serve as a duplicate for preventing failure of the vehicle upon failure of one or more of its parts. In some embodiments the aerial vehicle comprises a first subsystem comprising a first power source, first sensors, first effectors, and a first flight module; of a second subsystem, comprising a second power source, second sensors, second effectors, and a second flight module; and of a first communication channel, structured and arranged to transmit a first signal from the first subsystem to the second subsystem. In some embodiments the first power source, first sensors, first effectors, first flight module, and first communication channel are attached to the first subsystem and the second power source, second sensors, second effectors, second flight module, and first communication channel are attached to the second subsystem, and the first and the second subsystem are rigidly attached.

In some embodiments the first signal comprises control signals generated by the first subsystem for the effectors of the second subsystem.

In some embodiments the second subsystem comprises a switch, structured and arranged to switch whether the control signals generated by the first subsystem for the effectors of the second subsystem are directed to the effectors of the second subsystem or not.

In some embodiments the aerial vehicle comprises a second communication channel, structured and arranged to transmit a second signal from the second subsystem to the first subsystem. In some embodiments this second signal comprises control signals generated by the second subsystem for the effectors of the first subsystem.

In some embodiments the second communication channel is structured and arranged to transmit a second signal from the first subsystem to the second subsystem. In some embodiments this second signal comprises control signals generated by the first subsystem for the effectors of the second subsystem. In some embodiments some or all signals sent through the first communication channel are identical to some or all signals sent through the second communication channel.

In some embodiments the aerial vehicle comprises a first and a second coordination unit. In some embodiments the first coordination unit is structured and arranged to send a first signal comprising a control signal for the effectors of the first subsystem via the first communication channel to the second coordination unit. In some embodiments the second communication channel is a redundant channel to the first communication channel, with the first coordination unit structured and arranged to send the first signal comprising a control signal for the effectors of the first subsystem via the second communication channel to the second coordination unit. In some embodiments the first coordination unit is structured and arranged to receive a second signal comprising a control signal for the effectors of the second subsystem via the second communication channel from the second coordination unit.

In some embodiments at least one of the first and at least one of the second sensors sense data representative of an internal quantity of the aerial vehicle, and at least one of the first and at least one of the second sensors sense data representative of relative position, relative orientation, or relative velocity of the aerial vehicle with respect to an external reference frame.

In some embodiments at least one of the effectors of the first subsystem and at least one of the effectors of the second subsystem each have an axis of rotation fixed with respect to the aerial vehicle and are each structured and arranged to simultaneously produce both a torque and a thrust force.

In some embodiments each of the first and the second subsystems is self-sufficient.

In some embodiments each of the first and the second subsystems is a multicopter.

In some embodiments the first flight module further comprises a first and a second control unit, and the second flight module further comprises a third control unit.

In some embodiments the first control unit is a normal operation control unit and structured and arranged to provide control signals for the effectors of the first subsystem and for the effectors of the second subsystem; the second control unit is a first emergency control unit and structured and arranged to provide control signals for the effectors of the first subsystem; and the third control unit is a second emergency control unit structured and arranged to provide control signals for the effectors of the second subsystem.

In some embodiments the first flight module further comprises a first emergency control unit, structured and arranged to control the orientation of a primary direction with respect to a predefined reference frame using the first subsystem's effectors. In some embodiments the second flight module further comprises a second emergency control unit, structured and arranged to control the orientation of a secondary direction with respect to a predefined reference frame using the second subsystem's effectors. In some embodiments the primary direction is a resultant direction of thrust of the first subsystem's effectors and the secondary direction is a resultant direction of thrust of the second subsystem's effectors. In some embodiments the primary direction is equivalent to the secondary direction.

In some embodiments each subsystem's effectors are structured and arranged to collectively produce a torque that causes the aerial vehicle to rotate when hovering.

In some embodiments the first subsystem further comprises four effectors, wherein two of said first subsystem's effectors are structured and arranged to rotate with a first handedness about their respective thrust forces, and two of said first subsystem's effectors are structured and arranged to rotate with a second handedness, different from the first, about their respective thrust forces, and the second subsystem further comprises four effectors, wherein two of said second subsystem's effectors are structured and arranged to rotate with a first handedness about their respective thrust forces, and two of said second subsystem's effectors are structured and arranged to rotate with a second handedness, different from the first, about their respective thrust forces.

In some embodiments at least one of the first sensors is one of a MEMS gyroscope, a MEMS accelerometer, a piezoelectric gyroscope, and piezoelectric accelerometer. In some embodiments at least one of the second sensors is one of a MEMS gyroscope, a MEMS accelerometer, a piezoelectric gyroscope, and piezoelectric accelerometer.

In some embodiments at least two of the first and second sensors are of the same type.

In some embodiments the aerial vehicle comprises a first failure detection unit, structured and arranged to detect a failure in the first subsystem. In some embodiments the aerial vehicle comprises a second failure detection unit, structured and arranged to detect a failure in the second subsystem. In some embodiments the first failure detection unit is structured and arranged to detect a failure in the first subsystem and in the second subsystem. In an embodiment the failure detection unit has access to signals from the same subsystem or another subsystem. These may include signals of sensors (e.g., sensor readings), signals of a power unit (e.g., the battery load, the battery charge, error codes), signals representative of operation of the effectors (e.g., rotations per minute or motor current as may be provided by an effector or its motor controller), and a heartbeat signal generated by the normal operation control unit. In some embodiments signals may be forwarded via the subsystems' coordination units, switch, and communication channel. The failure detection unit may then compare these signals to what may be expected during nominal operation (e.g., to a predefined sensor readings range, expected values for motor currents in dependence of control inputs or operating state, a model of motor response, statistics of past signals).

According to a further aspect of the present invention there is provided a method for controlling an aerial vehicle, where the aerial vehicle is an aerial vehicle according to any one of the above-mentioned aerial vehicles, the method comprising the steps of (1) computing in the first subsystem, a first set of control signals for effectors of the first and second subsystems;

(2) communicating the first set of control signals to the effector's second subsystem, (3) detecting a failure in the first or second subsystem, (4) disabling the effectors of the subsystem in which a failure was detected, so that the aerial vehicle is flown using only the effectors of the other subsystem.

The method may comprise disabling the subsystem in which a failure was detected, so that the aerial vehicle is flown using only the other subsystem. In this embodiment disabling the subsystem in which a failure was detected will disable the effectors of the subsystem, and will also preferably disable all of the other components exclusive to said subsystem.

The method may comprise the step of computing a second set of control signals in the subsystem which did not suffer the failure, which control exclusively the effectors of said subsystem.

According to another aspect of the present invention, there is provided a method for an aerial vehicle, comprising the steps of (1) computing a first set of effector control signals in a first flight module of a first self-contained subsystem, (2) communicating the first set of effector control signals to a second flight module of a second self-contained subsystem, (3) detecting a failure in the first or in the second subsystem, (4) disabling the subsystem affected by the failure, (5) computing a second set of effector control signals in the subsystem not affected by the failure for the subsystem not affected by the failure that controls the orientation of the resultant direction of thrust of the effectors of the subsystem not affected by the failure.

In some embodiments the orientation of the resultant direction of thrust of the effectors of the subsystem not affected by the failure is adjusted so that the aerial vehicle lands autonomously.

In some embodiments the first one or more effectors of each subsystem are structured and arranged to be operable to (a) collectively produce a torque along a primary axis and a torque perpendicular to the primary axis, wherein (i) the primary axis is a direction about which the aerial vehicle rotates when flying under the control of an emergency control unit, (ii) the torque along said primary axis causes the aerial vehicle to rotate about the primary axis, and (iii) the torque perpendicular to the primary axis causes the aerial vehicle to move such that the orientation of the primary axis converges to a target orientation with respect to a predefined reference frame, and (b) individually produce a thrust force along the primary axis.

In some embodiments each subsystem is structured and arranged to disable another subsystem.

In some embodiments each subsystem is structured and arranged fly the aerial vehicle without another subsystem's propellers, flaps, or airfoils. In other words, each subsystem is structured and arranged fly the aerial vehicle using only propellers, flaps, or airfoils, belonging exclusively to that subsystem.

In the present invention/application:

Aerial Vehicles

Preferably, aerial vehicles are flying or hover-capable, small, light, unmanned, heavier-than air aerial vehicles with multiple effectors. Examples include miniature UAV or Small UAV (SUAV), small enough to be man-portable. Typical sizes range from 50 cm to 3 m. Typical weights range from 500 g to 35 kg.

An aerial vehicle comprises one power source, one sensor, one flight module, and one effector. In some embodiments aerial vehicles comprise multiple power sources, sensors, flight modules, or effectors.

Subsystem

A subsystem may be a subset of an aerial vehicle's power source(s), sensor(s), flight module(s), and effector(s). In one embodiment the aerial vehicle comprises a plurality of subsets each subset comprising at least one power source, at least one sensor, at least one flight module, and at least one effector. In one embodiment each of the plurality of subsets defines a different subsystem.

In some embodiments, the aerial vehicle comprises a plurality of subsystems, each subsystem having at least one power source, at least one sensor, at least one flight module, and at least one effector. In one embodiment the aerial vehicle comprises at least two subsystems. In some embodiments each of the subsystems may have every single component required to fly the aerial vehicle so that each subsystem can be selectively used to fly the aerial vehicle independently of the other subsystems. In some embodiments each of the subsystems may have every single component required for emergency operation.

In other embodiments, the aerial vehicle comprises a plurality of subsystems, each subsystem having at least one flight module and at least one effector. Optionally in this embodiment the plurality of subsystems may share at least one sensor or may share at least one power source.

In other embodiments, the aerial vehicle comprises a plurality of subsystems, each subsystem having at least one flight module and at least one effector and at least one sensor. Optionally in this embodiment the plurality of subsystems may share at least one power source.

In other embodiments, the aerial vehicle comprises a plurality of subsystems, each subsystem having at least one flight module and at least one effector and at least one power source. Optionally in this embodiment the plurality of subsystems may share at least one sensor.

In some embodiments the subsystems are isolated from each other. For example, in some embodiments subsystems may be electromagnetically shielded; may be physically located on different printed circuit boards (PCBs); may be electrically isolated; may be in separate housings; may be mounted on different parts of a structural element; or may be attaching to different parts of a payload.

In some embodiments a first subsystem (sometimes: Master) and a second subsystem (sometimes: Slave) are used.

Master/Slave Subsystem

A Master subsystem is a subsystem that is used during normal flight operation (i.e., flight operation in the absence of a failure). In some embodiments a Master subsystem provides control signals for all of an aerial vehicle's effectors. In some embodiments a first subsystem is configured as the Master with a corresponding Master flight module, and other subsystem(s) are configured as Slave(s) with corresponding Slave flight module(s).

A Slave subsystem may be used during emergency flight operation (i.e., flight operation in the presence of a failure). In some embodiments a Slave subsystem is used during normal operation. Such a configuration may, for example, be achieved by storing the configuration in a memory unit; through a change in electrical circuitry by means of switches, jumpers, or solder bridges; or through the use of sensor signals at start-up that allow the distinction of the two or more subsystems such as acceleration sensors providing orientation information. In some embodiments a Slave subsystem or parts of a Slave subsystem may be used during normal flight operation.

In some embodiments of the present invention the aerial vehicle comprises the following duplicate components (i.e., at least one component per subsystem): at least two effectors, at least two power sources, at least two flight modules, at least two sensors, and at least two communications channels. For example, in one embodiment the aerial vehicle may comprise:

a first subsystem having at least one effector+a second subsystem having at least one effector, a first subsystem having at least one power source+a second subsystem having at least one power source, a first subsystem having at least one flight module+a second subsystem having at least one flight module, a first subsystem having at least one sensor+a second subsystem having at least one sensor, and a first subsystem having at least one communication channel+a second subsystem having at least one communication channel.

In some embodiments a first subsystem comprises two, three, or four effectors. In some embodiments a second subsystem comprises two, three, or four effectors.

In some embodiments at least one effector, power source, flight module, sensor, or communication channel may be shared by two or more different subsystems. In the present application if a component is said to be 'shared' by two or more subsystems, said component can be used by the two or more subsystems; for example, this includes that the component can be used by two or more subsystems at the same time, or that the component can be exclusively used by one of two or more subsystems as needed (in the latter case the two or more subsystems may consecutively use said component):

For example, the aerial vehicle may comprise: a first subsystem having at least one first effector, at least one first flight module, at least one first sensor, and at least one first communication channel; and a second subsystem having at least one second effector, at least one second flight module, at least one second sensor, and at least one second communication channel; and the aerial vehicle may comprise a single power source which powers both the first and second subsystem such that the first and second subsystem share the single power source.

In one embodiment the power source is connected exclusively to either the first or second subsystems; in this embodiment the power source can be selectively connected to either the first or second subsystems so that the power source powers one of the subsystems only. Also the single power source can be switched from being connected to the first subsystem to being connected to the second subsystem and vice versa.

In some embodiments the single power source may be a redundant power source or a dual power source (e.g., comprising two separate power sources that appear as a single power source to the outside). An example of such a configuration are two batteries connected to the same output in parallel, with each battery connected through a diode in series. A second example is an electric generator with a battery configured as an uninterruptible power supply.

In the present application when the first and second subsystems share a power source, this means that the first and second subsystems simultaneously receive power from the power source or that either the first or second subsystem can exclusively receive power from the power source. The power source can be selectively switched to provide power exclusively to either the first or the second subsystem.

In another example, the aerial vehicle may comprise: a first subsystem having at least one first effector, at least one first flight module, at least one first sensor, and at least one first power source; and a second subsystem having at least one second effector, at least one second flight module, at least one second sensor, and at least one second power source; and the aerial vehicle may comprise a single communication channel which is connected to both the first and second subsystems, such that the first and second subsystem share the single communication channel.

In the present application when the first and second subsystems share a single communication channel, this means that the first and second subsystems are simultaneously connected to the single communication channel and can simultaneously communication over the single communication channel or that either the first or second subsystem can exclusively communicate over the single communication channel. In the later case, in one embodiment, the first or the second subsystem can be selectively connected to the single communication channel so that the subsystem can exclusively communicate messages over the single communication channel to the other subsystem.

In another embodiment the first and second subsystems of an aerial vehicle may share a sensor. This means that each of the subsystems can receive data (such as sensor readings) from the sensor. Each of the subsystems may process or use the data they received from the shared sensor.

In another example, the aerial vehicle may comprise: a first subsystem having at least a first effector, at least a first flight module, and at least a first sensor; and a second subsystem having at least one second effector, at least one second flight module, and at least one second sensor; and wherein the aerial vehicle comprises at least one communication channel which is connected to both the first and second subsystem, a single power source which is connected to both the first and second subsystem, and at least a third sensor which is connected to both the first and second subsystem, such that the communication channel, single power source, and third sensor are shared by the first and the second subsystems. In the present application when the first and second subsystems share a communication channel, single power source, and third sensor, this means that the first and second subsystems are simultaneously connected to the communication channel, single power source, and third sensor and can simultaneously communication over the communication channel, simultaneously receive power from the single power source, and can simultaneously communicate with the third sensor or that either the first or second subsystem is exclusively connected to the communication channel, single power source, and third sensor so that one of the subsystems can communicate to the other subsystem over the communication channel, receive power from the single power source, and communicate with the third sensor, exclusively of the other subsystem.

In some embodiments a sensor may be a redundant or combined sensor. An example of such a configuration is a dual camera system with two or more cameras. Another example is a combination of a sonar and an infrared sensor used in tandem such that each sensor compensates for deficiencies in the other. Another example is an IMU-enabled GPS device. In some embodiments a sensor may be one or a combination of one or more of the following: An RGB camera, a depth sensor, a multi-array microphone, or a light field sensor.

In some embodiments a subsystem is structured and arranged to operate an aerial vehicle at reduced flight performance. In some embodiments a subsystem is structured and arranged to operate the aerial vehicle with only 80%, 50%, or 20% of its nominal thrust, lift, or torque (cf. derivation below). In some embodiments a subsystem is structured and arranged to operate the aerial vehicle without using one of the aerial vehicle's effectors; without using one of the aerial vehicle's sensors; without using one of the aerial vehicle's power sources; or without using one of the aerial vehicle's flight modules.

Disassembly of Subsystem

In another embodiment the aerial vehicle may comprise a plurality of subsystems which may be selectively attached or detached from one another. For example, in the case of an embodiment of a quadrocopter, detachment may result in two multicopter subsystems, each comprising two effectors. For example the aerial vehicle may be configured to be modular (i.e., comprising a plurality of modules). The aerial vehicle may further comprise attachment means which allows the plurality of modules to be removably attached to one another. For example the aerial vehicle may comprise a first module which comprise a first subsystem and a second module which comprises a second subsystem; the first and second modules may be attached to one another; for example the first module may comprise a first subsystem which comprises two effectors, the second module may comprise a second subsystem which comprises another two effectors; the first and second modules may be attached to one another to form a quadrocopter; or the first and second modules may be attached to one another to provide two multicopters (i.e. two multicopters each having two effectors). This may, for example, be useful for easy storage, transport, or easy replacement of a broken subsystem.

Self-Sufficient Subsystem

A self-sufficient subsystem is an aerial vehicle. In some embodiments a self-sufficient subsystem is hover-capable. In some embodiments a self-sufficient subsystem is capable of degraded flight.

Degraded Flight

Degraded flight is reduced flight performance following a failure. Degraded flight may result in reduced control authority. For example, an overheated battery may result in less power available to effectors. As another example, failure of a first subsystem may require flight with a second subsystem that may only have half of the aerial vehicle's effectors. Degraded flight may result in reduced degrees of freedom. For example, a quadrocopter or hexacopter with one or more broken effector(s) may no longer be fully controllable in yaw. Degraded flight may make control of the aerial vehicle too challenging for a human pilot. For example, an aerial vehicle that becomes only partially controllable in yaw may be too complex to be flown by hand. As another example, time constants of an aerial vehicle in degraded flight may be too small for human reaction time. Degraded flight may require different control laws. For example, an aerial vehicle with an altered weight distribution (e.g., as a result of a collision or another failure) may require different motor gains to achieve stable flight. As another example, a partially broken effector may be less efficient and hence require a different control input to achieve a similar level of thrust. Degraded flight may use a subset of the effectors, sensors, or computational resources available on the aerial vehicle.

Hover, Reference Frame

Hover-capable aerial vehicles are able to approximately attain and maintain a target position at a point in space relative to a reference frame external to the aerial vehicle. The location of the aerial vehicle in space may be described by a position and translational velocity, typically defined in a predefined reference frame and referred to some fixed point. Examples of a predefined reference frame include an 'East-North-Up' frame, with the origin fixed to some landmark. The motion of an aerial vehicle is usually described by referring to an inertial reference frame.

Autonomous

In some embodiments aerial vehicles are autonomous. In some embodiments aerial vehicles can autonomously stabilize their position or attitude around hover. In some embodiments aerial vehicles can autonomously stabilize their position or attitude. In some embodiments aerial vehicles can autonomously follow a trajectory. In some embodiments aerial vehicles can autonomously navigate from a first to a second waypoint. In some embodiments aerial vehicles can autonomously avoid an obstacle. In some embodiments aerial vehicles can autonomously detect a failure. In some embodiments aerial vehicles can autonomously respond to a failure. In some embodiments aerial vehicles can autonomously navigate. In some embodiments aerial vehicles can autonomously perform a pre-determined maneuver. In some embodiments aerial vehicles can operate autonomously using an emergency control unit.

In some embodiments aerial vehicles perform some of their functions autonomously while others are performed under human control. For example, a human operator may determine the activation or deactivation of an emergency mode. As another example, the most suitable operating mode of an aerial vehicle and its coordination unit(s) or emergency control unit(s) may be determined by a human operator (e.g., by pressing one of a series of emergency buttons on a ground control station), by the aerial vehicle (e.g., depending on its failure state), or by a combination of the two (e.g., depending on the failure state of all subsystems and the human operator's commands). Examples of typical operating modes include immediate and complete power-off of one or all subsystems; stop at current position and reduce altitude to land; return to home and initiate landing at home position; and stop and hover at current position.

Multicopters

Multicopters are generally not only flying, but also hover-capable aerial vehicles with at least two rotors, each of them driving at least one propeller. The unit formed by a rotor and propeller or propellers is called in the following effector. Typical arrangements of multicopters use four, six or eight effectors, which are commonly referred to as quadrocopters, hexacopters, and octocopters, respectively, and are well known in the prior art and widely used. Many other variations, including 16 and more effectors, and arranged in many configurations (e.g., with aligned as well as inclined or inverted or dihedral axes; arranged individually or counter-rotating; exposed or encased in ducts or protective shrouds), are in use. Some variations include aerial vehicles that can switch from a multicopter configuration to a wing configuration. This allows combining the benefits of multicopters (e.g., hovering, high agility, etc. suitable for takeoff, landing, task performance, etc.) with those of fixed wing airplanes (e.g., efficient forward flight, high glide ratio, etc. suitable to cover large distances or achieve high speeds).

For reasons of mechanical simplicity, multicopters typically use fixed-pitch blades whose propeller pitches do not vary during rotation. This mechanical simplicity and the resulting ease of construction combined with high agility and the ability to hover make multicopters the platform of choice for many aerial applications.

In some embodiments a redundant aerial vehicle consists of two multicopter subsystems. For example, a redundant quadrocopter may consist of two multicopter subsystems, each comprising two effectors. As a further example, a redundant hexacopter may consist of two multicopter subsystems, each comprising three effectors (i.e., each subsystem is a tricopter). As a further example, a redundant octocopter may consist of two multicopter subsystems, each comprising four effectors, such that each subsystem is a quadrocopter. In some embodiments a redundant multicopter consists of three subsystems. For example, a redundant hexacopter may consist of three multicopter subsystems, each comprising two effectors. As will be apparent to a person skilled in the arts and given the benefits of the present invention many other combinations are possible.

Effectors

In the present invention the aerial vehicle may be equipped with effectors. An effector is any means which is operable to achieve or direct flight. The effectors may take any suitable configuration. Examples of an effector include a fixed-pitch propeller with a motor and a linear or rotary actuator controlling the pivot angle of a hinged airfoil redirecting airflow (e.g., an aileron, a rudder, a flap, etc.). In some embodiments mechanical linkages may be used to integrate multiple effectors. Common examples include a swash plate (3 effectors) and a swash plate-controlled coaxial two-propeller setup (4 effectors). In some embodiments oscillating control signals may be used to create multiple effectors from a limited number of mechanical degrees of freedom. Examples include varying the amplitude and phase of a sinusoidal control signal with respect to the rotation of a rotor to create an under actuated, swash-plateless propeller with thrust, roll, and pitch authority (3 effectors) and the control method described in the present invention to control thrust, roll, and pitch (3 effectors).

In some embodiments effectors produce both a thrust force and a torque acting on the aerial vehicle. Such effectors are typically characterized by having a characteristic drive axis (typically identical to the direction of thrust force) that is fixed with respect to the body of the aerial vehicle.

Aerial vehicles often use brushless motors for thrust generation, which typically use a motor controller to convert this single variable into amplitude, waveform, and frequency required to achieve a desired rotor speed. Such motor controllers typically contain 3 bidirectional outputs (i.e. frequency controlled three phase output), which are controlled by a logic circuit, but can have more complex implementations involving additional sensors and electronics to achieve high performance or other desirable properties.

In some embodiments the aerial vehicle's effector belongs to the group of effectors that generate or redirect airflow. In some embodiments the aerial vehicle's effector belongs to the group of effectors that actuate joints. In some embodiments the aerial vehicle's effector belongs to the group of rotary or linear actuators.

In some embodiments an aerial vehicle's effector is rigidly attached to a body of the aerial vehicle; equipped with fixed-pitch propeller blades whose rotor pitch does not vary as the blades rotate; operable to produce both a torque and a thrust force; or structured and arranged to contribute a thrust or lift force that can cause the aerial vehicle to fly.

Power Source(s)

In the present invention the aerial vehicle may comprise one or more power sources. The power source(s) may take any suitable configuration. Examples for power sources include batteries, accumulators, internal combustion engines, turbines, and power capacitors. Further examples include other electric and non-electric power sources. In some embodiments each subsystem has its own power source. In some embodiments a power source supplies power to the sensor(s), effector(s), and flight module(s) of the same subsystem. In some embodiments a power source also supplies power to components of another subsystem. For example, it may supply power to another subsystem's effector(s) during emergency operation. In some embodiments a power source provides signals to a failure detection unit. For example, a battery may provide information on its level of charge or its operating temperature.

Sensor(s)

In the present invention the aerial vehicle may further comprise one or more sensors, which may be structured and arranged to (a) provide data representative of a subsystem's component (e.g., an effector, a power source), or (b) provide data representative of the motion of one or more subsystems, or (c) provide data representative of the motion of the redundant aerial vehicle. A sensor may generate one or multiple sensor signals.

Interoceptive sensors sense an internal quantity of a system. Examples include, a heat sensor sensing the temperature of a motor controller and a current sensor detecting the electric current in a wire. This type of sensor can be particularly useful to detect failures.

Exteroceptive sensors sense a state (i.e., a relative position, relative orientation, or relative velocity) of a system with respect to an external reference frame. Examples include a vision sensor sensing the distance to an obstacle and a magnetometer sensing the direction of the Magnetic North Pole. This type of sensor can be particularly useful for autonomous flight.

In some embodiments micro-electro-mechanical systems (MEMS) or piezoelectric systems are used to allow achieving the redundancy and operating characteristics outlined in the present invention. Examples of such micro-sensors that can be usefully employed with the present invention include MEMS gyroscopes, MEMS accelerometers, piezoelectric gyroscopes, and piezoelectric accelerometers. In some embodiments the use of micro-sensors allows using one or more inertial measurement units (IMUs), which each combine multiple gyroscopes and accelerometers or use multiple-axis gyroscopes and accelerometers, in each subsystem. In some embodiments the use of micro-sensors enables to achieve specific characteristics for a redundant aerial vehicle. For example, a MEMS gyroscope may be used to monitor an aerial vehicle's attitude and to allow a failure detection unit to trigger an emergency control mode if the aerial vehicle's if an attitude threshold is exceeded. As another example, a MEMS gyroscope may be used to control a small aerial vehicle around hover in spite of its low time constant. MEMS sensors have advantages, including for example their lower weight and lower power consumption compared to traditional sensors, which may be a precondition to equip aerial vehicles with multiple subsystems.

In some embodiments each subsystem uses two or more sensors of the same type. In some embodiments sensors of the same type are sensors that measure the same quantity. In some embodiments sensors of the same type are sensors that are the same model. In some embodiments sensors of the same type are sensors that are the same make. In some embodiments sensors of the same type are sensors that provide data representative of the same state or sub-state of the aerial vehicle.

In some embodiments the sensor belongs to the group of inertial sensors, distance sensors, or rate sensors. In some embodiments the sensor belongs to the group of accelerometers, gyroscopes, magnetometers, cameras, optical flow sensors, laser or sonar range finders, radar, barometers, thermometers, hygrometers, bumpers, chemical sensors, electromagnetic sensors, air flow sensors or relative airspeed sensors, ultra sound sensors, microphones, radio sensors, or infrared sensors. In some embodiments the sensor belongs to the group of height, distance, or range sensors. In some embodiments the sensor belongs to the group of relative or absolute position sensors. In some embodiments the sensor belongs to the group of positioning sensors. In some embodiments the sensor is a receiver for a signal (e.g., a global navigation satellite system (GNSS) receiver, a radio frequency receiver, or an infrared receiver). In some embodiments the sensor belongs to the group of GNSS-type sensors, visual odometry/SLAM, retro-reflective positioning systems, laser range finders, Wi-Fi positioning systems, radio-frequency positioning systems, barometric altimeters and variometers, or ultra-sound sensors. In some embodiments the sensor is a MEMS sensor.

Flight Module

In the present invention the aerial vehicle may comprise one or more flight modules. A flight module is an electronic component (typically a printed circuit board (PCB)) comprising a processor, a memory, and a communication interface to receive signals from sensors and to output signals to effectors or other flight modules. In some embodiments a flight module includes a control unit (e.g., normal operation control unit, emergency control unit, etc.), a coordination unit, and a failure detection unit. In some embodiments a single flight module may comprise multiple normal operation control units, emergency control units, coordination units, or failure detection units. In some embodiments multiple flight modules, each with their own processor, memory, and communication interface, may be located on a single PCB (e.g., to simplify manufacturing or to achieve a desired electrical behavior). In some embodiments a flight module's processor, memory, and communication interface are distributed across multiple PCBs (e.g., to achieve a certain weight distribution or performance characteristics).

Coordination Unit(s)/Coordination Signal(s)

In the present invention said one or more coordination units are used to coordinate the operation of multiple subsystems.

A coordination unit may be configured to receive control signals, failure detection signals, sensor signals, and coordination signals. In some embodiments a coordination unit may be configured to receive signals from another coordination unit via a communication channel.

In some embodiments a coordination unit may be configured initiate sending of signals from another coordination unit via a communication channel. In some embodiments a coordination unit may send signals to a failure detection unit. In some embodiments a coordination unit forwards control signals. In some embodiments a coordination unit may transmit or forward normal operation control signals, failure detection signals, sensor signals, or coordination signals. In some embodiments a coordination unit may transmit or forward emergency control signals.

In some embodiments a first coordination unit in a first subsystem sends a coordination signal to a second coordination unit in a second subsystem via a communication channel. In some embodiments the first coordination unit forwards control signals to the second coordination unit via the communication channel.

A coordination unit controls a switch. A coordination unit may use a switch to select which control signals are forwarded to which effectors.

In some embodiments a coordination unit receives a failure detection signal from a failure detection unit. For example, in a first subsystem, a first coordination unit may receive a failure detection signal from a failure detection unit that one of the subsystem's effectors has failed. The coordination unit may then send a coordination signal indicating the failure to a second coordination unit of a second subsystem, which may trigger the second subsystem to switch from a normal operation control mode into an emergency control mode. In some embodiments this switch is triggered by the coordination unit sending signals to the normal operation control unit and to the emergency control unit. In some embodiments this switch is triggered by sending a signal to a switch that switches from forwarding the control signals of the normal operation control unit to forwarding the control signals of the emergency control unit.

In some embodiments a first coordination unit in a first subsystem may be arranged to receive control signals (e.g., normal operation control signals) from a control unit (e.g., a first normal operation control unit) in a first subsystem; it may then forward these control signals to a second coordination unit in a second subsystem; the second coordination unit may then forward these control signals to a failure detection unit in the second subsystem; and this may then allow the failure detection unit in the second subsystem to compare these signals to those of control unit in the second subsystem (e.g., a second normal operation control unit) to detect a failure in the first or in the second subsystem.

In some embodiments a first coordination unit in a first subsystem may be arranged to receive first sensor signals from a first sensor in a first subsystem; it may then send coordination signals representative of the first sensor signals to a second coordination unit in a second subsystem; the second coordination unit may then forward these signals to a failure detection unit in the second subsystem; and this may then allow the failure detection unit in the second subsystem to compare these signals to second sensor signals in the second subsystem to detect a failure in the first or in the second subsystem.

Switch(es)

A switch may be used to switch or select between forwarding different control signals to one or more effectors. A switch may also be used to switch the forwarding of a set of control signals to one or more effectors on or off ("on/off switch" or "on/off selector").

In some embodiments each of a Master and a Slave subsystem have a switch. In some embodiments a switch is used to switch between forwarding control signals from different control units (e.g., a normal operation control unit, an emergency control unit) to one or more effectors. In some embodiments a switch is operated by a coordination unit.

Failures and Failure Detection Unit(s)/Failure Detection Signals

A failure detection unit is used to detect failures. In some embodiments a failure detection unit is used to detect failures in the subsystem it is part of. In some embodiments a failure detection unit is used to detect failures in another subsystem. In some embodiments a failure detection unit is used to detect failures in a communication channel.

A failure detection unit generates failure detection signals. Failure detection signals are typically sent from a failure detection unit to a coordination unit. In some embodiments a failure detection unit may receive coordination signals. In some embodiments a failure detection unit may receive sensor signals. In some embodiments a failure detection unit may receive signals indicative of the operational state of components or units in its own subsystem (e.g., via a coordination unit or from the components or units directly), or of components or units in another subsystem (e.g., via another subsystem's coordination unit, a communication channel, and its own subsystem's coordination unit).

Types of Failures

Here, failure may mean a partial or complete loss of a component or an operator error. For example, the failure of an effector such as the propellers typically used on multicopters may mean a failure of the torque or thrust force produced by the effector. For this example, typically losses are in the range of 20% to 100% of the nominal thrust, lift, or torque. As another example, failure of a sensor may mean partial or complete failure to deliver any sensor data, sensor data out of range, or sensor data not corresponding to data from other sensors, or sensor data not corresponding to model predictions. As another example, failure of a communication channel may mean an absence of signals received from that channel, signals not corresponding to a desired range, pattern, or model, or signals failing a check (e.g., a cyclic redundancy check).

Overall, many small aerial vehicles used today, and multicopters in particular, are comparably simple and hence comparably safe (the best system on an aircraft is the one that it doesn't have, because it can never fail). However, due to the enormous popularity of small aerial vehicles, a very large number of crashes are documented in the literature. The vast majority of all aerial vehicle crashes are due to effector failure-apart from pilot errors that result in a collision of the aerial vehicle with an obstacle, the aerial vehicle typically stays airborne as long as effectors do not fail at producing thrust in a controlled way. The present invention may therefore allow to overcome or limit the consequences of the vast majority of all small aerial vehicle crashes, including some that involve collisions with an obstacle. The most common aerial vehicle failures in the literature are:

1. Failures due to collisions with obstacles due to piloting errors or wind or turbulence. For example, during an inspection operation a sudden gust of wind pushes an aerial vehicle into a bridge, resulting in an effector failure due to a broken propeller, and subsequent catastrophic loss of control and crash.

2. Failures of an aerial vehicle's wiring. Examples of very common failures include:
   Unplugging of a motor connector due to vibrations.
   Detachment of a soldered wire.
   Loose wire cut by a propeller.
   Wire ripped off by partial motor attachment failure (shaking lose of fastening screw or material fatigue of assembly).
   Insufficient wire size and resulting overheating/melting of wire or solder attachment point.

3. Failures of an aerial vehicle's propeller attachment, motor attachment, actuator attachment, or frame. The most common failures include:
   Loose screws and bolts (loosened by vibrations, assembly errors, wear-and-tear, material fatigue).
   Propellers attached in wrong configuration (counter-clockwise (sometimes called "puller" propellers) and clockwise propellers (sometimes called "pusher" propellers)).
   Over tightening of attachment screws.
   Under tightening of attachment screws.
   Actuator attachment failure.
   Broken wing.
   Punctured airfoil.

4. Failures to properly balance all motors, to properly balance all propellers, and failures due to bent motor collets and shafts. This category is a main cause of vibrations and subsequent dislodging of parts, especially on larger aerial vehicles.

5. Failures of an aerial vehicle's motor or actuator. The most common failures result from overloading of motors (e.g., too large propellers) and subsequent overheating or operation in dust or sand. Other common failures include inadequate sizing of actuators or component aging.

6. Failures of an aerial vehicle's electrical or electronic components. The most common failure in this category is flight in wet conditions such as rain, fog, or high humidity.

7. Failures of an aerial vehicle's flight software. For example, improper programming of the flight control computer or improper motor gains for the aircraft weight.

8. Failures caused by improper remote control configurations, in particular reversed or improperly configured transmitter channels, or failure to ensure a strong enough signal between base station and receiver.

9. Failures caused by interference, most commonly interference between the electronic speed controls (also called "motor controller") with the aerial vehicle's receivers.

10. Failures due to bad payloads.

11. Failures due to a lack of or faulty sensor calibration.

12. Failures of a propeller due to material fatigue (e.g., fatigue cracks or stress fractures).

13. Component failure. All components have a finite life span and age at various rates, depending on various factors, e.g., thermal cycling.

While not all of the above failures directly result in an effector failure, many may be detected or avoided using the present invention. In particular, following one of the above failures, the present invention may allow to prevent an aerial vehicle crash by disabling the component or subsystem affected by the failure, and by using an emergency control unit to compute effector control signals for the subsystem not affected by the failure such that the orientation of the resultant direction of thrust of the effectors not affected by the failure can be controlled to allow the aerial vehicle to land.

Various methods can be used to detect that a failure has occurred. Examples include automatic detection, for example by having a model-based observer on the aerial vehicle monitoring measured data, and probabilistically detecting that an error has been observed (utilizing, for example, a bank of Kalman filters where each represents a different failure mode). Sliding mode observers, voting-based algorithms, parity-space approaches, and parameter identification can also be used. The failure might also be detected directly, e.g. by monitoring the rotational speed of an aerial vehicle's effectors, or by monitoring how much current an aerial vehicle's effectors draw. Other examples include having a pilot who monitors the aerial vehicle, and who can send a signal to the aerial vehicle when a failure is observed.

Some failure detection methods might detect a failure only after a delay, meaning that the aerial vehicle might be in a state far from the intended when the failure is recognized. Certain events, such as a collision with an obstacle, will also tend to put the aerial vehicle in a state far away from the expected. Nonetheless, the present invention may allow the aerial vehicle to recover from an arbitrary initial state. Depending on the specific aerial vehicle configuration (such as mass, remaining effectors unaffected by the failure, etc.) the aerial vehicle might be able to return to a hover after the failure, or freely move around space. Alternatively, instead of controlling the position, the disclosed invention could be used simply to reorient the aerial vehicle after a failure, such that it (e.g.) hits the ground in a favorable way.

The present invention may also offer the possibility of reducing the severity of pilot error. For example, if a pilot of a quadrocopter were to accidentally collide the quadrocopter with a structure, and thereby damage one of the propellers, an automated system (e.g., a failure detection unit) could detect that a failure has occurred, and that some of the aerial vehicle's effectors have been affected by a failure. The system could then automatically engage an internal autopilot (e.g., an emergency control unit), utilizing available sensors to bring the aerial vehicle to a hover, or to bring the aerial vehicle to a soft landing on the ground.

Failure Detection Unit

In some embodiments a failure detection unit is structured and arranged to compare a first signal to a second signal. This may, for example, be achieved by connecting the failure detection unit to two or more sensors of the same type, wherein the two or more sensors are structured and arranged to provide similar readings. This may, for example, be achieved by mounting the sensors in close proximity; with a suitable relative orientation; or with a suitable relative position.

In some embodiments a failure detection unit is structured and arranged to compare a signal to an expected threshold or range. For example, a failure detection unit may receive measurements from a temperature sensor, average these measurements over a fixed time interval, compare the average to a range retrieved from a memory, and report a failure detection if the average value is outside the range.

In some embodiments a failure detection unit is structured and arranged to detect failures of a single component or of a single subsystem. This may, for example, be achieved by mounting a sensor such that it detects the movement of an aerial vehicle around a specific axis; by using a model to link the movement around the axis to the action of one or more effectors; and by using the model to compare data representative of the sensor's readings to an expected range or threshold for failure-free operation. The failure detection unit then detects a failure if the data representative of the sensor's reading falls outside of the expected range or is above (or below) the threshold. In some embodiments the model may include effector commands or control signals. For example, the model may predict a certain accelerometer reading for a given motor command. Examples of models include first principles models, look-up tables, and correlation functions.

In some embodiments a failure detection unit is structured and arranged to detect failures based on a signal received via a communication channel. For example, it may detect a failure in a temperature sensor of another subsystem based on measurements received from that sensor and forwarded via the communication channel.

In some embodiments a failure detection unit may use one subsystem's sensor signals to monitor the operation of another subsystem. For example, a gyroscope in one subsystem may be mounted such that it detects the movement of an aerial vehicle around a specific axis caused by effectors of the other subsystem. The first subsystem may thus observe the actions of the other subsystem. The detected movements may be represented by values. The subsystem then compare the values/detected movements to expected values. Expected values may, for example, be predicted by a model or based on a motor command sent from a normal operation control unit of a first subsystem via the coordination units and communication channel to the other subsystem. If the values/detected movements do not correspond to the expected values, then this indicates a failure has occurred. As another example, the detection of a failure may be done by determining whether the values/detected movements are within a predefined safe operating range or are within predefined safe rate of change.

The failure detection unit may also implement a multitude of other well-established failure detection methods to evaluate the signals it receives so as to detect if a failure has occurred. For example, it may use algorithms that compare redundant information from several sensors; it may include watchdog functionality to detect unexpected signal outages; data corruption checks such as CRC; signal range checks; signal threshold checks; correlation verification; it may also include additional sensors that detect undervoltage or overvoltage, excessive current, excessive temperature, or the motion of effectors.

In some embodiments the failure detection unit receives signals that are indicative of signals generated in a normal operation control unit from a coordination unit. The failure detection unit may then use these signals to verify local signals (e.g., those of the same subsystem).

Once a failure is detected, a failure detection unit may send a signal (e.g., a failure detection signal) to a coordination unit. The failure detection signal may include specifics of the type of failure (e.g., effector malfunction), specifics of the state of the subsystem or its components (e.g., shut-off of the effector), or instructions for the other subsystem (e.g., initiate emergency control).

Normal Operation Control Unit(s)/Normal Operation Control Signals

A normal operation control unit (sometimes called: normal OP control unit) is used in some embodiments to control the aerial vehicle during normal operation.

The normal operation control unit generates control signals (sometimes called: normal operation control signals or normal OP control signals) for effectors of the redundant aerial vehicle in dependence of sensor signals. Normal operation control signals are typically sent to multiple subsystems, with some control signals forwarded to another subsystem by a coordination unit and via a communication channel.

The normal operation control unit may implement aerial vehicle control laws that are well-established in the prior art and widely used. Examples of such control laws include PID control; model predictive control; sliding mode control; full state feedback; and backstepping control. Depending on the control law, the normal operation control unit may also implement state estimation algorithms to estimate the state of the redundant aerial vehicle from the sensors signals. Such state estimation algorithms are also well-established in the prior art; examples of such methods include Kalman filtering; extended Kalman filtering; particle filtering; unscented Kalman filtering; and complementary filtering. In some embodiments a state estimate includes the aerial vehicle's rotation and angular velocity. The normal operation control unit may then use these estimates, e.g. in an attitude controller. In some embodiments the state estimator estimates both a rotational and a translational state.

A control unit may compute control signals for a single effector. In some embodiments a control unit computes different sets of control signals for different sets of effectors. For example, a normal operation control unit may compute a first set of control signals for two effectors of a Master subsystem and a second set of control signals for a Slave subsystem. As another example, during normal operation, a first normal operation control unit may compute a first set of control signals for a Master subsystem and a second normal operation control unit may compute a second set of control signals for a Slave subsystem.

The normal operation control unit of one subsystem may furthermore use data related to sensors signals of another subsystem to improve performance. This may be achieved by forwarding that data using one or more coordination units. While the sensors carried by both subsystems would typically produce signals representative of the same quantities, the combination of data from sensors of multiple subsystems may improve signal quality (e.g., signal to noise ratio). This may, for example, be achieved by means of filtering both signals jointly to reduce noise and improve outlier rejection.

In some embodiments a normal operation control unit is used even after the detection of a failure as long as the failure is minor (e.g., as long as the failure does not affect the operation of the aerial vehicle's effectors, or as long as the failure can be compensated by a redundant component).

In some embodiments a single normal operation control unit is used.

Emergency Control Unit(s)/Emergency Control Signals

An emergency control unit is used in some embodiments to take over control of the aerial vehicle after a failure. An emergency control unit implements special control laws for degraded flight. In some embodiments emergency control units are activated, deactivated, or influenced by input from a human operator. In some embodiments emergency control units are fully or partially autonomous.

An emergency control unit generates emergency control signals. In some embodiments emergency control signals may be used to control a subset of an aerial vehicle's effectors. In some embodiments the emergency control unit generates emergency control signals for effectors in the same subsystem.

In some embodiments an emergency control unit may be used to control an aerial vehicle that has lost control of movement in one of its degrees of freedom. In some embodiments an emergency control unit is used once a subsystem affected by a failure is disabled. In some embodiments an emergency control unit is used after any failure detected by a failure detection unit.

In some embodiments the emergency control unit only generates control signals for the effectors of its subsystem. The emergency control unit may thus implement a control law that is designed specifically to control an aerial vehicle with a reduced number of effectors. An example of such a control law is disclosed in the present invention. For a redundant multicopter that is configured with a sufficient number of effectors to allow a single subsystem to maintain fully controlled flight (for example, an eight-rotor redundant multicopter that consists of two subsystems with four propellers each), conventional multirotor control laws that are well-established in the prior art and widely used may be implemented in the emergency control unit.

In some embodiments the aerial vehicle remains in its failure state or under the control of the emergency control unit until it has landed safely, e.g. as confirmed by a state estimation or another algorithm based on sensor data (e.g., accelerometer readings within a certain range corresponding to rest for >10 seconds), by specialized sensors (e.g., touch sensors on a vehicle's landing gear), or by a human operator. In some embodiments the aerial vehicle periodically re-evaluates its current failure state or its operation under the control of an emergency control unit. In some embodiments, a failure may be used to trigger failure diagnostics (e.g., event processing, determining system failure conditions using fault tree analysis, and others). In some embodiments the exit from the failure state or emergency control depend on the specifics of the aerial vehicle 100, its expected failure modes, the actual failure mode, and other factors. In some embodiments a failure detection unit may continue monitoring a failure after it has been detected and a coordination unit may trigger return to normal operation once a failure no longer persists.

Disabling a Subsystem

In some embodiments a subsystem may be disabled (for example if there is a failure in a component of the subsystem, such as an effector belonging to that subsystem, then that subsystem may be disabled). Disabling of a subsystem may, for example, be achieved by stopping the operation of a subsystem's control unit; by turning off a subsystem's power unit; or by discontinuing the forwarding of control signals via the communication channel by using a coordination unit or a switch. In some embodiments subsystem components, such as the failure detection unit, the power source, or the coordination unit, may have special "disabled" states that allow them to continue to provide data representative of the subsystem's status and functioning. For example, a disabled subsystem's coordination unit may still forward data representative of sensor signals of the disabled subsystem to another subsystem's coordination unit. As another example, a disabled subsystem's failure detection unit may continue to monitor and provide updates on the status of a failure.

Combinations of Units

Some embodiments may include a single or multiple failure detection unit(s), coordination unit(s), normal operation control unit(s), and emergency control unit(s). In some embodiments some or all of the failure detection unit(s), coordination unit(s), normal operation control unit(s), and emergency control unit(s) may be implemented on a single or on multiple circuit board(s), single board computer(s), or single microcontroller(s). In some embodiments the operation of some or all failure detection unit(s), coordination unit(s), normal operation control unit(s), and emergency control unit(s) may be combined into one or more units.

Communication Channel/Signals

In an embodiment of the present invention the aerial vehicle may comprise one or more communication channel (s) (wired or wireless communication channel(s)). Most preferably the communication channel is connected to each of the subsystems (e.g. first and second subsystems) of the aerial vehicle. Thus the communication channel can be used to communicate between subsystems. For example in the preferred embodiment a first subsystem is connected to a communication channel and a second subsystem is connected to said communication channel, and communication between said subsystems can take place across the communication channel. Communication is mediated by subsystems' coordination units. Example communication channels include: a physical transmission medium (e.g., a single wire or cable, two wires or cables); a logical connection (e.g., a link between a data source and a data sink); a wireless connection (e.g., a radio channel); the aerial vehicle may comprise any one or more of these channel types. In some embodiments a communication channel uses a Controller Area Network (CAN bus), a universal asynchronous receiver/transmitter (UART), or an Inter-Integrated Circuit ($I^2C$ or I2C) bus.

A communication channel carries control signals which have been generated at one subsystem (e.g., a motor control signal computed by a normal operation unit and forwarded via a coordination unit) to another subsystem. In some embodiments a communication channel carries coordination signals which have been generated at one subsystem (e.g., a signal computed or forwarded by a coordination unit and that indicates the status of a subsystem or one of its components) to another subsystem. In some embodiments a communication channel carries other signals which have been generated at one subsystem (e.g., a sensor signal such as the output of a sensor that detects an event or a measured quantity or a measured environmental property, signals generated by a power source that indicate the status (or "health") of the power source) to another subsystem. In some embodiments only control signals are directly forwarded via a communication channel, and other signals are transformed into coordination signals.

Note that in the present disclosure, the terms "communication channel" and "channel" include, but are not limited to, a physical transmission medium, such as a wire, or a logical connection; the communication channel could also be a wireless communication channel. In a further variation a plurality of communication channels is provided. The singular term is used to mean its singular or plural meaning (i.e., "channel(s)"). The communication channel may be a single uni-directional channel; two redundant, uni-directional channels with data flowing in the same direction; two redundant, uni-directional channels with data flowing in opposite directions; a single bi-directional channel; two redundant bi-directional channels; or a combination (including duplications) thereof.

In some embodiments one or more uni-directional communication channels are provided. Examples include a wire transmitting a PWM signal. In some embodiments one or more bidirectional communication channels are provided. For example, two wireless connections may be used, each comprising a wireless transceiver.

In some embodiments the communication channel may comprise at least two wire connections. In some embodiments the communication channel may comprise at least two wireless connections. In some embodiments the communication channel may comprise a combination of at least one wire connection and at least one wireless connection.

In some embodiments one or more redundant (e.g., backup) communication channels are provided. For example, two coordination units may send identical signals through two separate communication channels.

In some embodiments a communication channel has a transmission throughput of at least 5, 10, 50, or 200 actuator signals per second. In some embodiments a communication channel has a transmission delay between the sending of a signal by a first coordination unit and the receiving of a by a second coordination unit of at most 200, 100, 20, or 5 ms.

In some embodiments a communication channel uses a wired connection. This may, for example, be useful to avoid radio-frequency interference. In some embodiments a communication channel uses differential signaling. This may, for example, be useful to reduce susceptibility to noise. In some embodiments a bidirectional communication channel is provided, with a coordination unit that is receiving a signal responding by sending an acknowledgement signal back to the sending coordination unit. In some embodiments a communication channel uses error detection or error correction mechanism. Examples include ECC, CRC, and checksums.

BRIEF DESCRIPTION OF THE DRAWINGS

Embodiments of the present invention will now be described, by way of example only, with reference to the following figures:

FIGS. 6A to 6D shows a single block diagram (split into components A, B, and C for convenience) used to explain the functioning of a sample embodiment with three subsystems.

FIGS. 12A to 12C show schematic representations used to explain how two or three subsystems may be joined to create an aerial vehicle that is a hexacopter.

FIGS. 13A to 13D show schematic representations used to explain how two subsystems may be joined to create an aerial vehicle that is an octocopter.

DETAILED DESCRIPTION OF DRAWINGS

Figure 1:
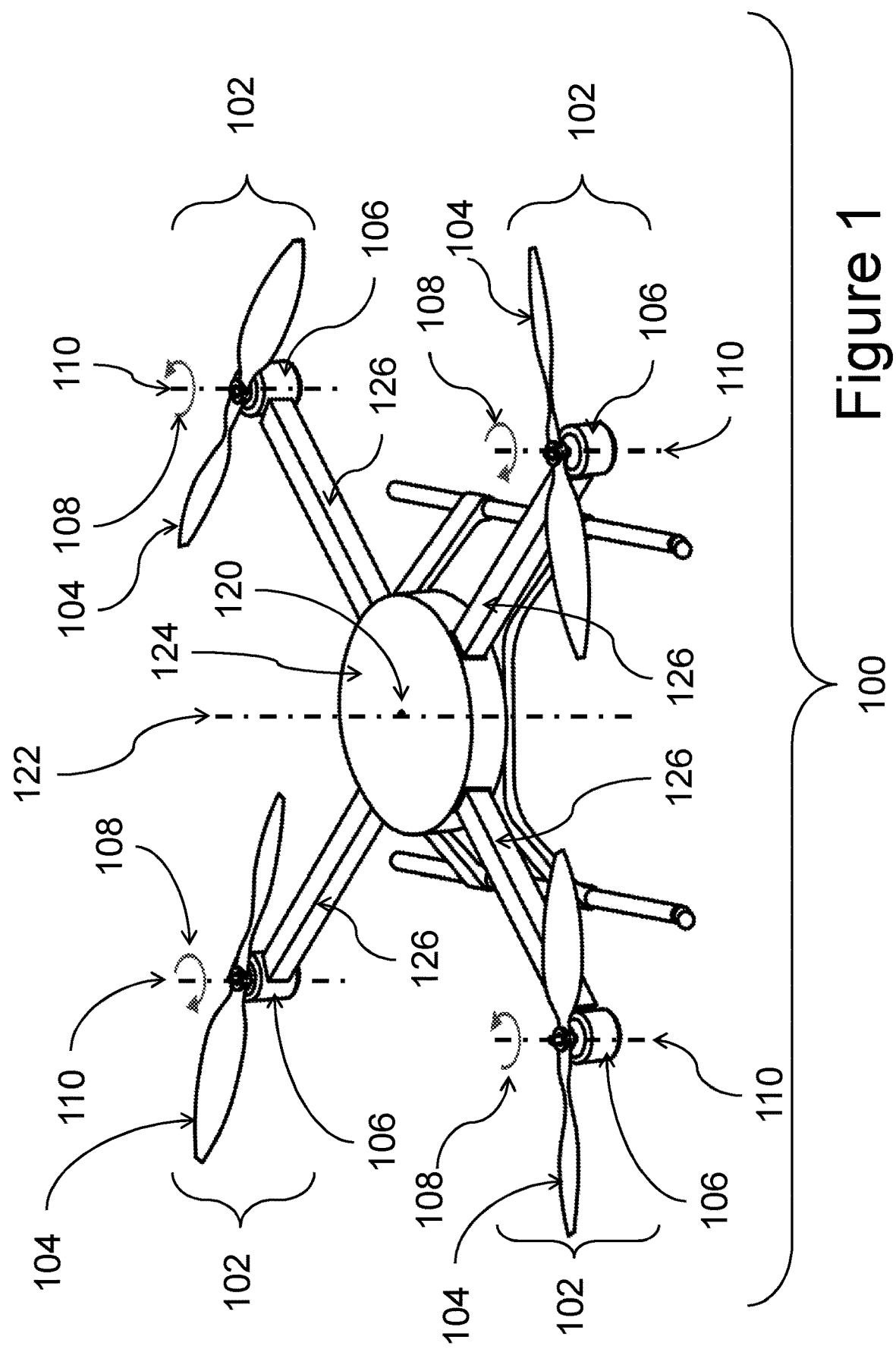
FIG. 1 shows a schematic and perspective view of an exemplary aerial vehicle in the shape of a quadrocopter.

FIG. 1 shows an aerial vehicle 100. It is realized in the shape of a quadrocopter with a central housing 124 and four, rigidly attached arms 126. An effector 102 is mounted at the distal end of each arm 126. Here the effector 102 is a motor 106 that actuates a propeller 104. The propeller's axis of rotation ("drive axis" 110) is fixed with respect to the aerial vehicle 100. The four propellers do not all have the same direction of rotation 108 (or "handedness"): Two propellers rotate in a counter-clockwise direction, the two others in a clockwise direction. The aerial vehicle's center of mass 120 and its primary body axis 122 are also shown.

Figure 2A:
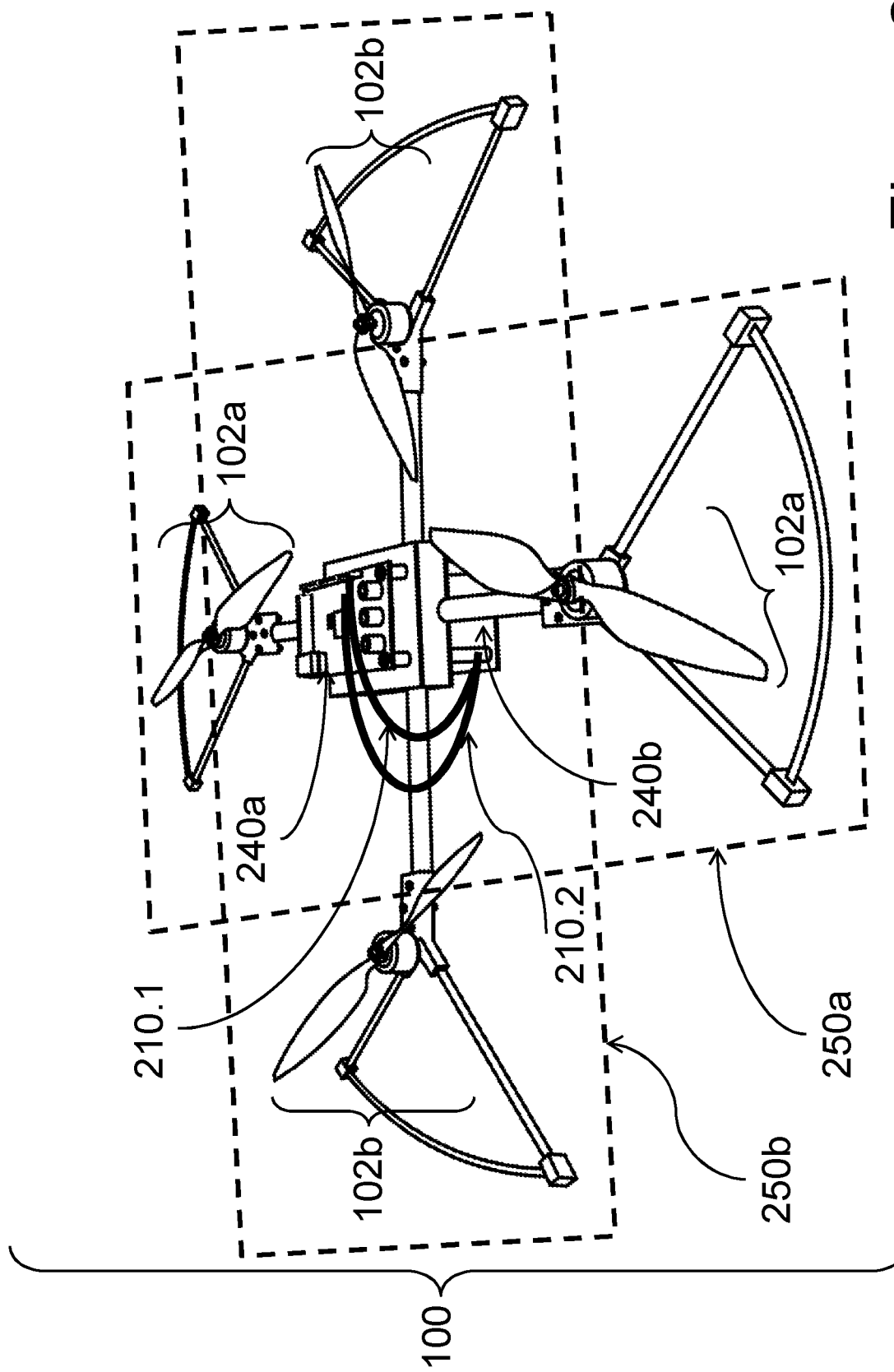
FIGS. 2A and 2B show schematic perspective views of an exemplary redundant aerial vehicle comprising two multicopter subsystems with a detachable assembling connection and connected by a communication channel.

FIG. 2A shows an embodiment of a redundant aerial vehicle 100 that is a redundant multicopter. It comprises two multicopter subsystems 250a, 250b, rigidly attached to each other such as they would be in flight. The first subsystem 250a contains a first flight module 240a, and the second subsystem 250b contains a second flight module 240b. The two subsystems 250a, 250b are connected by a physically redundant communication channel 210, consisting of two cables 210.1 and 210.2.

Figure 2B:
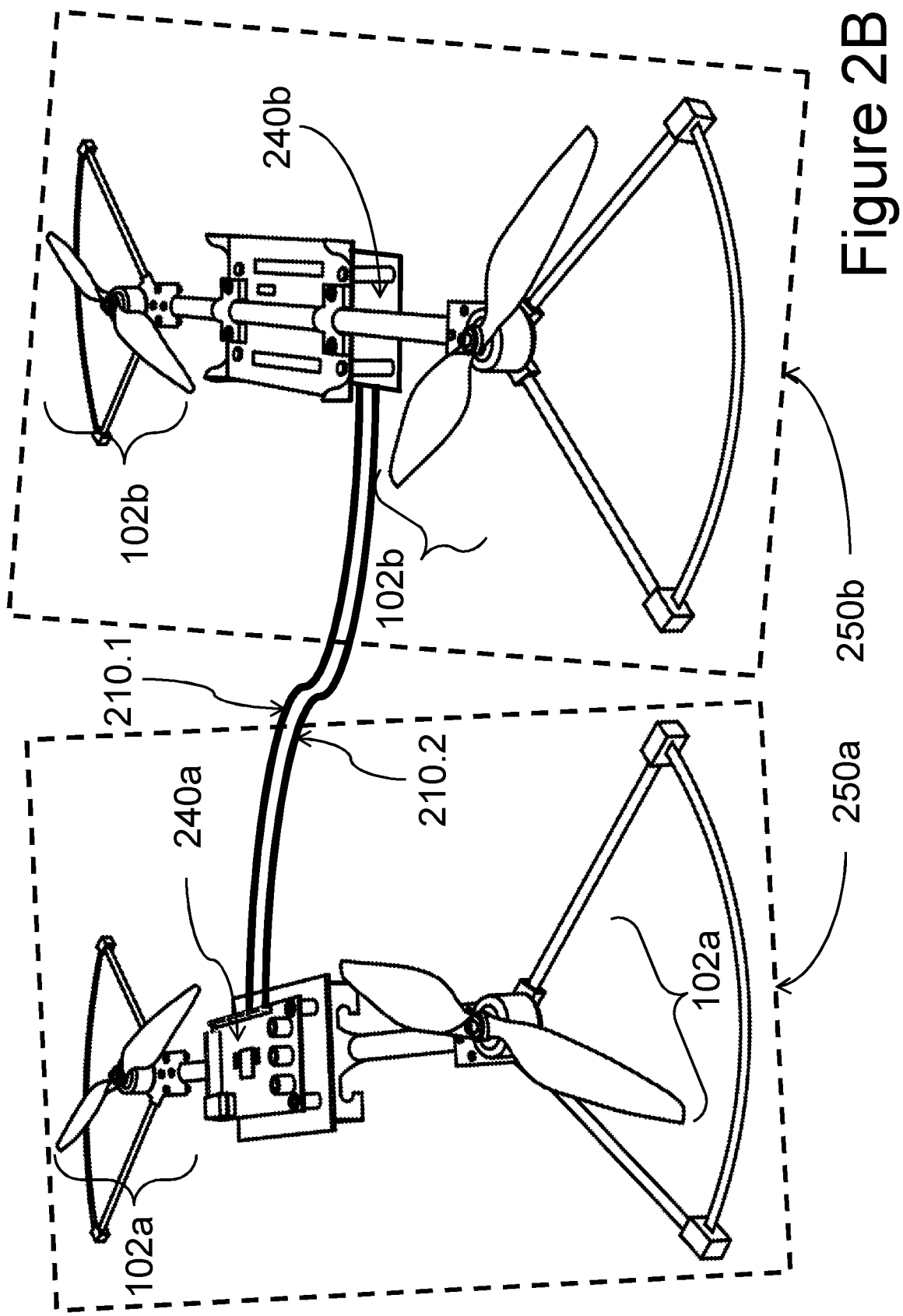

FIG. 2B shows the redundant aerial vehicle 100 of FIG. 2A with the two subsystems 250a, 250b detached from one another, only connected by communication channels 210.1 and 210.2. During operation, both subsystems 250a, 250b are rigidly attached to one another. Detachment as illustrated in FIG. 2B may, however, be useful during transport or for maintenance. It also further illustrates how each of the two subsystems may be structured and arranged to be self-sufficient.

In this embodiment each of the two subsystems 250a, 250b is able to fly the aerial vehicle 100 with the other subsystem disabled (i.e., each subsystem 250a, 250b is capable of providing the lift and stabilization control required to fly the aerial vehicle 100 without the effectors 102 of the other subsystem 250b, 250a; the disabled subsystem becomes a payload). This is achieved by having each of the two subsystems 250a, 250b comprise a power source, an effector, a sensor, and a flight module (none shown), and by having the sensor and effector of each subsystem structured and arranged such that the aerial vehicle 100 is controllable using standard control laws known in the prior art or using the control laws disclosed below.

Figure 3:
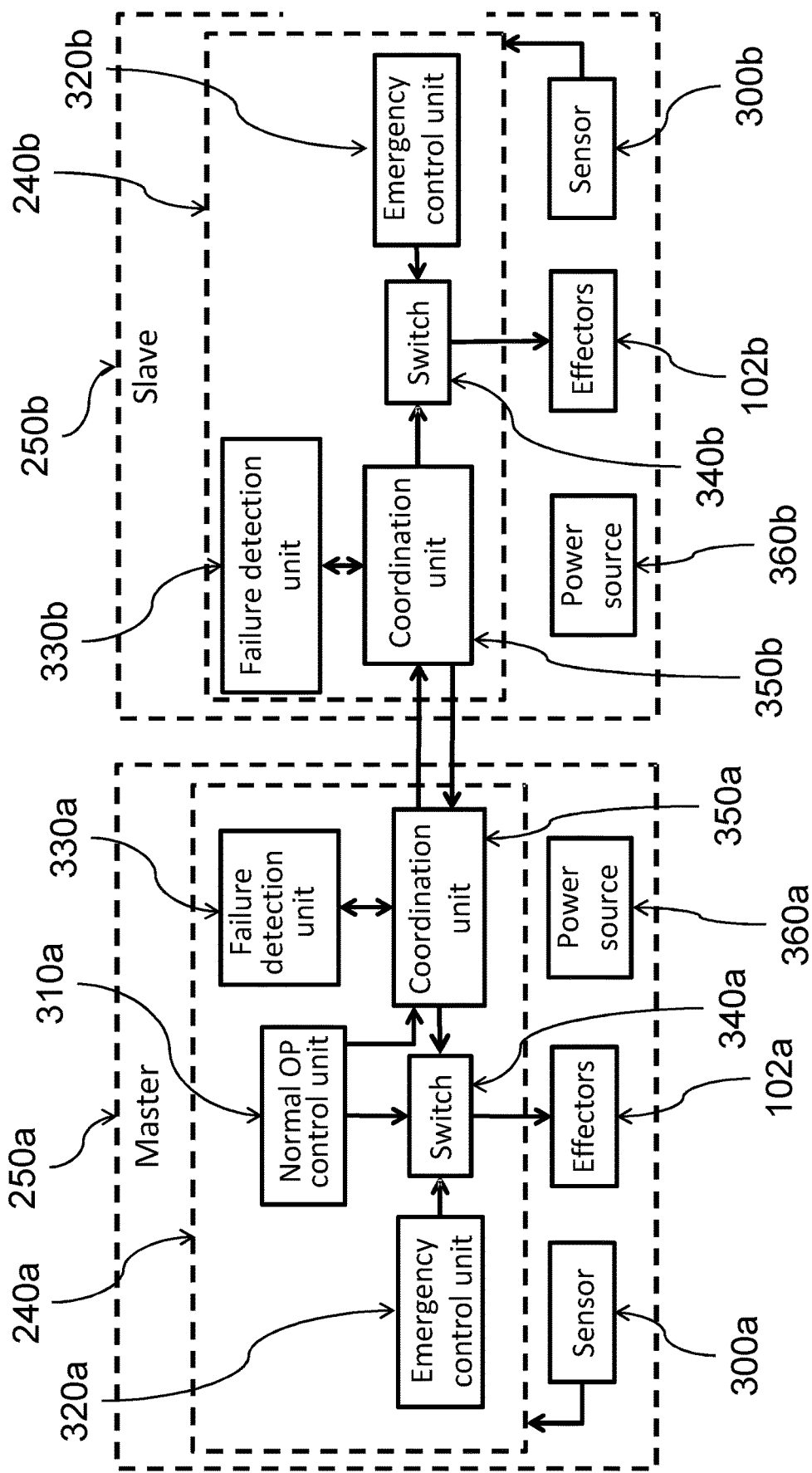
FIG. 3 shows a block diagram used to explain the functioning of a sample embodiment.

FIG. 3 shows a block diagram used to explain signal flow in the example embodiment shown in FIG. 2. The arrows indicate signal flow. Note that detailed sensor signal flow is omitted in FIG. 3 for clarity. In this embodiment, one subsystem 250a is designated the Master; the other subsystem 250b is designated the Slave. Here, each subsystem comprises its own power source 360a, 360b, effectors 102a, 102b, sensor 300a, 300b, and flight module 240a, 240b. The Master's flight module 240a comprises a coordination unit 350a, a normal operation control unit 310a, an emergency control unit 320a, a failure detection unit 330a, and a switch 340a. The Slave's flight module 240b comprises a coordination unit 350b, an emergency control unit 320b, a failure detection unit 330b, and a switch 340b. Note that in this embodiment the Slave does not require a normal operation control unit 310b. This embodiment further comprises two unidirectional communication channels 210.1, 210.2 (channels are not shown in this signal flow diagram). The first communication channel 210.1 communicates signals from the Master's coordination unit 350a to the Slave's coordination unit 350b. The second communication channel 210.2 communicates signals from the Slave's coordination unit 350b to the Master's coordination unit 350a.

The Master's coordination unit 350a controls the Master's switch 340a. The switch 340a switches between forwarding control signals from the Master's normal control operation unit 310a to the Master's effectors 102a, forwarding control signals from the Master's emergency control unit 320a to the Master's effectors 102a, and an "off" position that may be used to disable forwarding in the Master subsystem 250a.

The Slave's coordination unit 350b controls the Slave's switch 340b. The switch 340b switches between forwarding control signals from the Master's normal control operation unit 310a (via the coordination units 350a, 350b) to the Slave's effectors 102b, forwarding control signals from the Slave's emergency control unit 320b to the Slave's effectors 102b, and an "off" position that may be used to disable forwarding in the Slave subsystem 250b.

The coordination units 350a, 350b may receive a failure detection signal from their respective failure detection unit 330a, 330b, which may indicate whether the corresponding subsystem 250a, 250b has failed or not.

In this embodiment each failure detection unit 330a, 330b receives signals from its subsystem's sensor(s) 300a, 300b, effector(s) 102a, 102b, power source 360a, 360b, emergency control unit 320a, 320b, and coordination unit 350a, 350b, respectively (these signals are omitted in FIG. 3 for clarity). The Master's failure detection unit 330a may also receive a signal from the Master's normal operation control unit 310a indicating its failure state (omitted in FIG. 3 for clarity).

Each failure detection unit 330a, 330b emits a signal to the coordination unit 350a, 350b that is part of the same subsystem 250a, 250b, representative of the subsystem's failure state.

Each failure detection unit 330a, 330b may also receive a signal from its subsystem's coordination unit 330a, 330b, respectively, containing data representative of the failure state of the other subsystem's 330b, 330a sensor(s) 300b, 300a, effector(s) 102b, 102a, power source 360b, 360a, emergency control unit 320b, 320a, coordination unit 330b, 330a, or failure detection unit 300b, 330a, respectively, via the communication channel 210 (e.g., as part of coordination signals sent from the other subsystem's coordination unit 330b, 330a, respectively). Similarly, the Slave's failure detection unit 330b may also receive data representative of the Master's normal operation control unit 310a via the communication channel 210.

The control units 310a, 320a, 320b receive signals from the sensors in their subsystem 300a, 300b (sensor signals are omitted in FIG. 3 for clarity) and compute effector control signals for the aerial vehicle's effectors 102.

In this embodiment all of a subsystem's components receive power from their subsystem's power source 360.

In this embodiment the control signals of the Master's normal operation control unit 310a are computed based on the Master's sensor 300a only (i.e., no sensor data of the Slave's sensor 300b is used). The control signals of the Master's emergency control unit 320a are computed based on the Master's sensor(s) 300a only. The control signals of the Slave's emergency control unit 320b are computed based on the Slave's sensor(s) 300b only.

Figure 4A:
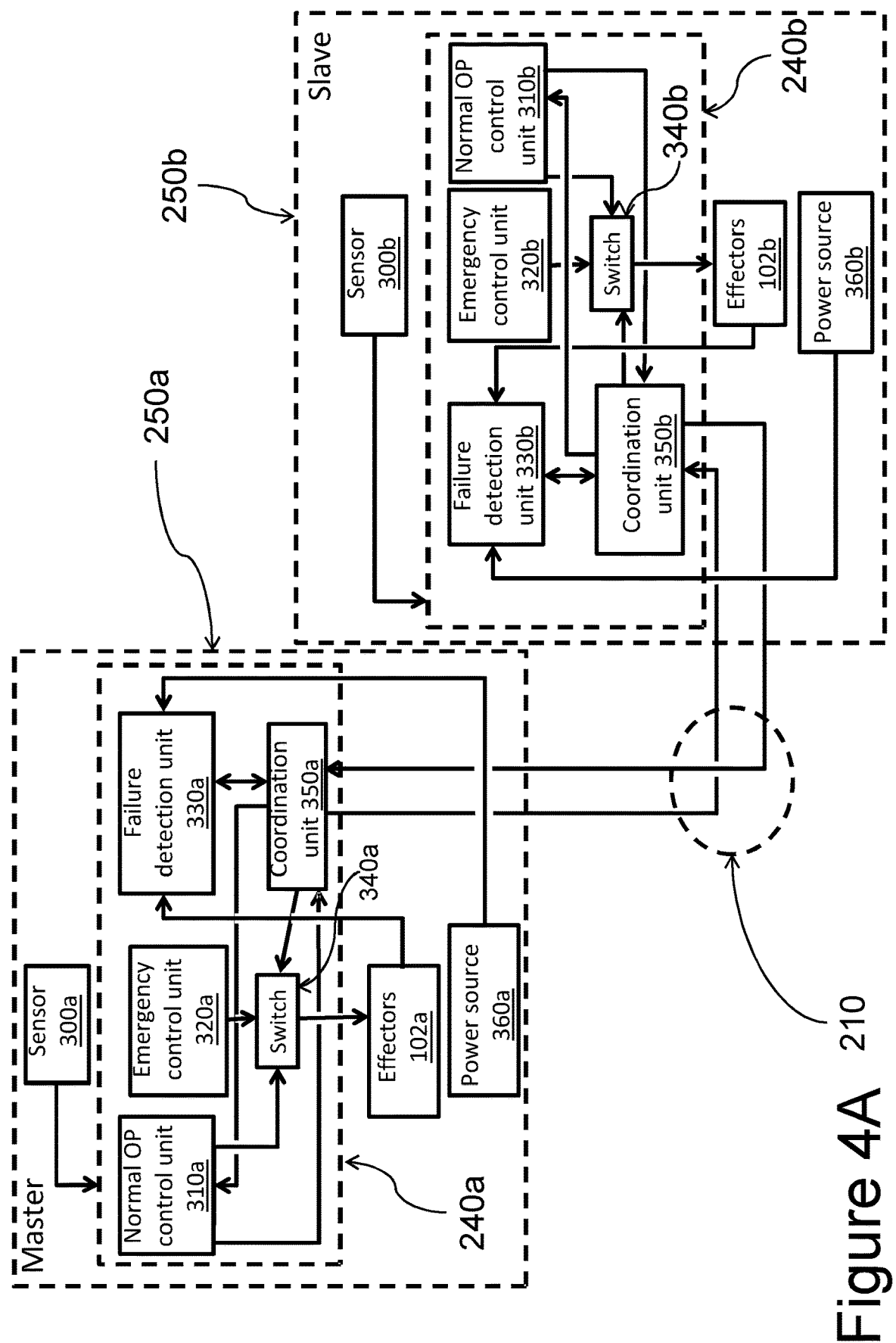
FIG. 4A shows a block diagram used to explain the functioning of a more complex sample embodiment.

FIG. 4A is a schematic diagram of an embodiment of a redundant aerial vehicle with two subsystems 250a, 250b. The signal flow in the redundant aerial vehicle is also illustrated in the diagram by arrows. Note that detailed sensor signal flow is omitted in FIG. 4A for clarity. Here, the Master's sensors 300a provide data to the Master's control units 310a, 320a as well as to the Master's failure detection unit 330a. Examples for such data include data representative of a movement of the aerial vehicle, data representative of a distance to an obstacle, and data representative of a distance above ground. Moreover, the Master's sensors 300a also provide signals to the Master's coordination unit 350a, which forwards data representative of the signals via the communication channel 210 to the Slave's coordination unit 350b to the Slave's failure detection unit 330b. Examples for such signals include data representative of the operational status of a sensor, error codes, and sensor data. Similarly, the Slave's sensors 300b not only provide data to the Slave's control units 310b, 320b and failure detection unit 330b, but also to the Master's failure detection unit 330a. This allows both failure detection units 330a, 330b to monitor both their own as well as the other subsystem's sensors 300b, 300a for failure.

Although not shown in this embodiment, a similar architecture could be implemented for the Master's and Slave's effectors 102a, 102b or for the Master's and Slave's power sources 360a, 360b, which would allow one or both failure detection units 330a, 330b to monitor both their own as well as the other subsystem's effectors 102a, 102b or power sources 360a, 360b for failure. This may further increase the reliability or safety of a redundant aerial vehicle by providing additional information that may be used for system diagnostics.

In this embodiment all components shown in FIG. 4A are used during normal operation. In particular, both emergency control units 320a, 320b continuously compute control signals to allow for an immediate switch-over to forwarding of their signals to the corresponding effectors 102a, 102b in case of a failure (i.e., the control signals computed by the emergency units are not used at all during normal operation). During normal operation, these control signals are computed but blocked by the switch and not forwarded to the effectors.

The embodiment shown in FIG. 4A also has a second normal operation control unit 310b. It may be used to further increase reliability or safety, e.g. by forwarding control signals of the Slave's normal operation control unit 310b via the Slave's and Master's coordination units 350b, 350a to the Master's failure detection unit 330a, and by comparing these control signals to the Master's control signals computed by the Master's normal operation control unit 310a. The Master's control signals are either forwarded to the failure detection unit 330a by the Master's coordination unit 350a or received from the Master's normal operation control unit 310a directly.

Note that the embodiment shown in FIG. 4A has two fully symmetric subsystems. Therefore, it can be used both in a Master-Slave architecture (e.g., with the Master's normal operation control unit computing control signals for effectors 102a, 102b during normal operation) as well as in other architectures (e.g., with the first subsystem's normal operation control unit 310a computing control commands for the effectors of the first subsystem 250a, and with the second subsystem's normal operation control unit 310b computing control commands for the effectors of the second subsystem 250b during normal operation).

Figure 4B:
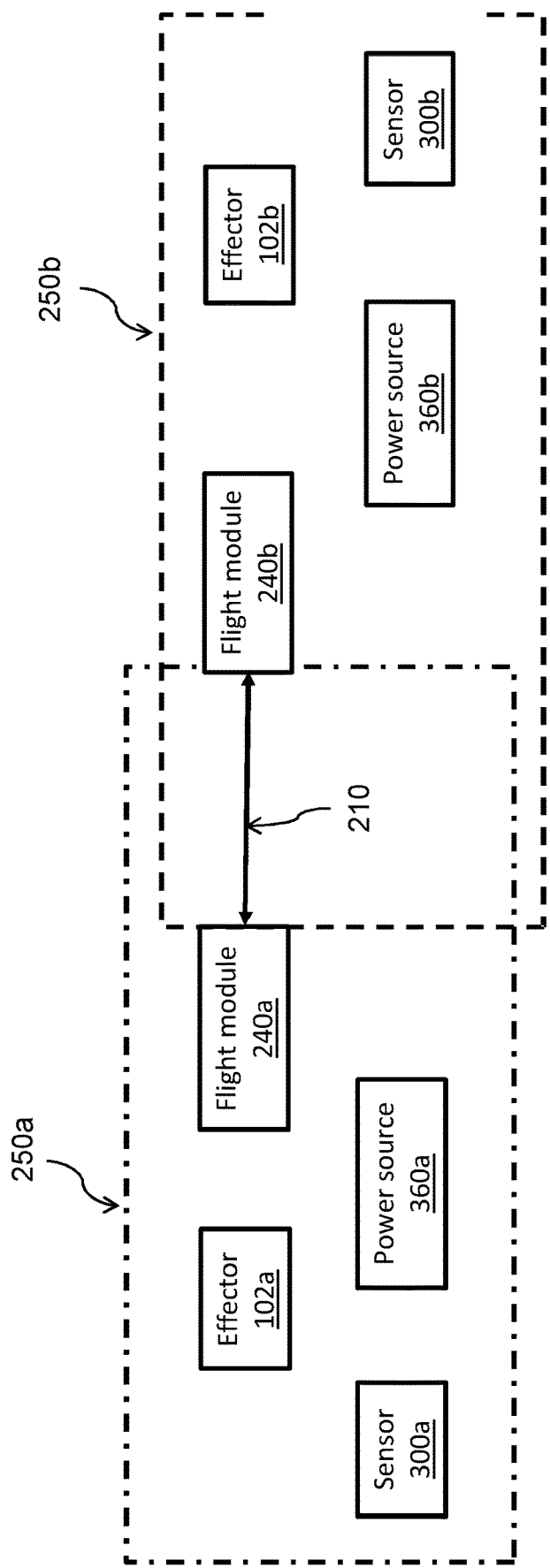
FIG. 4B shows an example embodiment with two subsystems sharing a single communication channel.
Figure 4C:
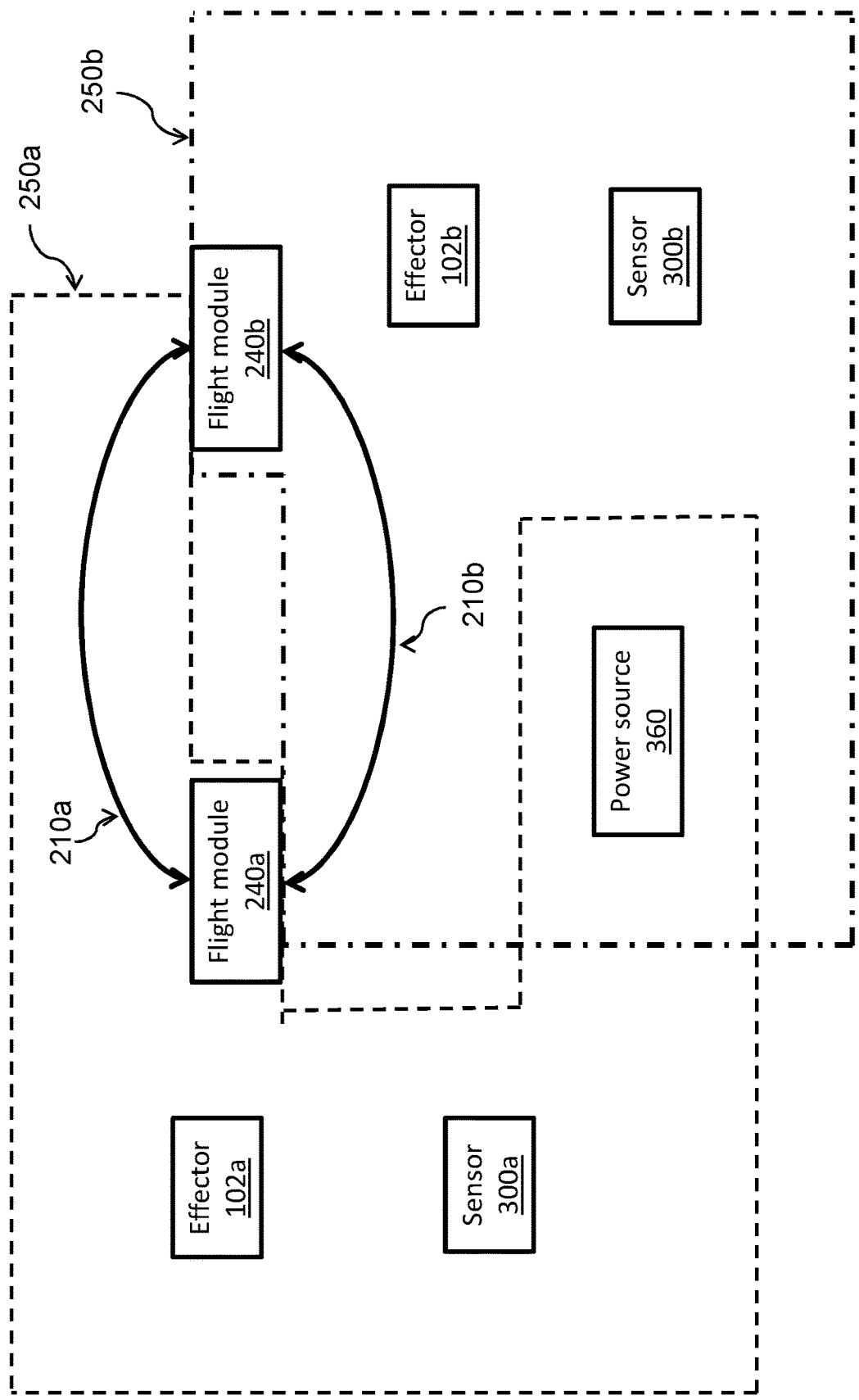
FIG. 4C shows an example embodiment with two subsystems sharing a single power source.
Figure 4D:
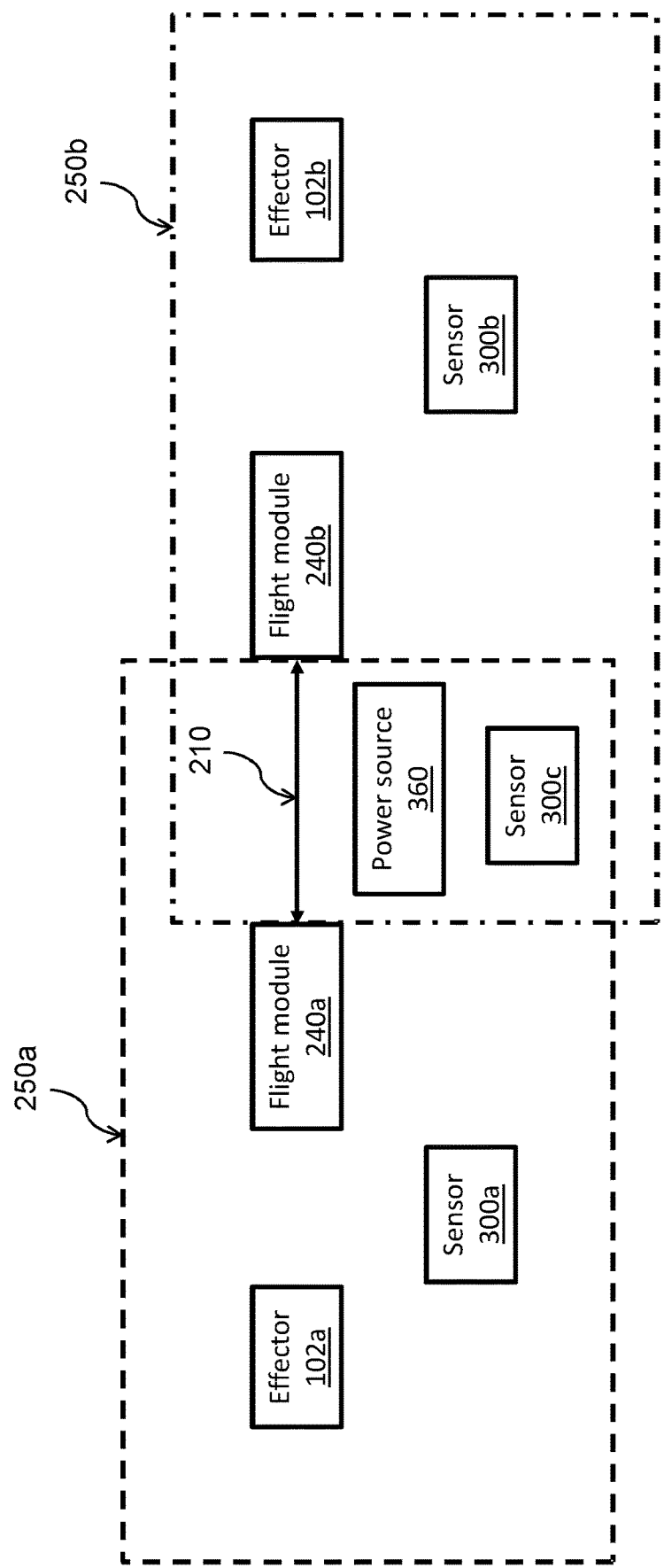
FIG. 4D shows an example embodiment with two subsystems sharing a single communication channel, single power source, and single shared sensor.

FIGS. 4B to 4D show schematic diagrams of different embodiments of an aerial vehicle according to the present invention with two subsystems 250a, 250b in which the subsystems share system components. In FIG. 4B, the redundant aerial vehicle comprises a single bidirectional communication channel 210; this single bidirectional communication channel 210 is connected between the two subsystems 250a, 250b and is used for the exchange of signals between the subsystems 250a and 250b.

In FIG. 4C, the aerial vehicle comprises a single power source 360; the single power source is connected to each of the two subsystems 250a, 250b so that the single power source provides power to each of the two subsystems 250a, 250b. Accordingly the single power source is shared by both subsystems. In another embodiment the single power source is selectively connected to either of the two subsystems 250a, 250b so that it provides power exclusively to the subsystem 250a, 250b to which it is connected. While the power source will be a single point of failure in the system, a power source that achieves a sufficiently high level of reliability (for example, because it uses components of very high reliability or because it includes internal redundancy mechanisms) may justify such a design decision due to other system design constraints (e.g. weight, size, cost).

In a variation of the embodiment illustrated in FIG. 4c, the aerial vehicle may comprises a single set of highly reliable sensors or a single highly reliable central processing unit which is/are shared by the two subsystems 250a, 250b. FIG. 4D shows a schematic diagram of a redundant aerial vehicle in which, in addition to the power source as shown in FIG. 4C, an additional sensor 300c is also shared by both subsystems 250a, 250b. In addition to the shared sensor 300c the subsystem 250a has its own sensor 300a which is used exclusively by the subsystem 250a and the subsystem 250b has its own sensor 300b which is used exclusively by the subsystem 250b; in other words the sensors 300a, 300b are not shared. In some embodiments only shared sensors are used when flying the aerial vehicle under the control of a subsystem (not shown). In some embodiments only effectors belonging exclusively to the first subsystem are selectively used to fly the aerial vehicle so that the vehicle is flown using exclusively the effectors of the first system (i.e. not using the effectors or sensors of second subsystem 250b for flight), or only effectors belonging exclusively to the second subsystem 250b are selectively used to fly the aerial vehicle so that the vehicle is flown using exclusively the effectors of the second system (i.e. not using the effectors or sensors of the first subsystem 250a for flight). Also in another example, the redundant aerial vehicle may be configured to operate the sensors belonging exclusively to only one of the subsystems 250a, 250b; for example during flight only the sensor of the first subsystem 250a may be operable during flight, or during flight only the sensor of the second subsystem 250b may be operable during flight; the system may also switch between operating exclusively the sensors of the first and second subsystems 250a,b so that at any one time the sensor of only one of the subsystems 250a, 250b are operable. Such architectures may be beneficial if one or more shared sensors or sets of sensors are either highly reliable, or if using two sensors or sets of sensors of a certain sensor type is not possible (for example, because sensors are prohibitively expensive, heavy, or large; or because multiple sensors would interfere, such as ultrasonic sensors).

The outputs of a shared power source or a shared sensor or shared set of sensors may then be used by each subsystem as if it were their own (albeit, as will be apparent to a person skilled in the art, without the specific subsystem's checks and processes designed to disable subsystems or the subsystem's components in case of a failure). For example, in an embodiment with a shared power source (that is required for emergency operation) and a shared depth vision sensor (that is not required for emergency operation): During normal operation, each subsystem may use power from the shared power source to power the subsystem's electronics and actuators and each subsystem may also use the data provided by the shared depth vision sensor to perform part of a shared 3D mapping task. During emergency operation with a first subsystem shut down as a result of a failure and a second subsystem controlling the multicopter, the second subsystem may use power from the same previously shared power source and may no longer require data provided by the shared sensor for operation (e.g., an emergency landing).

Figure 5:
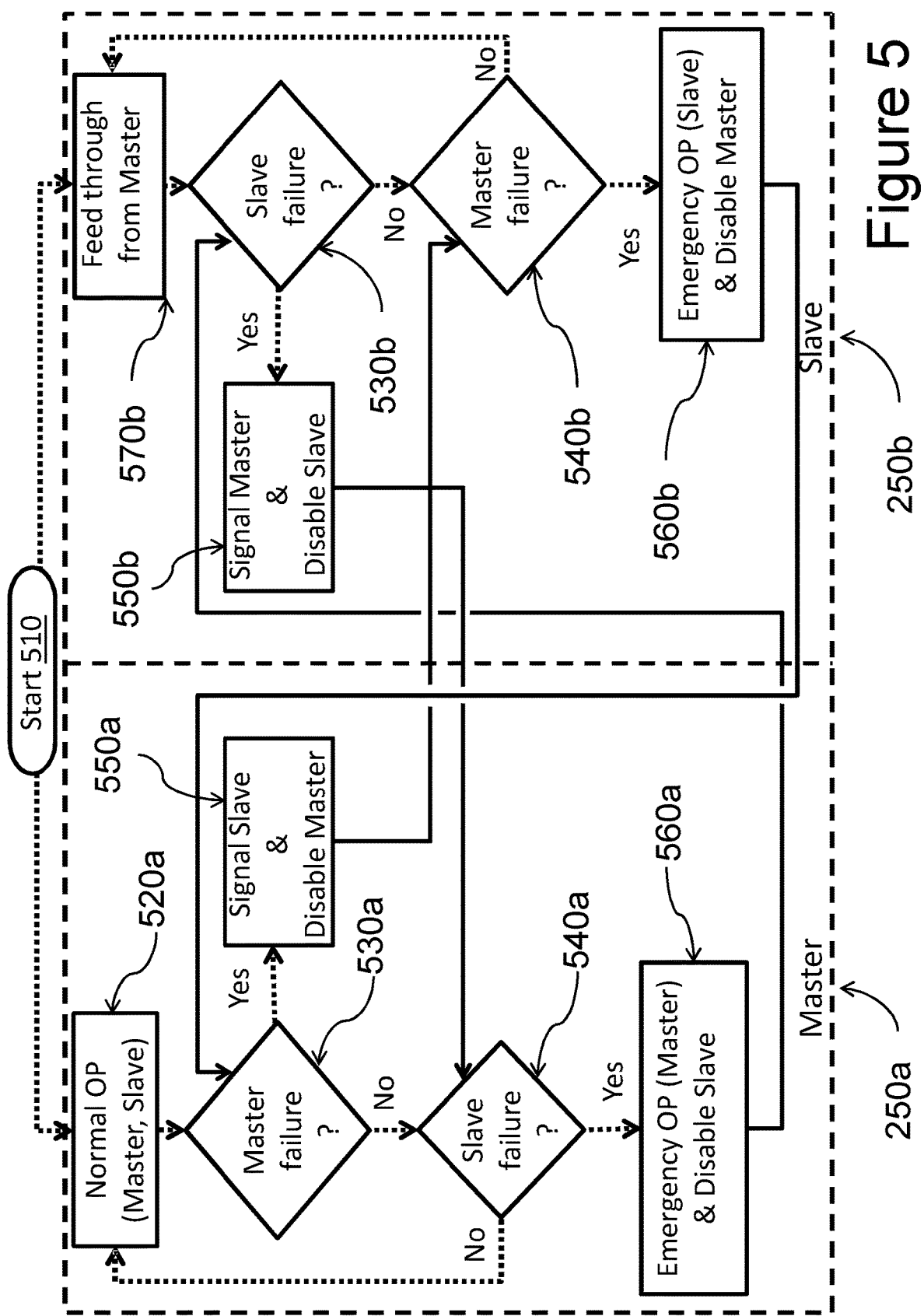
FIG. 5 shows a flowchart used to explain an example decision process in a sample embodiment.

FIG. 5 shows an example decision process for an embodiment with a signal flow like the one shown in FIG. 3. Dotted arrows indicate transitions between states and continuous arrows indicate signal flow.

In the present example embodiment, the Master's switch 340a has three positions: A first position ("1") for forwarding the Master's normal operation control unit's 310a signals to the Master's effectors 102a; a second position ("2") for forwarding the Master's emergency control units' 320a signals to the Master's effectors 102a, and a third position ("3") that does not forward any control signals to the Master's effectors 102a. The Slave's switch 340b has three positions: A first position ("1") for forwarding the Master's normal operation control unit's 310a signals (received via the Master's coordination unit 350a, communication channel 210, and Slave's coordination unit 350b) to the Slave's effectors 102b; a second position ("2") for forwarding the Slave's emergency control units' 320b signals to the Slave's effectors 102b, and a third position ("3") that does not forward any control signals to the Slave's effectors 102b.

On start 510, the Master 250a enters normal operation 520a.

Normal Operation

During normal operation the aerial vehicle 100 is controlled by the Master's flight module 240a. The Master's normal operation control unit 310a provides control signals for the Master's effectors 102a and for the Slave's effectors 102b.

As long as no failure is detected, the Master is in states 520 (normal operation), 530a (monitor for a failure in the Master), and 540a (monitor for a failure in the Slave).

Control signals for the Master's effectors 102*a* are forwarded via the Master's switch 340*a*. The Slave is in states 570*b* (normal operation, with control signals for the Slave's effectors 102*b* fed through from the Master), 530*b* (monitor for a failure in the Slave), and 540*b* (monitor for a failure in the Master). For the Slave, feeding through of control signals from the Master is achieved by forwarding the Master's normal operation control unit's control signals via the Master's coordination unit 350*a*, the first communication channel 210.1, the Slave's coordination unit 350*b*, and the Slave's switch 340*b*, to the Slave's effectors 102*b*.

Therefore, during normal operation, continuous failure monitoring is performed by the Master's and the Slave's failure detection units 330*a*, 330*b*. The Master's failure detection unit 330*a* monitors for a failure of the Master 530*a* and for a failure of the Slave 540*a*. The Slave's failure detection unit 330*b* monitors for a failure of the Slave 530*b* and for a failure of the Master 540*b*. If no failures are detected, normal operation proceeds.

While normal operation does not require the Master's and Slave's emergency control units 320*a*, 320*b* (and also does not require the Slave's normal operation control unit 310*b*, if present), it may be desirable to nevertheless operate these units without forwarding their control signals to the effectors. Instead, these control signals may be forwarded to a failure detection unit, which may then compare them between each other, or compare them to other control signals, or compare them to a model. This may allow (1) verifying their operability. Operating these units without forwarding their signals through the switch may also provide (2) "hot-start" capabilities to immediately switch over to the operation of a different subsystem 250*a*, 250*b* should the need arise. For the same purposes (1) and (2), the control signals generated by the Slave's normal operation control unit 310*b*, if present, may be forwarded to a failure detection unit. Not forwarding control signals to effectors may, for example, be achieved by using a coordination unit and a switch. Alternatively, a coordination unit could, for example, use multiple switches to selectively switch control units on and off as needed. Similarly, forwarding control signals from a control unit to a failure detection unit may be achieved using a combination of coordination unit(s) and switch(es).

During normal operation, the switch positions are 1/1 for Master/Slave, respectively (i.e., the Master's switch 340*a* is in its first position and the Slave's switch 340*b* is in its first position).

Master failure detected by Master (530*a*): If the Master's failure detection unit 330*a* detects a failure of the Master 530*a*, the Master 250*a* will enter state 550*a*. It will send a signal to the Slave 250*b*, which is generated by the failure detection unit 330*a* and communicated via the Master's coordination unit 350*a* and the communication channel 210 to the Slave's coordination unit 350*b*. As a result of this signal, the Slave will enter its emergency operation mode state 560*b*. This is achieved by the Slave's coordination unit 350*b* sending a signal to the switch 340*b*, which will then forward the control signals of the Slave's emergency control unit 320*b* to the Slave's effectors 102*b*. The Slave's effectors 102*b* are thus controlled by the Slave's emergency control unit 320*b*. The Slave sends a corresponding confirmation signal confirming the switching back to the Master.

The Master 250*a* is disabled by the Master's coordination unit 350*a* sending a switching signal to the Master's switch 340*a* to stop forwarding control signals to the Master's effectors 102*a*. The aerial vehicle 100 is now flown by the Slave's effectors 102*b* alone, with the Master's effectors 102*a* disabled. The Slave is now in state 560*b*. The Master is now in states 530*a* and 550*a*. The switch positions of this state are 3/2 for Master/Slave, respectively.

Slave failure detected by Master 540*a*: If the Master's failure detection unit 330*a* detects a failure of the Slave 540*a*, the Master will enter its emergency operation mode 560*a* and send a signal to the Slave's coordination unit 350*b* to disable the Slave's effectors 102*b* using its switch 340*b*. The Slave is now in state 550*b*. It sends a corresponding confirmation signal back to the Master. The aerial vehicle 100 is now flown by the Master's effectors 102*a* alone, with the Slave's effectors 102*b* disabled. The switch positions of this state are 2/3 for Master/Slave, respectively.

Slave failure detected by Slave 530*b*: Similarly, if the Slave's failure detection unit 330*b* detects a failure of the Slave 530*b*, the Slave 250*b* will enter state 550*b*. It will send a signal to the Master 250*a* and disable the Slave's effectors 102*b*. The switch positions of this state are 2/3 for Master/Slave, respectively.

Master failure detected by Slave 540*b*: If the Slave's failure detection unit 330*b* detects a failure of the Master 540*b*, the Slave will enter its emergency operation state 560*b*. It will send a corresponding signal to the Master's coordination unit 350*a* to disable the Master's forwarding of control signals to the Master's effectors 102*a*. The switch positions of this state are 3/2 for Master/Slave, respectively.

Failure of Communication Channel

Another failure mode that may be mitigated by the present invention concerns the failure of one of the unidirectional or bidirectional communication channels 210.1, 210.2 with corresponding signals (e.g., coordination signals, control signals).

A single failure affecting one of two bidirectional communication channels 210.1, 210.2 does not compromise the communication between the Master subsystem 250*a* and the Slave subsystem 250*b*, which can still rely on the second communication channel 210.2, 210.1. Therefore, the two coordination units 350*a*, 350*b* may not react to the failure by entering an emergency mode, and may instead continue under the control of the Master's normal operation unit. A single failure affecting the transmission port or the reception port of one of the two coordination units 350*a*, 350*b* can be treated as a failure of one of the bidirectional communication channels 210.1, 210.2. In some embodiments such a failure may be detected using a loop-back. For example, a CAN driver-to-receiver loopback or self-diagnostic function may be used to check the functioning of a communication channel without using or disturbing the communication channel.

A single failure affecting one of two unidirectional communication channels 210.1, 210.2, a single transmission port, or a single reception port will result in one of the two coordination units 350*a*, 350*b* no longer receiving data from the other coordination unit 350*b*, 350*a*. This failure can be treated as a failure of one of the effectors associated with the subsystem of the coordination unit that is transmitting on the faulty communication channel, resulting in failure modes similar to those outlined above 530*a*, 530*b*, 540*a*, 540*b*.

For example, a failure affects a uni-directional communication channel (or its related transmission/reception port) transmitting data from the Master to the Slave, then the Slave will enter its emergency operation mode 560*b* and will send a signal to the Master's coordination unit 350*a* to disable the Master 250*a*. The switch positions of this state are 3/2 for Master/Slave, respectively.

Conversely, if a failure affects a uni-directional communication channel (or its related transmission/reception port) transmitting data from the Slave to the Master, then the Master's failure detection unit 330a will detect the absence of signals, will enter its emergency operation mode 560a, and will send a signal to the Slave's coordination unit 350b to disable the Slave 250b. The switch positions of this state are 2/3 for Master/Slave, respectively.

Indirect Failure Detection

A failure of a subsystem may also be detected indirectly, by another subsystem. In the embodiments shown in FIGS. 3 and 4, this can, for example, be achieved by monitoring the Master's failure state using the Slave's failure detection unit.

This may, for example, be achieved by having the Master send a regular "heart beat" signal to the Slave (e.g., generated by the Master's coordination unit and transmitted through the communication channel) and having the Slave monitor the presence of this heartbeat (e.g., using the Slave's coordination unit and failure detection unit). The absence of the heart beat signal can then be used as an indication for the Master's failure (as may, e.g., be caused by a failure of the Master's power source).

This may, for example, also be achieved by (1) having the Master 250a send data indicative of its operation to the Slave (e.g., via the Master's coordination unit, the communication channel 210, and the Slave's coordination unit), (2) having the Slave's failure detection unit 330b monitor that data for failures, and (3) having the Slave's failure detection unit 330b react to such a detected failure in the same way that it would react to the reception of a signal from the Master that indicates a detected failure of the Master 250a.

Some embodiments described above provide redundancy, but rely on each subsystem's failure detection and coordination unit as well as on the first or second communication channel. The embodiments can be further improved. For example, a subsystem's failure detection unit may use sensors signals to detect anomal behavior of another subsystem and to detect a failure and trigger an emergency mode. As another example, failure detection units may exchange heartbeat signals via the first and the second communication channel. A failure detection unit may then use the absence of a heartbeat to trigger its emergency mode. In some embodiments motor control signals may serve as heartbeat signals. In some embodiments a heartbeat signal may be replaced by a "disable" signal once a subsystem enters an emergency mode.

To summarize, in the absence of a failure, the aerial vehicle's effectors 102a, 102b are therefore controlled by the Master's normal operation control unit 310a. In more complex embodiments multiple normal operation control units may be used. In case of a failure of the Master 250a, the aerial vehicle 100 enters an emergency mode controlled by the Slave 320b and the aerial vehicle 100 is entirely flown using the Slave's effectors 102b alone. Conversely, in case of a failure of the Slave 250b, the aerial vehicle 100 enters an emergency mode controlled by the Master 320a and the aerial vehicle 100 is entirely flown using the Master's effectors 102a alone.

More Complex Failure Cases

More complex embodiments where the Slave includes a normal operation control unit, such as the one shown in FIG. 4, may offer additional options to mitigate failures that may, for example, allow to continue using a subsystem in spite of a failure.

For example, in some embodiments a failure of a Master's sensor 300a or a failure of the Master's normal operation control unit 310a may be mitigated. Here it is assumed that the Master's failure detection unit has determined that this failure has occurred and has communicated the failure to the Master's coordination unit. It is also assumed that the Slave's sensors and normal operation control unit are operational, and that the Slave's and Master's power sources, effectors, switches, and coordination units are operational. It is further assumed that the Master's switch has four positions: A first where it forwards the Master's normal operation unit's control signals to the Master's effectors; a second where it forwards the Slave's normal operation unit's control signals to the Master's effectors; a third where it forwards the Master's emergency control unit's control signals to the Master's effectors; and a fourth where it blocks forwarding of control signals to the Master's effectors ("off" switch). Similarly, it is further assumed that the Slave's switch has four positions: A first where it forwards the Master's normal operation unit's control signals to the Slave's effectors; a second where it forwards the Slave's normal operation unit's control signals to the Slave's effectors; a third where it forwards the Slave's emergency control unit's control signals to the Slave's effectors; and a fourth where it blocks forwarding of control signals to the Slave's effectors ("off" switch). The valid operational states can be summarized as normal operation by Master (with switch positions 1/1 for the Master's/Slave's switch, respectively); normal operation by Slave (with switch positions 2/2 for the Master's/Slave's switch, respectively); emergency operation by Master (with switch positions 3/4 for Master's/Slave's switch, respectively); and emergency operation by Slave (with switch positions 4/3 for Master's/Slave's switch, respectively).

Under the two example failure modes mentioned above (failure of a Master's sensor 300a or a failure of the Master's normal operation control unit 310a), control of all effectors of the redundant aerial vehicle is handed over to the Slave's normal operation control unit (i.e., normal operation by Slave).

In a first case, where the failure is detected by the Master's failure detection unit, the failure mitigation process is initiated by the Master's coordination unit transmitting a signal (e.g., containing data indicative of the type of failure as determined by the Master's failure detection unit) to the Slave's coordination unit. In a second case, where the failure is detected by the Slave's failure detection unit, the failure mitigation process is initiated by the Slave's coordination unit transmitting a signal (e.g., containing data indicative of the type of failure as determined by the Slave's failure detection unit) to the Master's coordination unit.

In both cases, the Slave's coordination unit then emits a signal to the Slave's switch that then selectively forwards the control signals from the Slave's normal operation control unit to the Slave's effectors (Slave's switch position 2); and the Master's coordination unit emits a signal to cause the Master's switch to forward the Slave's normal operation control unit's control signals, which are received via the Slave's and Master's coordination units, to the Master's effectors (Master's switch position 2). Thus, the signals from the Slave's normal operation control unit are received by all effectors, while the signals from the Master's normal operation control unit do not affect the effectors. The signals from the Master's defective sensor or the Master's defective normal operation control unit thus do no longer affect the flight of the redundant aerial vehicle.

Figure 6A:
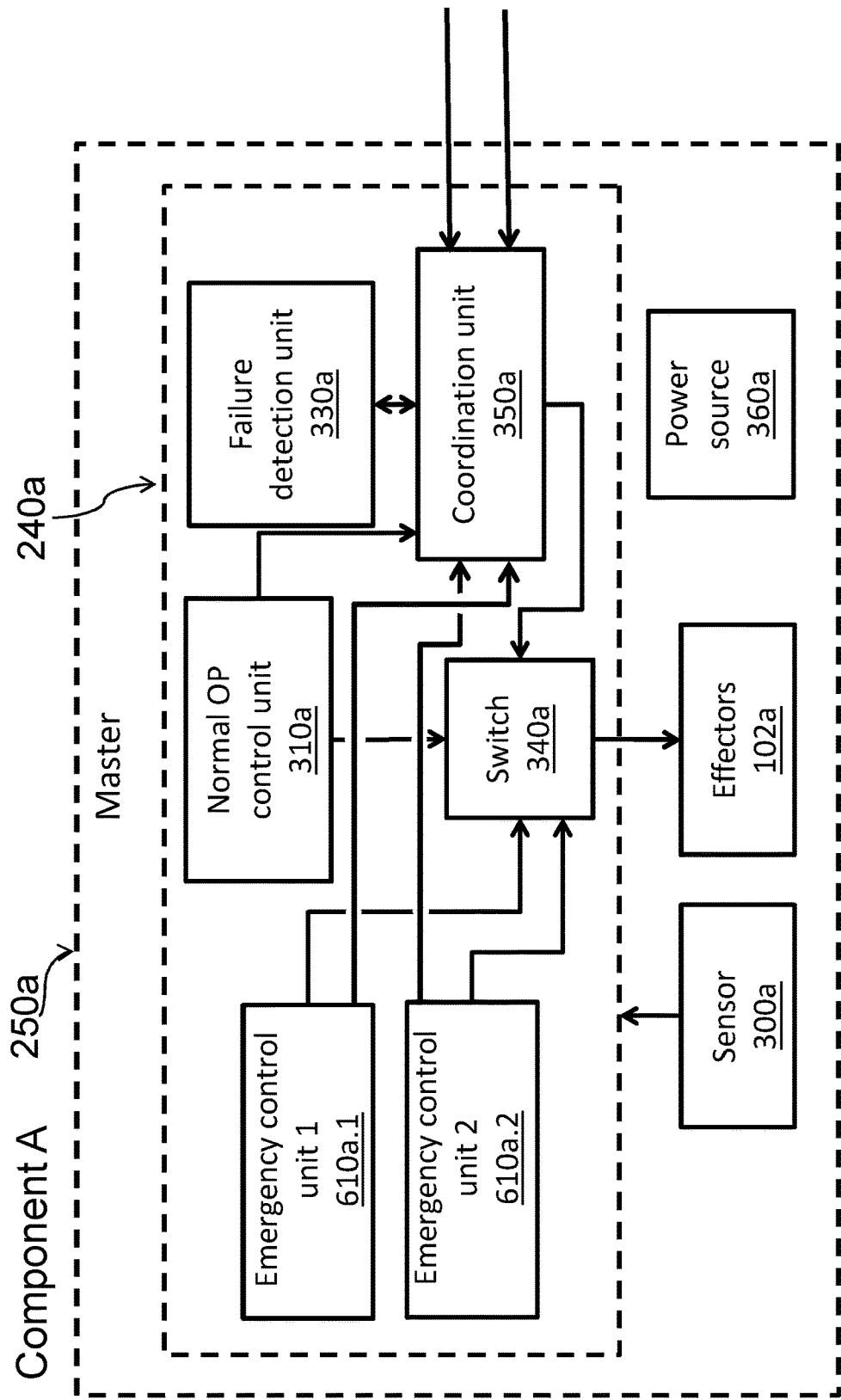
Figure 6B:
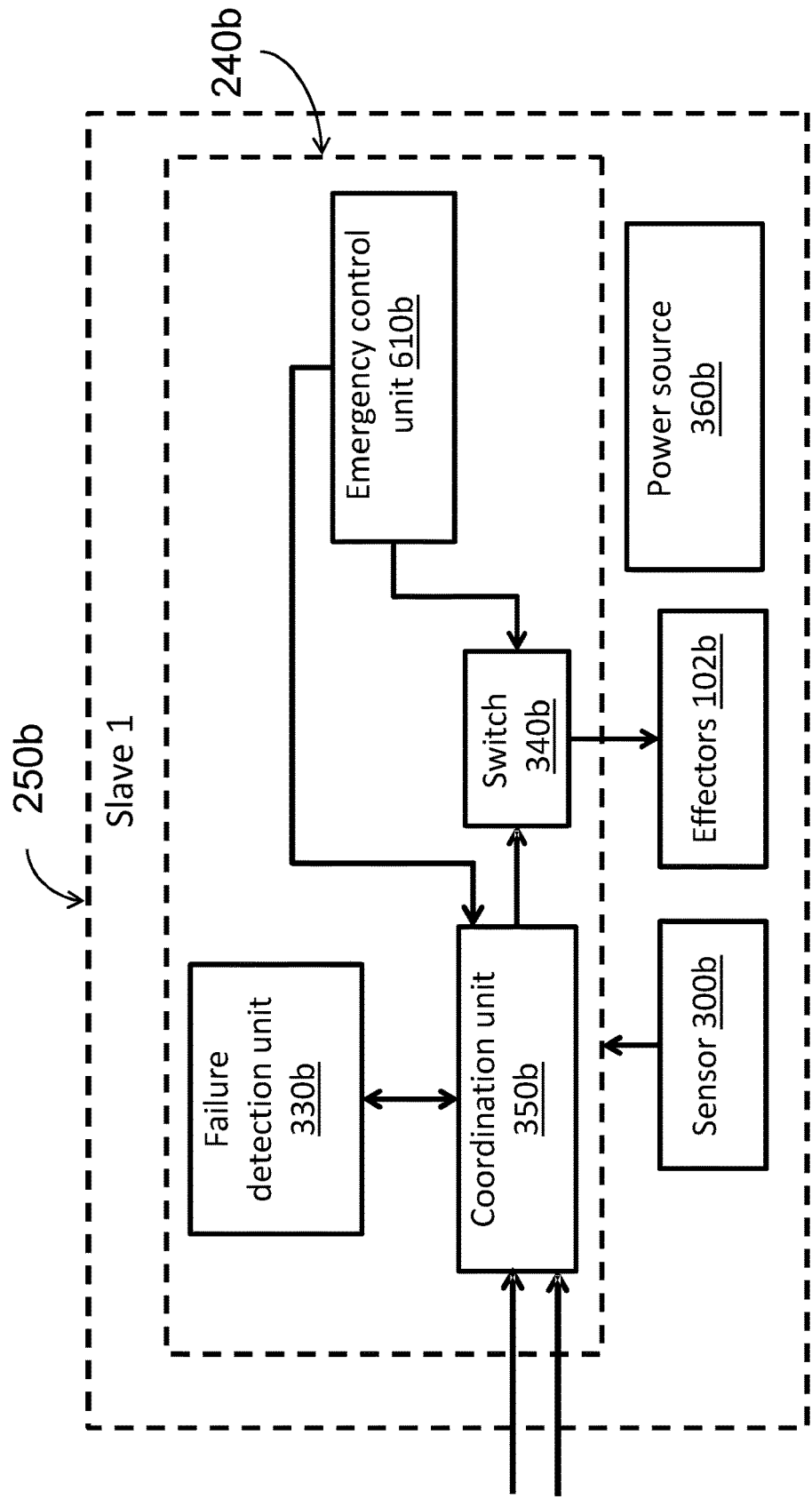
Figure 6D:
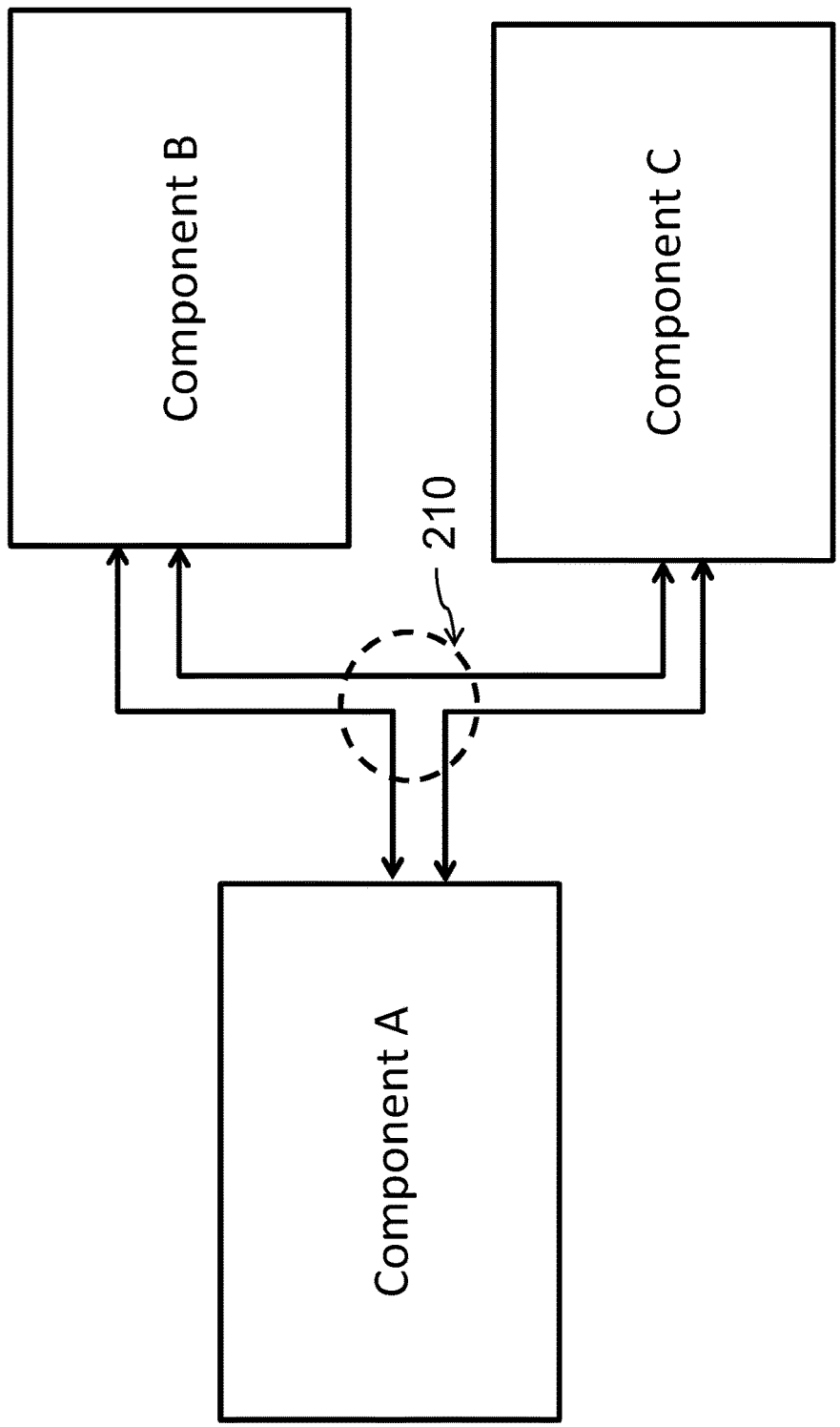

FIG. 6 shows a block diagram used to explain the functioning of a sample embodiment with three subsystems, with the first subsystem shown in FIG. 6A, the second subsystem shown in FIG. 6B, the third subsystem shown in FIG. 6C, and an overview shown in FIG. 6D. The arrows indicate signal flow. Note that detailed sensor signal flow is omitted in FIG. 6 for clarity. The first subsystem 250a acts as Master, with the other two subsystems acting as a first Slave ("Slave 1", 250b) and as a second Slave ("Slave 2", 250c). In this embodiment, the Master 250a comprises three control units: A normal operation control unit 310a, a first emergency control unit 610a.1, and a second emergency control unit 610a.2. Slave 1 250b comprises a third emergency control unit 610b. In this embodiment, which illustrates a simple case, Slave 2 250c does not comprise a control unit since mitigation against a single failed subsystem can be achieved by having Slave 1's control unit take over control in case of a failure of the Master subsystem, and by having the Master's control unit take over control in case of a failure of Slave 1's subsystem. In this embodiment, the Master and Slave 1 subsystems 250a, 250b are fully self-sufficient; they each contain their own power source 360a, 360b, their own sensor 300a, 300b, their own effectors 102a, 102b, and their own flight module 240a, 240b. In this embodiment, the Master, Slave 1, and Slave 2 subsystems exchange signals through three communication channels 210.

Figure 7:
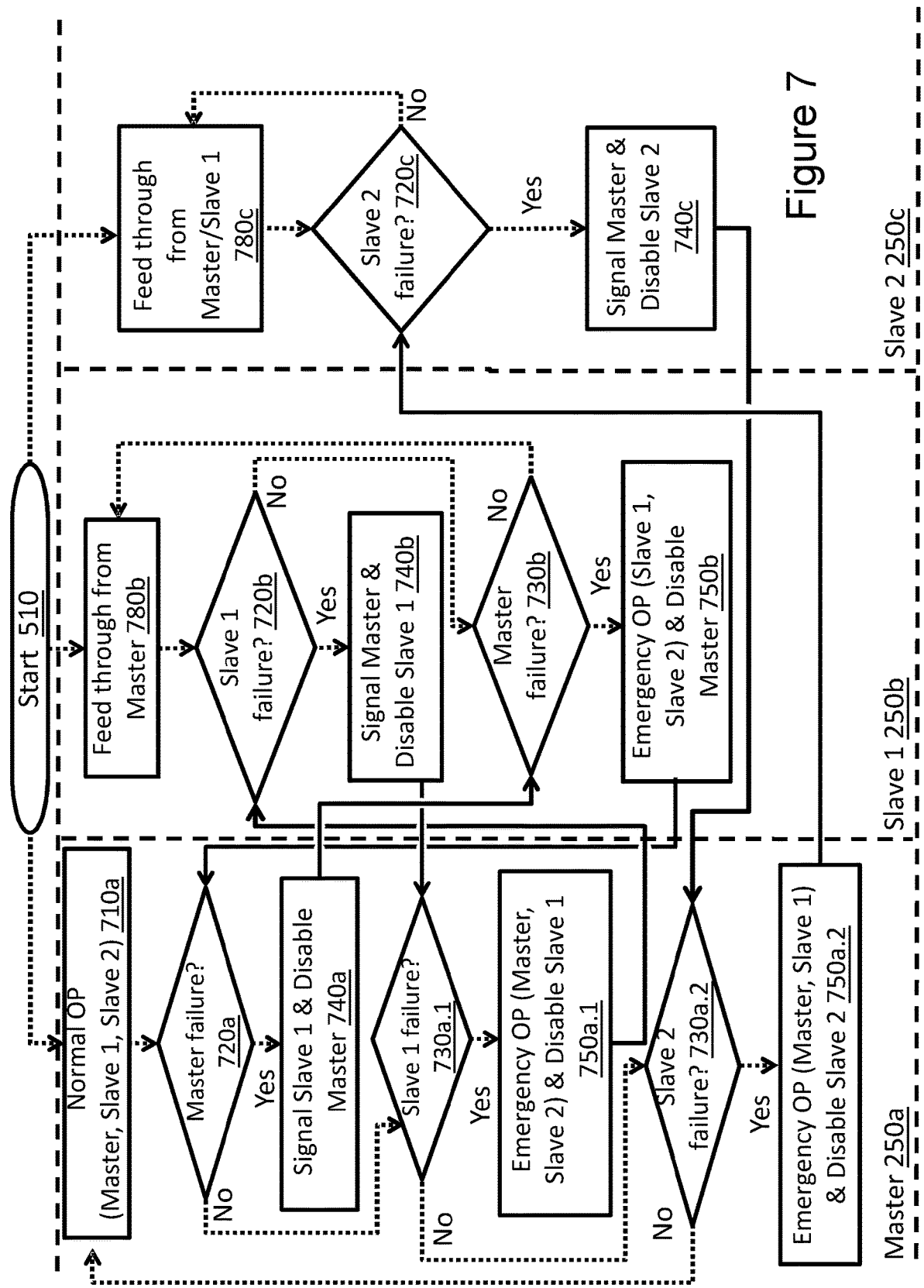
FIG. 7 shows a flowchart used to explain an example decision process in a sample embodiment with three subsystems.

FIG. 7 shows a flowchart used to explain an example decision process in a sample embodiment with three subsystems similar to the one shown in FIG. 6. Dotted arrows indicate transitions between states and continuous arrows indicate signal flow.

In this sample embodiment the aerial vehicle 100 is either flown under the control of the Master's normal operation control unit 310a (using effectors 102a, 102b, and 102c), or under the control of the Master's emergency control unit 1 610a.1 (using effectors 102a and 102c only, e.g. due to a failure in Slave 1 250b), or under the control of the Master's emergency control unit 2 610a.2 (using effectors 102a and 102b, e.g. due to a failure in Slave 2 250c), or under the control of Slave 1's emergency control unit 610b (using effectors 102b and 102c, e.g. due to a failure in the Master 250a).

In this sample embodiment, the Master's switch 340a, which is selecting signals for the Master's effectors 102a, has four positions: Forward control signals from the Master's normal operation control unit 310 (position 1), forward control signals from the Master's emergency control unit 1 (position 2), forward control signals from the Master's emergency control unit 2 (position 3), and not forwarding any control signals (position 4, "off" switch). Slave 1's switch 340b, which is selecting signals for Slave 1's effectors 102b, has three positions: Forward control signals received from the Master (position 1), forward control signals from Slave 1's emergency control unit 610b (position 2), and not forwarding any control signals (position 3, "off" switch). Slave 2's switch 340c, which is selecting signals for Slave 2's effectors 102c, has two positions: Forward control signals received from the Master or Slave 1 (position 1) and not forwarding any control signals (position 2, "off" switch).

Referring now to FIG. 7, on Start 510, the Master 250a starts normal operation 710a, computing control signals for the aerial vehicle 100 using its normal operation control unit 310a. Slave 1 250b and Slave 2 250c feed the Master's control signals through 780b, 780c to their respective effectors 102b, 102c. For the Master, this is achieved by passing the control signals generated by the Master's normal operation control unit 310a and the Master's switch 340a (by setting it to position 1 using the Master's coordination unit 350a) to the Master's effectors 102a. For Slave 1 250b, this is achieved by passing the control signals generated by the Master's normal operation control unit 310a via the Master's coordination unit 350a, a communication channel 210, Slave 1's coordination unit 350b, and Slave 1's switch 340b (by setting it to position 1 using Slave 1's coordination unit 350b) to Slave 1's effectors 102b. For Slave 2 250c, this is achieved by passing the control signals generated by the Master's normal operation control unit 310a via the Master's coordination unit 350a, a communication channel 210, Slave 2's coordination unit 350c, and Slave 2's switch 340c (by setting it to position 1 using Slave 2's coordination unit 350c) to Slave 2's effectors 102c.

During this normal operation, all subsystems' failure detection units 330a, 330b, 330c continuously monitor the aerial vehicle 100 for failures. In this embodiment the Master's failure detection unit 330a monitors its own failures 720a, those of Slave 1 730a.1, and those of Slave 2 730a.2. Slave 1's failure detection unit 330b monitors its own failures 720b as well as failures of the Master 730b. Slave 2's failure detection unit 330c monitors its own failures 720c. The corresponding switch positions are 1/1/1 for Master, Slave 1, and Slave 2, respectively.

This system therefore has the following failure states, with corresponding actions:

Master failure detected by the Master 720a: Detection of a failure results in state 740a, with the Master 250a sending a signal to Slave 1 250b that a Master failure has occurred. This causes Slave 1 250b to enter its emergency operation state 750b. In this state 750b, Slave 1 250b sends a signal confirming that the Master 250a should disable forwarding of control signals to its effectors 102a (i.e., Master switch position 4). Slave 1 250b in state 750b is computing control signals for the aerial vehicle 100 using its emergency control unit 610b, which are forwarded to Slave 1's effectors 102b via Slave 1's switch 340b (i.e., Slave 1's switch position 2). Control signals from Slave 1's emergency control unit 610b are also forwarded to Slave 2's effectors 102c via Slave 1's coordination unit 350b, a communication channel 210, Slave 2's coordination unit 350c, and Slave 2's switch 340c (with corresponding switch position 1). Note that in this sample embodiment Slave 2's switch 340c does not have switch positions to select between forwarding control signals originating from the Master 250a and control signals originating from Slave 1 250b. Here, this selection is performed by Slave 2's coordination unit 350c by forwarding control signals originating from the Master 250a by default, and only forwarding control signals from Slave 1 if such signals are received and no control signals are received from the Master 250a. In this failure case, the aerial vehicle 100 therefore only uses the effectors of Slave 1 102b and Slave 2 102b. The corresponding switch positions are 4/2/1 for Master, Slave 1, and Slave 2, respectively.

Slave 1 failure detected by the Master 730a.1: Detection of a failure in this state results in the Master 250a entering emergency operation 750a.1 and sending a corresponding failure signal over a communication channel 210 to Slave 1 250b. Slave 1 250b enters state 740b, sets its switch to position 3 ("off"), and sends a confirmation signal over a communication channel 210 to the Master 250a. The Master 250a is now computing control signals for the aerial vehicle 100 using its first emergency control unit 610a.1. The aerial vehicle 100 only uses the effectors of the Master and of Slave 2. The corresponding switch positions are 2/3/1 for Master, Slave 1, and Slave 2, respectively.

Slave 2 failure detected by the Master 730a.2: Detection of a failure in this state results in the Master 250a entering emergency operation 750a.2 and sending a corresponding failure signal over a communication channel 210 to Slave 2 250c. Slave 2 250c enters state 720c and (e.g., after confirming the failure), state 740c where it sets its switch to position 2 ("off"), and sends a confirmation signal over a communication channel 210 back to the Master 250a. The Master 250a is now computing control signals for the aerial vehicle 100 using its second emergency control unit 610a.2. The aerial vehicle 100 only uses the effectors of the Master and of Slave 1. The corresponding switch positions are 3/1/2 for Master, Slave 1, and Slave 2, respectively.

Slave 1 failure detected by Slave 1 720b: Detection of a failure in this state results in Slave 1 250b entering state 740b, which consists of sending a corresponding failure signal over a communication channel 210 to the Master 250a and of setting its own switch to position 3 ("off"). The Master 250a enters emergency operation 750a.1, and is computing control signals for the aerial vehicle 100 using its first emergency control unit 610a.1. In state 750a1, the Master 250a also sends a signal to Slave 1 250b to confirm that Slave 1 should disable. The aerial vehicle 100 only uses the effectors of the Master and of Slave 2. The corresponding switch positions are 2/3/1 for Master, Slave 1, and Slave 2, respectively.

Master failure detected by Slave 1 730b: Detection of a failure in this state results in the Slave 1 250b entering emergency operation 750b and sending a corresponding failure signal over a communication channel 210 to the Master 250a. The Master 250a sets its switch to position 4 ("off") and sends a confirmation signal over a communication channel 210 to Slave 1 250b. Slave 1 is now computing control signals for the aerial vehicle 100 using its emergency control unit 610b. The aerial vehicle 100 only uses the effectors of Slave 1 and Slave 2. In the absence of control signals originating from the Master and the presence of control signals originating from Slave 1, Slave 2's coordination unit now forwards Slave 2's control signals to Slave 2's effectors 102c. The corresponding switch positions are 4/2/1 for Master, Slave 1, and Slave 2, respectively.

Slave 2 failure detected by Slave 2 720c: Detection of a failure in this state results in Slave 2 250c entering state 740c, which consists of sending a corresponding failure signal over a communication channel 210 to the Master 250a, and Slave 2 setting its switch to position 2 ("off"). The Master 250a enters emergency operation 750a.2, and is computing control signals for the aerial vehicle 100 using its second emergency control unit 610a.2. The aerial vehicle 100 only uses the effectors of the Master and of Slave 1. The corresponding switch positions are 3/1/2 for Master, Slave 1, and Slave 2, respectively.

Figure 8:
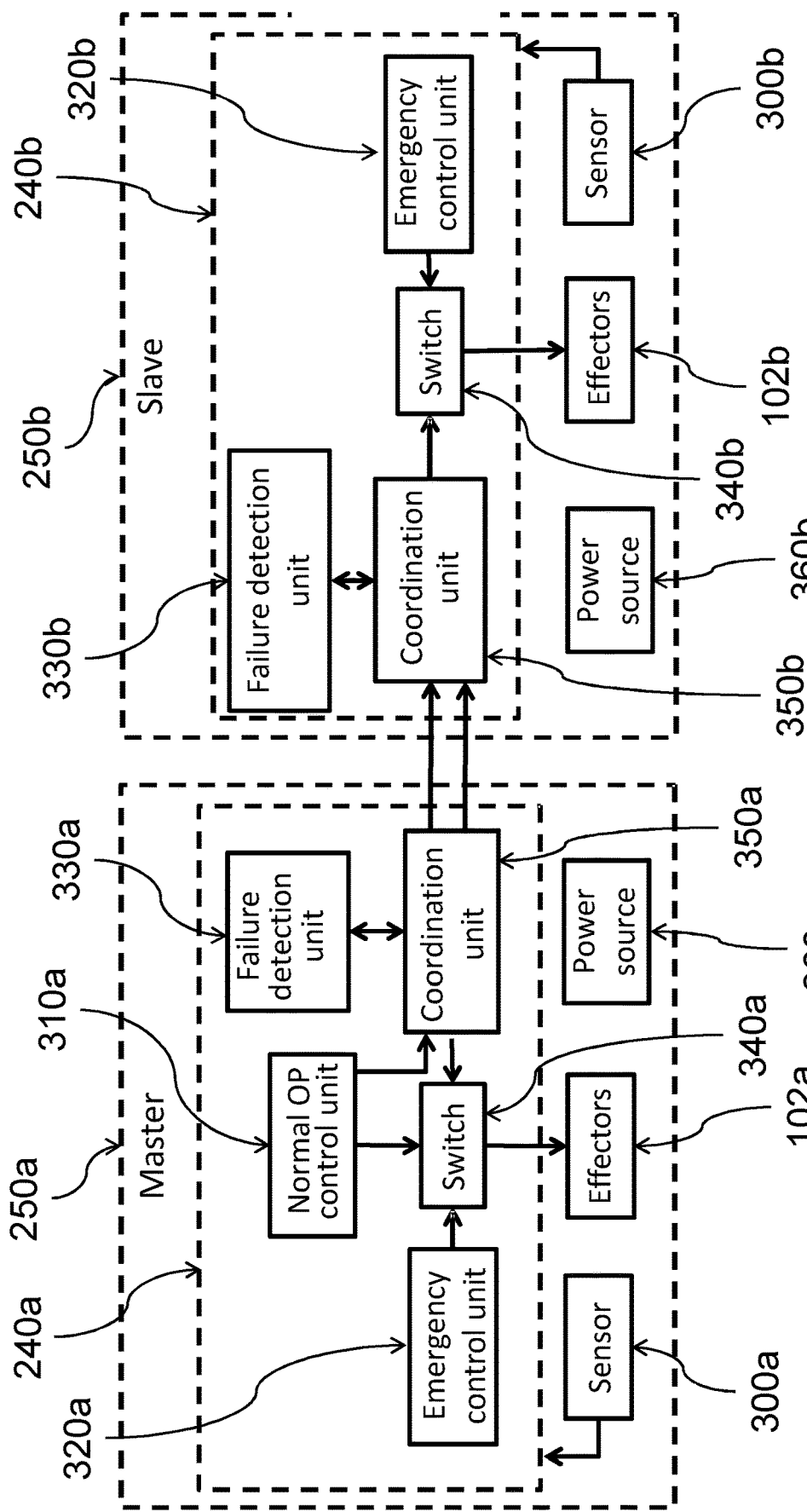
FIG. 8 shows a block diagram used to explain the functioning of a sample embodiment with two unidirectional communication channels.

FIG. 8 shows a block diagram used to explain the functioning of a sample embodiment with two unidirectional communication channels. The arrows indicate signal flow. Note that detailed sensor signal flow is omitted in FIG. 8 for clarity. In this embodiment the Master 250a does not receive signals from the Slave 250b. The Slave's coordination unit 350b receives signals from the Master 250a redundantly via two unidirectional communication channels 210.1, 210.2.

In this sample embodiment, the Master's switch 340a, which is selecting signals for the Master's effectors 102a, has three positions: Forward control signals from the Master's normal operation control unit 310 (position 1), forward control signals from the Master's emergency control unit (position 2), and not forwarding any control signals (position 3, "off" switch). The Slave's switch 340b, which is selecting signals for the Slave's effectors 102b, has three positions: Forward control signals from the Master's normal operation control unit 310 (position 1), forward control signals from the Slave's emergency control unit (position 2), and not forwarding any control signals (position 3, "off" switch).

Figure 9:
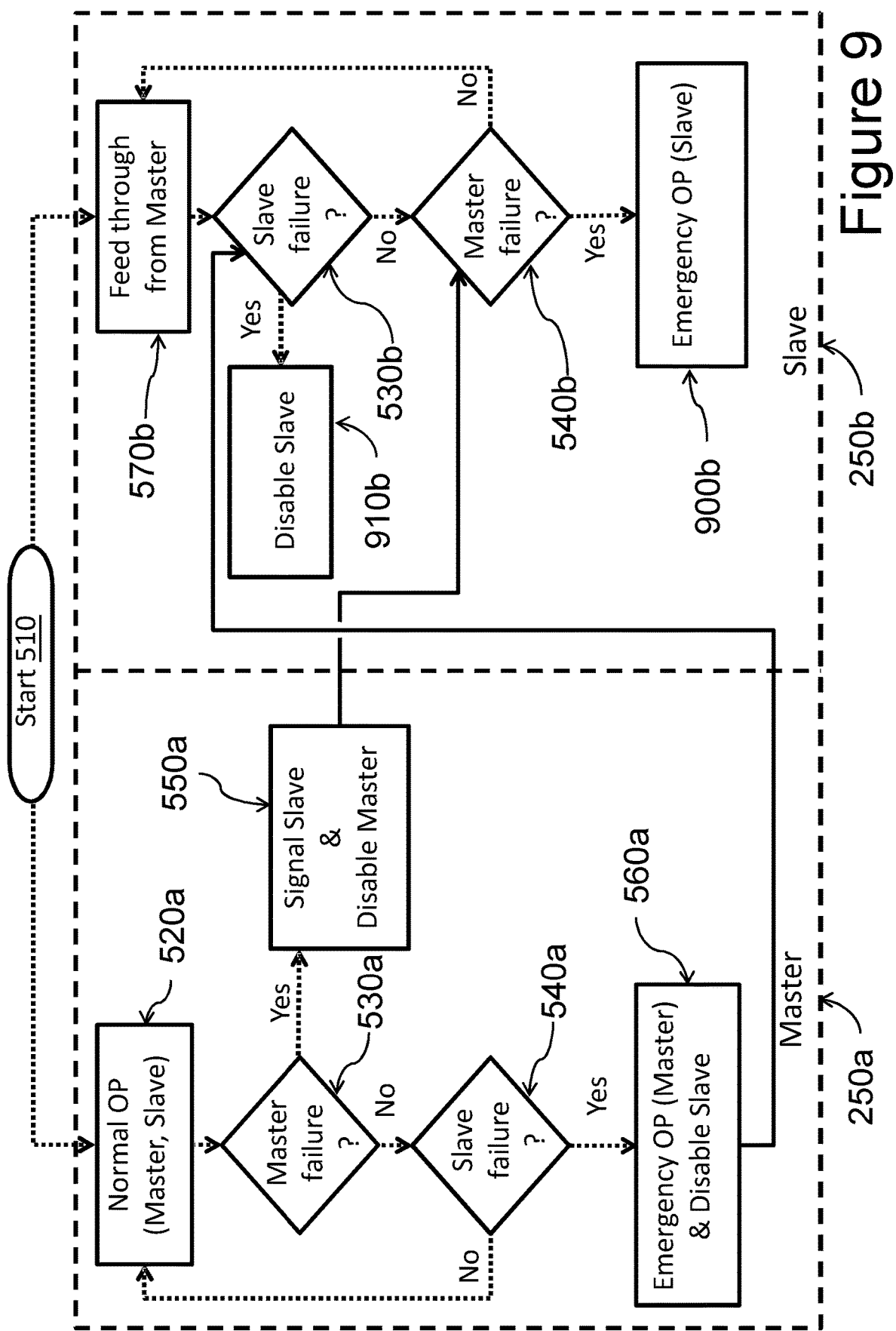
FIG. 9 shows a flowchart used to explain an example decision process in a sample embodiment with two unidirectional communication channels.

FIG. 9 shows a flowchart used to explain an example decision process for a sample embodiment with two unidirectional communication channels such as the one shown in FIG. 8. Dotted arrows indicate transitions between states and continuous arrows indicate signal flow. Both the Master's and Slave's failure detection units 330a, 330b can perform failure monitoring for their respective subsystems 530a, 530b. However, since the Master 250a does not receive signals from the Slave 100b, it cannot directly monitor for a Slave failure 540a. Instead, the Master monitors the Slave indirectly by comparing the actual output of its sensors 300a with the expected output of the sensors for normal operation. This can be achieved using various methods of failure detection outlined above. As another example, a failure may also be detected by (1) the Master sending a signal to trigger a Slave's movement, (2) the Master monitoring the flying machine's movements using its sensors, and (3) comparing the actual movement as recorded by its sensors to the desired movement triggered by its signal to the Slave to determine if a failure has occurred.

Note that the overall architecture of this embodiment is similar to the one described in FIGS. 3-5 above with redundant unidirectional communication channels from Master to Slave.

Also note that in the present embodiment the Slave's failure detection unit receives signals from the Master, and can therefore use the corresponding methods for failure detection described in the present disclosure. In addition, it can use the redundancy of communication channels and corresponding redundant signals to distinguish between a single failure of the Master or a single failure affecting one of the communication channels 210.1, 210.2.

During normal operation (i.e., in the absence of a failure), the switch positions are 1/1 for Master/Slave, respectively.

Master failure detected by Master 530a: If the Master's failure detection unit 330a detects a failure of the Master 530a, the Master 250a will enter state 550a. It will send a signal to the Slave 250b, which is generated by the failure detection unit 330a and communicated via the Master's coordination unit 350a and the communication channel 210 to the Slave's coordination unit 350b. As a result of this signal, the Slave will enter its emergency operation mode state 900b. This is achieved by the Slave's failure detection unit sending a signal to the Slave's coordination unit 350b, which in turn sends a signal to the switch 340b, which will then forward the control signals of the Slave's emergency control unit 320b to the Slave's effectors 102b. The Slave's effectors 102b are thus controlled by the control signals of the Slave's emergency control unit 320b. The Master 250a is disabled by the Master's failure detection unit sending a signal to the Master's coordination unit 350a, which in turn sends a switching signal to the Master's switch 340a to stop forwarding control signals to the Master's effectors 102a. The aerial vehicle 100 is now flown by the Slave's effectors 102b alone, with the Master's effectors 102a disabled. The Slave is now in state 900b. The Master is now in states 530a and 550a. The switch positions of this state are 3/2 for Master/Slave, respectively.

Slave failure detected by Master 540a: Conversely, if the Master's failure detection unit 330a detects a failure of the Slave 540a (e.g., using one of the methods of indirect failure detection described in the present disclosure), the Master will enter its emergency operation mode 560a and send a signal to the Slave's coordination unit 350b to disable the Slave's effectors 102b. The Slave is now in state 910b. The aerial vehicle 100 is now flown by the Master's effectors 102*a* alone, with the Slave's effectors 102*b* disabled. The switch positions of this state are 2/3 for Master/Slave, respectively.

Slave failure detected by Slave 530*b*: Similarly, if the Slave's failure detection unit 330*b* detects a failure of the Slave 530*b*, the Slave 250*b* will enter state 910*b*. It will disable its effectors 102*b*, allowing the Master's failure detection unit to detect its failure. The specifics of disabling the effectors may be adapted depending on the specifics of the aerial vehicle 100, its expected failure modes, the actual failure mode, and other factors. For example, the effectors may be disabled by immediately switching off forwarding of the control signals using the switch; by gradually reducing power supplied to the effectors over a time period of five seconds before switching off forwarding of the control signals using the switch; or by executing a predefined movement that allows the Master's failure detection unit to detect a failure with great accuracy or as rapidly as possible before switching off forwarding of the control signals using the switch. The Slave's coordination unit or failure detection unit may also monitor the signals received from the Master for an indication that the Master has successfully detected the failure. The switch positions of this state are 2/3 for Master/Slave, respectively.

Master failure detected by Slave 540*b*: If the Slave's failure detection unit 330*b* detects a failure of the Master 540*b*, the Slave will enter its emergency operation state 900*b*, switching to forwarding control signals from its emergency control unit 320*b* to its effectors 102*b*. In this case failure detection by the Slave may, for example, be achieved by monitoring for the absence of signals from the Master on both the first and the second communication channel. The Slave's failure detection unit may also monitor the signals received from the Master for an indication that the Master has successfully detected the failure. The switch positions of this state are 3/2 for Master/Slave, respectively.

Figure 10:
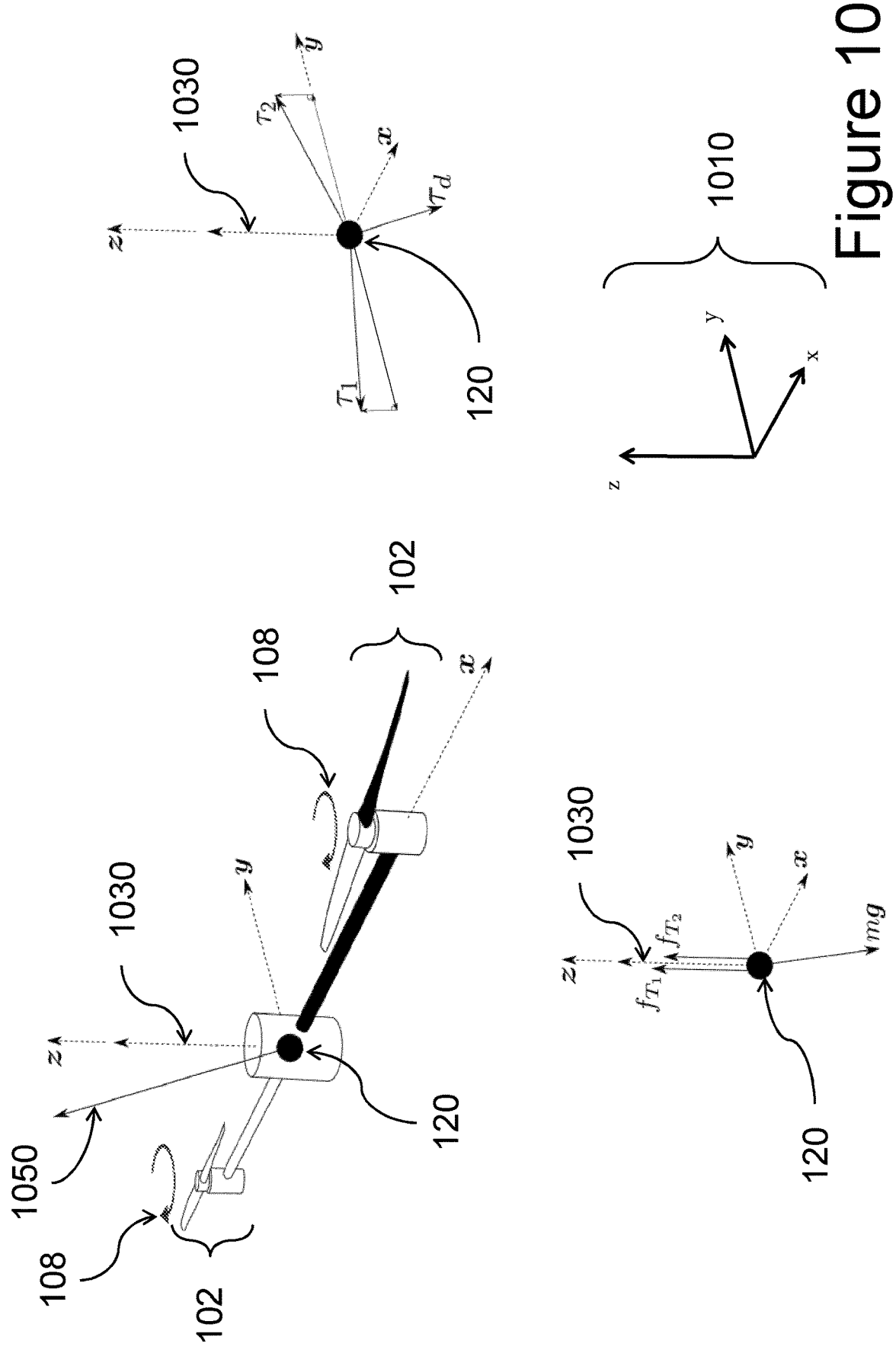
FIG. 10 shows a schematic perspective drawing of an exemplary embodiment used to explain the action of forces and torques.

FIG. 10 shows a schematic perspective drawing of an aerial vehicle 100 that can be used as a subsystem. The aerial vehicle 100 in FIG. 10 is equipped with two effectors 102. Each of the two effectors 102 is equipped with a propeller, which each simultaneously produce both a torque and a thrust force. In this vehicle, the first and the second effector 102 each have an axis of rotation fixed with respect to the aerial vehicle 100. Both propellers spin in the same direction 108.

The two effectors in the form of fixed-pitch propellers rotate in the same direction. Also shown is a coordinate system 1010 fixed with respect to the body of the vehicle, consisting of the directions x, y and z, chosen such that z points along the primary direction 1030, and x points from effector two to effector one, and y following from the right-hand rule.

In this vehicle, the force vectors produced by the propellers $f_{T_i}$ are parallel and parallel to the vehicle's primary direction 1030. The sum of force vectors is the aerial vehicle's resultant direction of thrust.

The torque vectors produced by the propellers $\tau_i$ are balanced by the aerodynamic drag torque $\tau_d$ opposing the aerial vehicle's sense of rotation. The arrangement shown in this vehicle causes the aerial vehicle 100 to rotate about its center of mass 120 with an angular velocity 1050 when hovering.

For the sake of clarity of exposition, the following assumptions about the system are made for the derivation. Note that these assumptions are reasonable for the derivation of control schemes for practical vehicle configurations, and lead to practical and applicable control schemes.

The mass distribution of the vehicle body is such that the principle axes of inertia coincide with x, y, and z, such that the inertia matrix $I^B$ is diagonal, with the components $$I^B = \begin{bmatrix} I_X^B & 0 & 0 \\ 0 & I_Y^B & 0 \\ 0 & 0 & I_Z^B \end{bmatrix}.$$

The effectors are propellers, mounted along the x axis of the body, each at a distance of l from the vehicle's center of mass 120.

The effectors are identical propellers, have a mass negligible when compared to that of the multicopter, have a diagonal inertia matrix $I^R$ whose magnitude is negligible compared to that of the vehicle body, and rotate around axes parallel to the primary direction.

$$I^R = \begin{bmatrix} I_X^R & 0 & 0 \\ 0 & I_Y^R & 0 \\ 0 & 0 & I_Z^R \end{bmatrix}$$

The magnitude of the angular velocity of the vehicle body is negligible when compared to the magnitude of the angular velocity of either propeller.

The force vectors produced by the propellers $f_{T_i}$ are parallel, and parallel to the vehicle primary direction 1030 as illustrated in FIG. 10, such that they can be expressed in the body-fixed coordinate frame as $$f_{T_i} = \begin{bmatrix} 0 \\ 0 \\ f_{T_i} \end{bmatrix}$$

(note the distinction between vector $f_{T_i}$ and the scalar $f_{T_i}$). The only other force assumed to act on the vehicle is its weight mg.

The components of the torque vectors produced by the propellers, acting through the vehicle's center of mass 120 and perpendicular to the primary direction 1030, are collinear with and parallel to y as illustrated in FIG. 10. It is assumed that the component acting perpendicular to the primary direction 1030 is exclusively due to the moment of the propeller's thrust vector force $f_{T_i}$ acting at the distance l from the center of mass 120, and that there is no torque component in the direction of x. The component of the torque parallel to the primary direction 1030 is $\tau_i //$ and is caused by the aerodynamic reaction drag torque to oppose the rotation of the propeller. Thus the propellers' torque vectors expressed in the body fixed frame are:

$$\tau_1 = \begin{bmatrix} 0 \\ -l f_{T_1} \\ \tau_{1\|} \end{bmatrix}, \tau_2 = \begin{bmatrix} 0 \\ -l f_{T_2} \\ \tau_{2\|} \end{bmatrix}$$

The components of the aerodynamic drag torque $\tau_d$ acting to oppose the vehicle's sense of rotation will be assumed to act only parallel to z, such that $\tau d=(0,0,-\tau_d)$ (note the distinction between the vector $\tau_d$ and the scalar $\tau_d$).

Denoting again the rotation of the body-fixed frame with respect to some inertial coordinate frame with R and the angular velocity of the body with $\omega^B$, the differential equation of the rotation matrix R is $$\dot{R}=R[[\omega^B x]]$$

where $\omega^B=(p, q, r)$ is the angular velocity of the vehicle expressed in the coordinate system fixed to the vehicle body, and $[[\omega^B x]]$ is the matrix form of the cross product, such that $$[\omega^B \times] \begin{bmatrix} 0 & -r & q \\ r & 0 & -p \\ -q & p & 0 \end{bmatrix}.$$

The orientation of the vehicle is again described by $$z = R^T \begin{bmatrix} 0 \\ 0 \\ 1 \end{bmatrix},$$

where z is the direction of the primary direction 1030 in the predefined reference frame with associated differential equation given by $$\dot{z} = R \begin{bmatrix} 0 & -r & q \\ r & 0 & -p \\ -q & p & 0 \end{bmatrix} \begin{bmatrix} 0 \\ 0 \\ 1 \end{bmatrix} = R \begin{bmatrix} q \\ -p \\ 0 \end{bmatrix}.$$

For this vehicle configuration the differential equation governing the evolution of the angular velocity is given by $$I^B \dot{\omega}^B = \sum_j \tau_j - [\omega^B \times] \left( I^B \omega^B + \sum_{i=1}^{2} I^R (\omega^B + \omega^{Ri}) \right).$$

The angular velocity of propeller i with respect to the vehicle body, and expressed in the body-fixed frame, is $\omega^{Ri}=(0,0,\omega^{Ri})$ (note again the distinction between the vector $\omega^{Ri}$ and scalar $\omega^{Ri}$).

The left hand side of this equation contains the angular acceleration, and simplifies to $$I^B \dot{\omega}^B = \begin{bmatrix} I_X^B \dot{p} \\ I_Y^B \dot{q} \\ I_Z^B \dot{r} \end{bmatrix}.$$

The orientation of the vehicle is controlled through the angular velocity components p and q.

The sum of all torques, the first term on the right hand side, contains the propellers' torque vectors and the aerodynamic drag torque opposing the vehicle's sense of rotation, and yields $$\sum_j \tau_j = \begin{bmatrix} 0 \\ l(-f_{T_1} + f_{T_2}) \\ -\tau_d + \tau_{1\|} + \tau_{2\|} \end{bmatrix}.$$

The final term expresses the cross coupling of the angular momentum in the system, due to taking the derivative in a non-inertial frame. Multiplying out the term, adding the components, and under the previous assumptions given yields $$[\omega^B \times] \left( I^B \omega^B + \sum_{i=1}^{2} I^R (\omega^B + \omega^{Ri}) \right) \approx \begin{bmatrix} (I_Z^B - I_Y^B)qr + I_Z^R(\omega^{R_1} + \omega^{R_2})q \\ -(I_Z^B - I_X^B)pr - I_Z^R(\omega^{R_1} + \omega^{R_2})p \\ (I_Y^B - I_X^B)pq \end{bmatrix}$$

From the above, writing out the equation in its components yields the three scalar differential equations $$I_X^B \dot{p} = ((I_Y^B - I_Z^B)r - I_Z^R(\omega^{R_1} + \omega^{R_2}))q$$

$$I_Y^B \dot{q} = ((I_Z^B - I_X^B)r - I_Z^R(\omega^{R_1} + \omega^{R_2}))p + \ldots (-f_{T_1} + f_{T_2})l$$

$$I_X^B \dot{r} = ((I_X^B - I_Y^B)pq + \tau_{1\|} + \tau_{2\|} - \tau_d.$$

From this can be seen that sending control signals to the effectors allows to directly affect an angular acceleration $\dot{q}$ about x. Because it has a component perpendicular to the primary direction, this directly produced angular acceleration is linearly independent of the primary direction. Furthermore, through the above mentioned angular acceleration $\dot{q}$, an angular velocity q can be achieved.

Thus, by turning the body through a secondary direction lying along y, the vehicle's angular velocity components about the primary direction 1030 (r) and the secondary direction (q) will interact to produce an angular acceleration (and thus a turning) about a turning axis, here x. Important to note is that the secondary direction lies at a non-zero angle with respect to the primary direction 1030 (i.e. is linearly independent of the primary direction), and that the turning direction lies at a non-zero angle to both the primary and secondary direction (i.e. the turning axis is linearly independent of both). Concretely, for this vehicle, this means that although the propellers cannot produce a torque about the x axis, the component p of angular velocity lying along x can be affected, and the primary direction's orientation with respect to an inertial frame can be controlled. Similarly, for other vehicles, this means that the above effect can be actively exploited for their control rather than counteracted or otherwise compensated for.

Furthermore, this orientation can be maintained by bringing the angular velocity components p and q to zero, and commanding the propellers such that $f_{T1}=f_{T2}$ such that $\dot{p}=0$ and $\dot{q}=0$, respectively. The vehicle's angular velocity will then point along the primary direction 1030 and the orientation will be constant.

The component of the vehicle's angular velocity along the primary direction, r, will be dominated by the torques $\tau_{i\|}$ and the drag torque $\tau_d$. Since the drag torque will typically monotonically increase with r, there will be an imbalance in $\tau_{1\|} + \tau_{2\|} - \tau_d$ at low speeds, such that the vehicle will increase this component of angular velocity, and thus the vehicle has a natural tendency to rotate about the primary direction. For fixed pitch propellers, there is typically a strongly linear relationship between the magnitude of the thrust force $f_{Ti}$ and the aerodynamic reaction drag torque $\tau_{i\|}$.

A translational acceleration of the vehicle can now be effected by using the difference of the two forces $f_{T1}$ and $f_{T2}$ to attain and maintain an orientation of the primary direction, and using the sum of the two propeller thrust forces to achieve a resultant force acting on the body.

Note that while the above derivation was made under specific assumptions, these assumptions are reasonable for the derivation of control schemes for practical vehicle configurations and lead to practical and applicable control schemes. The above results, therefore, hold for a broader range of circumstances and should be interpreted as such.

Furthermore, it will be readily apparent to one skilled in the art that the specific control law used can vary, and can be derived using linear methods such as the linear quadratic regulator (LQR), using pole placement, various robust control methods, or nonlinear control methods.

Figure 11:
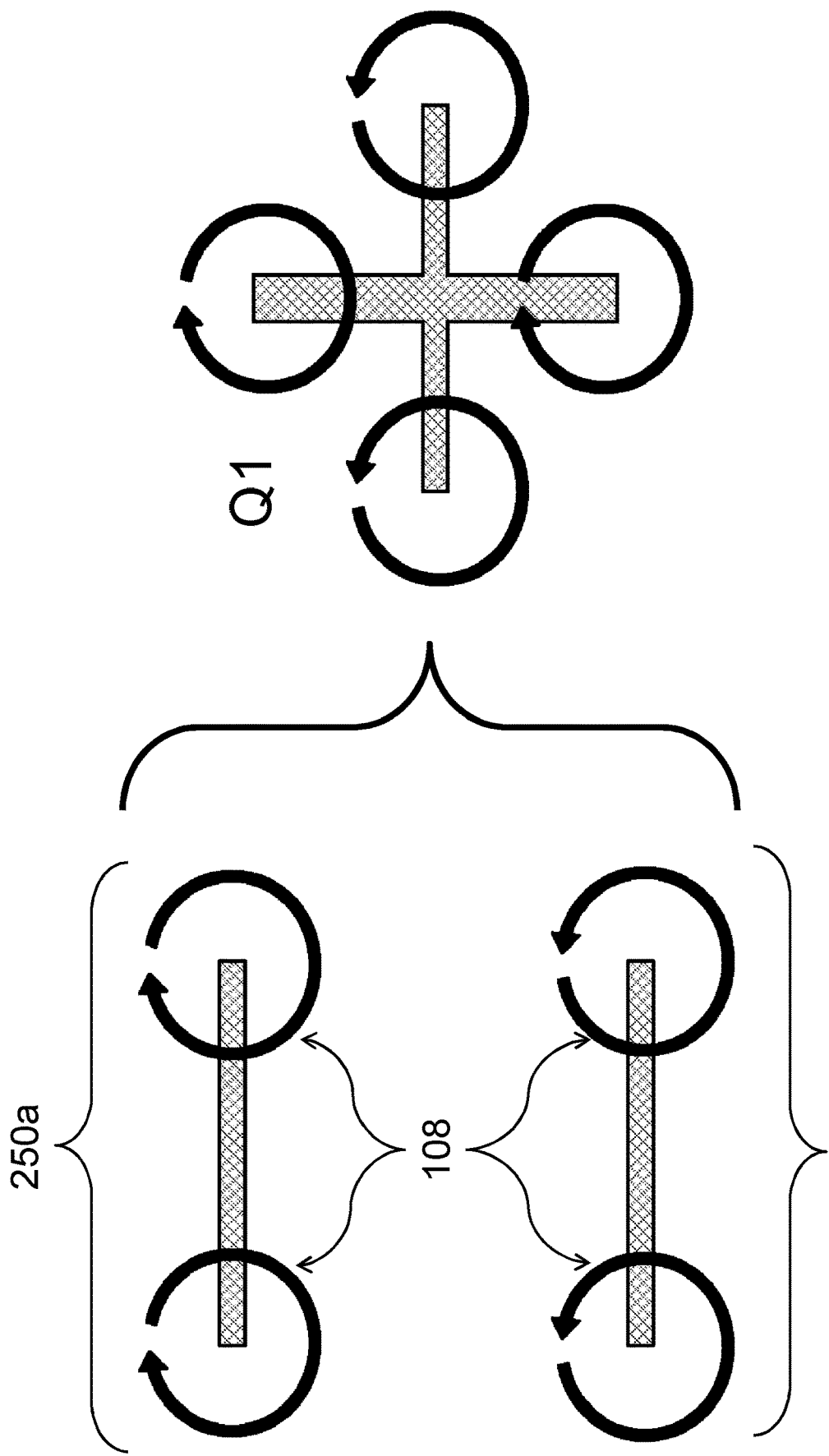
FIG. 11 shows a schematic representation of the sample embodiment shown in FIGS. 2A and 2B used to explain how two subsystems may be joined to create an aerial vehicle that is a quadrocopter.

FIG. 11 shows a schematic representation of the sample embodiment shown in FIGS. 2A, 2B, and 10, and controllable using the method outlined above, used to explain how the two subsystems may be arranged to create a single redundant aerial vehicle that is a quadrocopter. The first subsystem 250a is similar to the aerial vehicle illustrated in FIG. 10. It has two propellers that spin in a clockwise direction. The second subsystem 250b has two propellers that spin in a counter-clockwise direction. These two subsystems can be combined to form a redundant aerial vehicle 100 in the shape of a standard quadrocopter ("Q1").

Note that like shading of arrows in FIGS. 11 to 13 indicate subsystems that belong together. For example, quadrocopter Q1 consists of a first subsystem 250a with the arrows indicating its propellers' directions in black and of a second subsystem 250b with the arrows indicating its propellers' directions in white.

FIGS. 12A to 12C show schematic representations used to explain how two or three subsystems may be arranged to create an aerial vehicle that is a hexacopter.

FIG. 12A shows four hexacopter configurations H1, H2, H3, H4 with stacked propellers. A typical stacked propeller arrangement uses pairs of propellers with identical size, sharing the same axis of rotation, and rotating in opposite directions.

Hexacopter H1 consists of two subsystems with corresponding arrow colors black and white. During normal operation all effectors are operational, resulting in a pairing and cancellation of the torques created by the six propellers. H1 can be controlled using control methods known in the prior art. Disabling one of the two subsystems results in an aerial vehicle with an unbalanced propeller torque that can be controlled using the control methods described in the present disclosure.

Hexacopter H2 again consists of two subsystems with corresponding arrow colors black and white. During normal operation all effectors are operational, again resulting in a pairing and cancellation of the torques created by the six propellers. H2 can be controlled using control methods known in the prior art. Disabling one of the two subsystems results in an aerial vehicle with all propellers spinning in the same direction that can be controlled using the control methods described in the present disclosure.

Hexacopter H3 consists of three subsystems with corresponding arrow colors black, white, and grey. During normal operation all effectors are operational, again resulting in a pairing and cancellation of the torques created by the six propellers. H3 can be controlled using control methods known in the prior art. Disabling the white or black subsystem results in an aerial vehicle with an unbalanced propeller torque that can be controlled using the control methods described in the present disclosure. Disabling the grey subsystem results in a torque-balanced aerial vehicle that can be controlled using control methods known in the prior art.

Hexacopter H4 consists of three subsystems with corresponding arrow colors black, white, and grey. During normal operation all effectors are operational, again resulting in a pairing and cancellation of the torques created by the six propellers. H4 can be controlled using control methods known in the prior art. Disabling any one of the three subsystems results in a torque-balanced aerial vehicle that can be controlled using control methods known in the prior art.

FIGS. 12B and 12C show four hexacopter configurations H5, H6, H7, H8 with individually arranged propellers. Again, many other configurations in terms of propellers' relative positioning in the plane and out of plane, propellers' axes of rotation, propellers' sizes, etc. are possible and can be usefully employed with the present invention.

Hexacopter H5 corresponds to hexacopter H2 with the white subsystem rotated by 60 degrees. It can be controlled using control methods known in the prior art during normal operation, and using those methods described in the present disclosure during emergency operation.

Hexacopter H6 corresponds to hexacopter H1; Hexacopter H7 corresponds to hexacopter H4; and Hexacopter H8 corresponds to hexacopter H3; but each with a different exemplary propeller arrangement. Each can be controlled using control methods known in the prior art during normal operation, and using the methods described in the present disclosure during emergency operation.

In addition to the above examples, many other variations are possible. In particular, hexacopters with unbalanced propellers during their normal mode of operation, such as those described in the present disclosure, are possible and can be usefully employed with the present disclosure.

FIGS. 13A to 13D show schematic representations used to explain how two subsystems may be arranged to create an aerial vehicle that is an octocopter.

FIGS. 13A and 13B show four octocopter configurations O1, O2, O3, and O4 with stacked propellers.

Octocopter O1 shows a configuration consisting of a white and a black subsystem that each have a typical quadrocopter configuration. It can be controlled using control methods known in the prior art during normal operation as well as during emergency operation.

Octocopter O2 shows a typical configuration consisting of a white and a black subsystem that each have a typical quadrocopter configuration. It can be controlled using control methods known in the prior art during normal operation as well as during emergency operation.

Octocopters O3 and O4 each comprise eight propellers with all four effectors of the first subsystem structured and arranged to rotate with the same handedness about their respective thrust forces and with all four effectors of the second subsystem structured and arranged to rotate with the same handedness about their respective thrust forces. Each of O3 and O4 can be controlled using control methods known in the prior art during normal operation, and using the methods described in the present disclosure during emergency operation.

FIGS. 13C and 13D show four octocopter configurations O5, O6, O7, and O8 with propellers arranged individually.

Octocopter O5 shows a different exemplary propeller arrangement that can be controlled using control methods known in the prior art during normal operation, and using the methods described in the present disclosure during emergency operation.

Octocopter O6 corresponds to octocopter O2, but with the black subsystem rotated by 45 degrees. It can be controlled using control methods known in the prior art during normal operation as well as during emergency operation.

Octocopters O7 again corresponds to octocopter O4, but with yet a different exemplary propeller arrangement. It can be controlled using control methods known in the prior art during normal operation, and using the methods described in the present disclosure during emergency operation.

Octocopter O8 again corresponds to octocopter O2, but with a different exemplary propeller arrangement. It can be controlled using control methods known in the prior art during normal operation as well as during emergency operation.

In addition to the above examples, many other variations are possible. In particular, octocopters comprising three or of four subsystems as well as octocopters with unbalanced propellers during their normal mode of operation, such as those disclosed by WO 2014/198642 A1, are possible and can be usefully employed with the present disclosure.

Other configurations than those outlined in FIGS. 11-13 or those described in example embodiments are possible and can be usefully employed with the present invention. These include configurations with propellers having different sizes (e.g., to have them operate at different speeds to reduce overall noise emissions), with parallel but not identical axes of rotation (e.g., to allow sideway motion without tilting), with different axes of rotation (e.g., to achieve sideway motion without tilting and a reduced noise emissions), with identical directions of propeller rotation (e.g. to increase angular rotation in certain control modes), or variations of the above.

Figure 14:
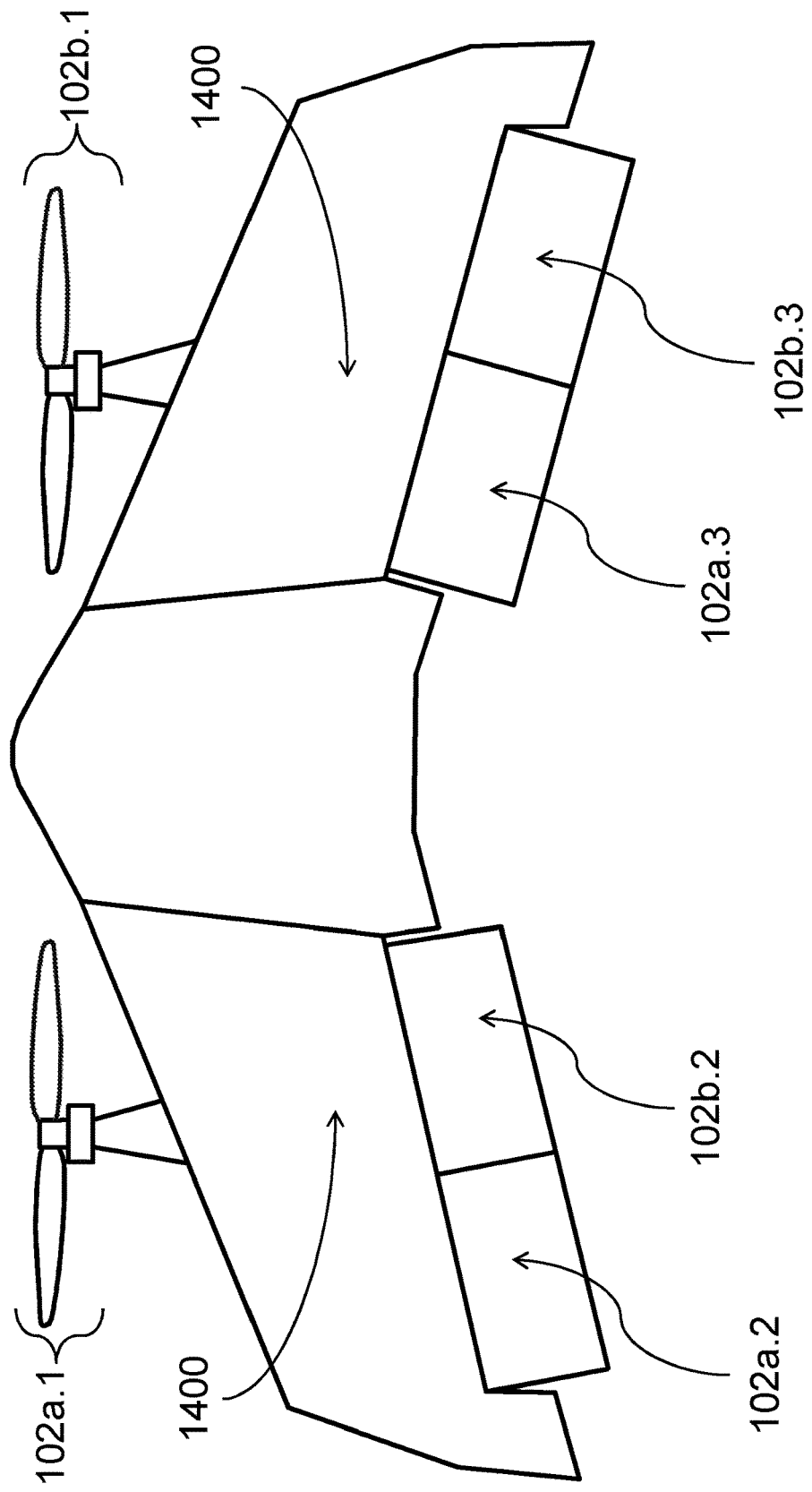
FIG. 14 shows another example embodiment of an aerial vehicle that can be used with the present invention.

FIG. 14 shows another example embodiment of an aerial vehicle that can be used with the present invention. It has a total of six effectors: Two propellers 102a.1, 102b.1 and four control surfaces 102a.2, 102a.3, 102b.2, 102b.3, (sometimes called "flaps") attached to wings 1400. This embodiment can, for example, be decomposed into the following subsystems:

The first propeller 102a.1 and two control surfaces 102a.2, 102a.3, and the second propeller 102b.1 and two control surfaces 102b.2, 102b.3.

Figure 15:
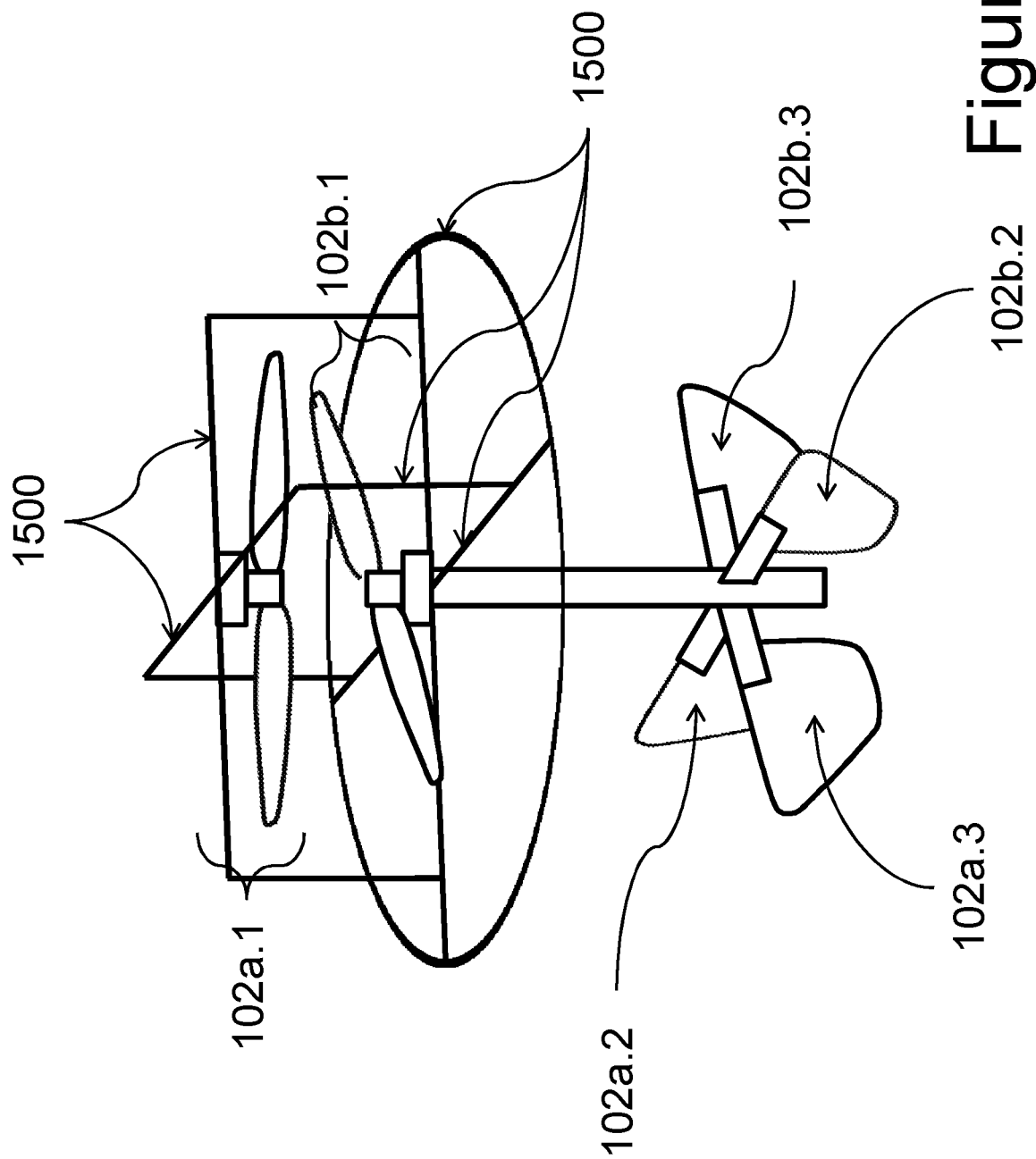
FIG. 15 shows another example embodiment of an aerial vehicle that can be used with the present invention.

FIG. 15 shows another example embodiment of an aerial vehicle that can be used with the present invention. It has a total of six effectors: Two propellers 102a.1, 102b.2 and four control surfaces 102a.2, 102a.3, 102b.2, 102b.3 (sometimes called "flaps") attached to a support structure 1500. This embodiment can, for example, be decomposed into the following subsystems:

The first propeller 102a.1 and two control surfaces 102a.2, 102a.3, and the second propeller 102b.1 and two control surfaces 102b.2, 102b.3.

Figure 16:
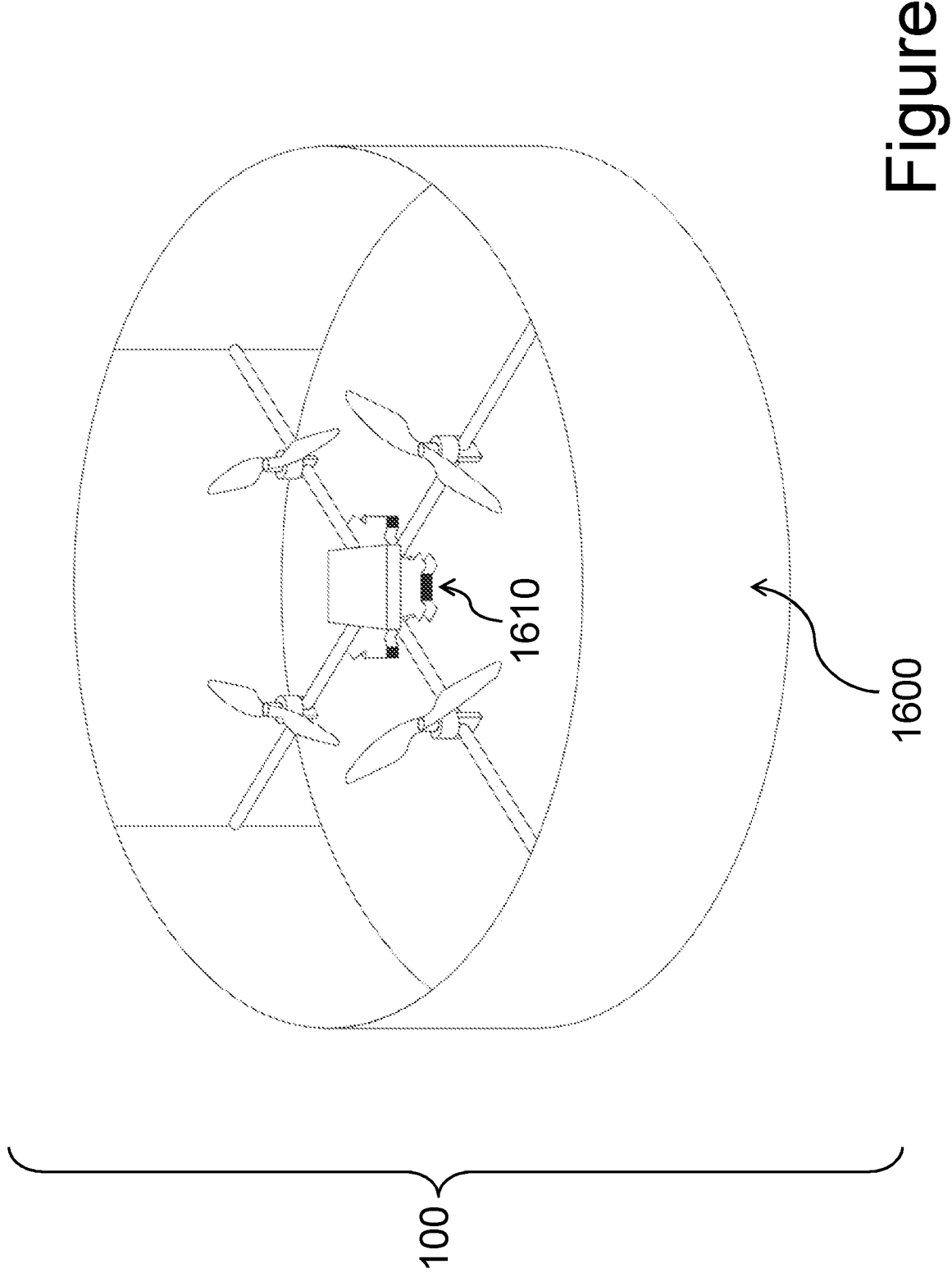
FIG. 16 shows another example embodiment of an aerial vehicle equipped with a support structure to which a costume is attached, and lights.

FIG. 16 shows another example embodiment of an aerial vehicle 100 that can be used with the present invention. The aerial vehicle 100 comprises a support structure 1611. In this example the support structure comprises arms 126, which extend beyond the effectors 102A costume 1600 is attached to the support structure 1611; thus when the aerial vehicle 100 is flown then the costume 1600 will also fly along with it. This particular embodiment is particular useful for entertainment applications such as stage performances. In this particular embodiment the aerial vehicle further comprises four light sources 1610 in the form of four LEDs. Each of the LEDs is arranged to emit light away from the vehicle so that it is incident on an inner surface of said costume. Thus the LEDs illuminates the costume. In a variation of this embodiment each LED (light source) is provided with a lens that converges or diverges the light produced by the LED to illuminate the costume. The LEDs may be controlled by a flight module 240.

It will be understood that the costume 1600 may take any suitable form. In some embodiments the costume also acts as a support structure and provides the structural stability required for flight; or attachment points for the aerial vehicle's effector(s), sensor(s), flight module(s), or power unit(s). In some embodiments the costume has aerodynamic properties (e.g., it may generate lift by providing airfoils).

Figure 17:
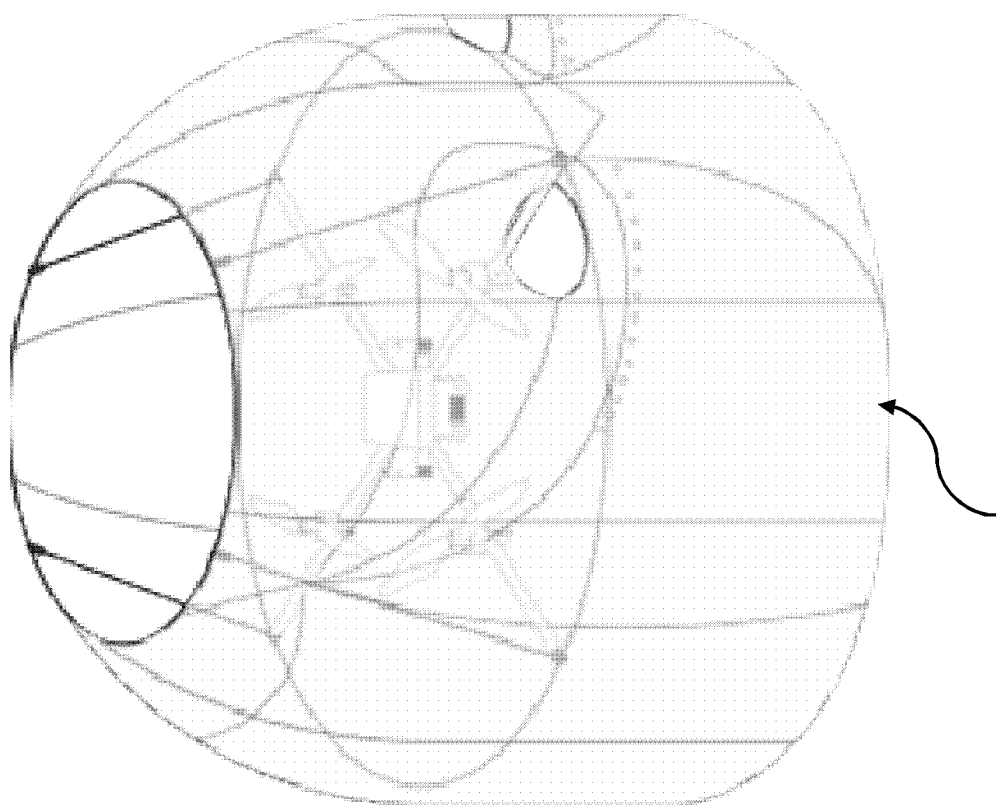
FIG. 17 shows another example embodiment of an aerial vehicle equipped with a costume of a different shape/design.

FIG. 17 shows another example of an aerial vehicle 100, which has many of the same features as the aerial vehicle illustrated in FIG. 16, but is equipped with a costume 1620 that has different shape/design to the costume 1600 provided in the aerial vehicle 100 of FIG. 16.

While certain aspects of the present invention have been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

FIGURE NUMERALS

100 Aerial vehicle
102 Effectors
102a Master's effectors
102b Slave 1's effectors
102c Slave 2's effectors
104 Propeller
106 Motor
108 Direction of propeller rotation
110 Drive axis
120 Centre of mass
122 Primary body axis
124 Central housing
126 Arm
210 Communication channel
210.1 First communication channel (unidirectional or bidirectional)
210.2 Second communication channel (unidirectional or bidirectional)
240 Flight module
240a First flight module (Master)
240b Second flight module (Slave/Slave 1)
240c Third flight module (Slave 2)
250a First subsystem (Master)
250b Second subsystem (Slave/Slave 1)
250c Third subsystem (Slave 2)
300a Master's sensor
300b Slave 1's sensor
300c Shared sensor
300d Slave 2's sensor
310a Master's normal operation control unit
310b Slave's normal operation control unit
320a Master's emergency control unit
320b Slave's emergency control unit 330a Master's failure detection unit
330b Slave 1's failure detection unit
330c Slave 2's failure detection unit
340a Master's switch
340b Slave 1's switch
340c Slave 2's switch
350a Master's coordination unit
350b Slave 1's coordination unit
350c Slave 2's coordination unit
360a Master's power source
360b Slave 1's power source
360c Slave 2's power source
510 Start
520a Normal operation Master
530a Master failure decision by Master
530b Slave failure decision by Slave
540a Slave failure decision by Master
540b Master failure decision by Slave
550a Master action: signal Slave and disable Master
550b Slave action: signal Master and disable Slave
560a Emergency operation initiated by Master due to Slave failure
560b Emergency operation initiated by Slave due to Master failure
570b Feed through from Master to Slave
610a.1 Master's first emergency control unit
610a.2 Master's second emergency control unit
610b Slave 1's emergency control unit
710a Normal operation (Master, Slave 1, Slave 2)
720a Master failure decision by Master
720b Slave 1 failure decision by Slave 1
720c Slave 2 failure decision by Slave 2
730a.1 Slave 1 failure decision by Master
730a.2 Slave 2 failure decision by Master
730b Master failure decision by Slave 1
740a Master action: signal Slave 1 and disable Master
740b Slave 1 action: signal Master and disable Slave 1
740c Slave 2 action: signal Master and disable Slave 2
750a.1 Emergency operation (Master, Slave 2) initiated by Master due to Slave 1 failure
750a.2 Emergency operation (Master, Slave 1) initiated by Master due to Slave 2 failure
750b Emergency operation (Slave 1, Slave 2) initiated by Slave 1 due to Master failure
780b Feed through from Master to Slave 1
780c Feed through from Master to Slave 2
900b Emergency operation initiated by Slave due to Master failure
910b Disable Slave
1010 Body coordinate system
1030 Primary direction
1050 Angular velocity
1400 Wing
1500 Rigid support structure
1600 Costume
1610 LED with lens
1620 Costume
τ: torque vector
$\tau_a$: aerodynamic torque
$f_{T_i}$: thrust force of effector i
mg: weight of the aerial vehicle

The invention claimed is:

1. An aerial vehicle that is operable to fly, the aerial vehicle having at least a first and second subsystem that are operably connected,
wherein the first subsystem comprises a first flight module, first one or more effectors that are selectively operable to generate a first force sufficient to cause the aerial vehicle to fly;
and the second subsystem comprises a second flight module, second one or more effectors that are selectively operable to generate a second force sufficient to cause the aerial vehicle to fly;
such that the first or second subsystem can be selectively used to fly the aerial vehicle not relying on the one or more effectors of the other subsystem, the aerial vehicle further comprising,
one or more sensors that are operable to sense one or more characteristics of the movement of the aerial vehicle, and
wherein the first flight module is configured such that it can selectively send predefined control signals to the second one or more effectors that effect the aerial vehicle to move in a predefined manner; and
wherein the first flight module is configured to receive one or more outputs from the one or more sensors and to use those received outputs to determine if the aerial vehicle has moved in said predefined manner; and
wherein the first flight module is configured to determine that a failure has occurred in the second subsystem if the first flight module determines that the aerial vehicle has not moved in said predefined manner.

2. An aerial vehicle according to claim 1 wherein the one or more sensors are for sensing at least a position, orientation, or velocity of the aerial vehicle relative to an external reference frame; and the second subsystem further comprises a second one or more sensors for sensing at least a position, orientation, or velocity of the aerial vehicle relative to an external reference frame.

3. An aerial vehicle according to claim 1 wherein the one or more sensors are shared by the first and second subsystems, wherein the one or more sensors are configured for sensing at least a position, orientation, or velocity of the aerial vehicle relative to an external reference frame.

4. An aerial vehicle according to claim 1 wherein the first and second subsystems are arranged in a master-slave configuration, wherein the first subsystem is the master and the second subsystem is the slave.

5. An aerial vehicle according to claim 1 further comprising a third subsystem wherein the third subsystem comprises,
third one or more effectors that are selectively operable to generate a force sufficient to cause the aerial vehicle to fly,
a third flight module comprising,
a third switch;
a third coordination unit for controlling the third switch;
and wherein the third switch is configured such that it can selectively be switched by the third coordination unit between, a first position where it passes the control signals generated by the first normal operation control unit to the third one or more effectors or passes the control signals generated by the second emergency control unit to the third one or more effectors, a second position where it can pass the control signals generated by the emergency control unit to the third one or more effectors, and a third position in which the switch is open such that no control signals are passed to the third one or more effectors.

6. An aerial vehicle according to claim 5 wherein the third flight module further comprises a third failure detection unit that is configured to detect at least a failure in the third subsystem, wherein the third failure detection unit is connected to the third coordination unit and is configured to send a signal to the third coordination unit upon detection of a failure in the third subsystem and to send a signal to the first coordination unit upon detection of a failure in the third subsystem, and wherein the third coordination unit is configured to switch the third switch to its third position upon receipt of a signal from the third failure detection unit indicating a failure in the third subsystem, and wherein the third coordination unit is further configured to trigger the first coordination unit to switch the first switch to its second position upon receipt of a signal from the third failure detection unit indicating a failure in the third subsystem, such that control signals generated by the first emergency control unit are passed to the first and second one or more effectors of the first and second subsystems respectively.

7. An aerial vehicle according to claim 1 wherein the first subsystem further comprises, a means for comparing an output from said one or more sensors with respective predefined values, and determining that a failure has occurred in the first or second subsystems if the outputs from said one or more sensors are not equal to said respective predefined values.

8. An aerial vehicle according to claim 1 configured to be modular, wherein the first subsystem and second subsystems each comprise a connecting means that is configured so that the first and second subsystems can be mechanically, detachably, connected.

9. An aerial vehicle according to claim 1 wherein the first one or more effectors comprise a propeller that is configured to rotate in a first direction, and wherein the second one or more effectors comprise a propeller that is configured to rotate in a second direction that is opposite to the first direction.

10. An aerial vehicle according to claim 1 further comprising a support structure to which a costume can be attached.

11. An aerial vehicle according to claim 10 further comprising a costume which is attached to the support structure.

12. An aerial vehicle according to claim 11 further comprising one or more light sources which are mounted on the vehicle or support structure and which are arranged to emit light away from the vehicle so that it is incident on said costume.

13. An aerial vehicle that is operable to fly, the aerial vehicle having at least a first and second subsystem that are operably connected, wherein the first subsystem comprises a first flight module, first one or more effectors that are selectively operable to generate a first force sufficient to cause the aerial vehicle to fly, wherein the first flight module comprises, a first switch;

a first coordination unit for controlling the first switch;

a first normal operation control unit that is operable to generate control signals for operating the first and second one or more effectors;

a first emergency control unit that is operable to generate control signals for operating the first one or more effectors, wherein the first switch is configured such that it can be selectively switched by the first coordination unit between a first position where it passes the control signals generated by the first normal operation control unit to the first one or more effectors, a second position where it passes the control signals generated by the first emergency control unit to the first one or more effectors, and a third position in which the switch is open such that no control signals are passed to the first one or more effectors;

and the second subsystem comprises a second flight module, second one or more effectors that are selectively operable to generate a second force sufficient to cause the aerial vehicle to fly, wherein the second flight module comprises, a second switch;

a second coordination unit for controlling the second switch;

a second emergency control unit that is operable to generate control signals for operating the second one or more effectors, and wherein the second switch is configured such that it can be selectively switched by the second coordination unit between a first position where it passes the control signals generated by the first normal operation control unit to the second one or more effectors, a second position where it passes the control signals generated by the second emergency control unit to the second one or more effectors, and a third position in which the switch is open such that no control signals are passed to the second one or more effectors;

such that the first or second subsystem can be selectively used to fly the aerial vehicle not relying on the one or more effectors of the other subsystem.

14. An aerial vehicle according to claim 13, wherein the first flight module further comprises a first failure detection unit that is configured to detect at least a failure in the first subsystem and a failure in the second subsystem, wherein the first failure detection unit is connected to the first coordination unit and is configured to send a signal to the first coordination unit upon detection of a failure in the first subsystem and to send a signal to the first coordination unit upon detection of a failure in the second subsystem, and wherein the first coordination unit is configured to switch the first switch to its third position upon receipt of a signal from the first failure detection unit indicating a failure in the first subsystem, such that the vehicle is flown exclusively using the second subsystem; and wherein the first coordination unit is configured to trigger the second coordination unit to switch the second switch to its third position upon receipt of a signal from the first failure detection unit indicating a failure in the second subsystem, such that the vehicle is flown exclusively using the first subsystem.

15. An aerial vehicle according to claim 14, wherein the second flight module further comprises a second failure detection unit that is configured to detect at least a failure in the second subsystem and a failure in the first subsystem, wherein the second failure detection unit is connected to the second coordination unit and is configured to send a signal to the second coordination unit upon detection of a failure in the second subsystem and to send a signal to the second coordination unit upon detection of a failure in the first subsystem, and wherein the second coordination unit is configured to switch the second switch to its third position upon receipt of a signal from the second failure detection unit indicating a failure in the second subsystem, such that the vehicle is flown exclusively using the first subsystem, and wherein the second coordination unit is configured to trigger the first coordination unit to switch the first switch to its third position upon receipt of a signal from the second failure detection unit indicating a failure in the first subsystem, such that the vehicle is flown exclusively using the second subsystem.

16. An aerial vehicle according to claim 14 wherein the failure in the first subsystem is a failure in at least one of said first one or more effectors, and wherein the failure in the second subsystem is a failure in at least one of said second one or more effectors.

17. An aerial vehicle according to claim 13, wherein the first flight module further comprises a first failure detection unit that is configured to detect at least a failure in the first subsystem, and wherein the second flight module further comprises a second normal operation control unit that is operable to generate control signals for operating the first and second one or more effectors; and wherein when the second switch is in its second position control signals generated by the second normal operation control unit can pass to the first and second one or more effectors; and wherein the first coordination unit is configured such that when it receives a signal from the first failure detection unit indicating that a failure in the first subsystem has been detected, the first coordination unit triggers the second coordination unit to switch the second switch to its second position so that control signals generated by the second normal operation control unit are passed to first and second one or more effectors, so that the first and second one or more effectors are controlled exclusively by control signals generated by the second normal operation control unit.

18. An aerial vehicle according to claim 13 wherein the first and second subsystems are operably connected via one or more communication channels, and wherein the first coordination unit is configured to switch the first switch to its second position and trigger switching of the second switch to its third position when a failure in the communication channel is detected, such that the aerial vehicle is flown exclusively using the first subsystem.

19. An aerial vehicle according to claim 13, wherein the first coordination unit is configured to switch the first switch to its second position and trigger switching of the second switch to its third position when the first coordination unit fails to receive any signal from the second coordination unit within a predefined period, such that the aerial vehicle is flown exclusively using the first subsystem, and, wherein the second coordination unit is configured to switch the second switch to its second position and trigger switching of the first switch to its third position when the second coordination unit fails to receive any signal from the first coordination unit within a predefined period, such that the aerial vehicle is flown exclusively using the second subsystem.

20. A method for controlling an aerial vehicle, where the aerial vehicle is an aerial vehicle according to claim 1, the method comprising, (1) computing in the first subsystem, a first set of control signals for effectors of the first and second subsystems;

(2) communicating the first set of control signals to the effectors of the second subsystem, (3) detecting a failure in the first or second subsystem, (4) disabling the effectors of the subsystem in which a failure was detected, so that the aerial vehicle is flown using only the effectors of the other subsystem.

21. A method according to claim 20 where the method comprises disabling the subsystem in which a failure was detected, so that the aerial vehicle is flown using only the other subsystem.

22. A method according to claim 20 further comprising the step of computing a second set of control signals in the subsystem which did not suffer the failure, which control exclusively the effectors of said subsystem.

* * * * *